US006681096B2

United States Patent
Seto et al.

(10) Patent No.: US 6,681,096 B2
(45) Date of Patent: Jan. 20, 2004

(54) IMAGE FORMATION APPARATUS, PRINTER, COPYING MACHINE, AND FACSIMILE DEVICE

(75) Inventors: Takashi Seto, Tokyo (JP); Yasushi Nakazato, Tokyo (JP); Masakazu Muranaka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 82 days.

(21) Appl. No.: 09/983,687

(22) Filed: Oct. 25, 2001

(65) Prior Publication Data
US 2002/0051665 A1 May 2, 2002

(30) Foreign Application Priority Data

| Oct. 26, 2000 | (JP) | 2000-326375 |
| Oct. 27, 2000 | (JP) | 2000-329412 |
| Jan. 30, 2001 | (JP) | 2001-021528 |
| Sep. 14, 2001 | (JP) | 2001-279355 |
| Sep. 17, 2001 | (JP) | 2001-281144 |

(51) Int. Cl.⁷ .................. G03G 15/00; B65H 29/00; B65H 5/00
(52) U.S. Cl. .............. 399/388; 271/186; 271/274; 271/902
(58) Field of Search ................ 271/184, 186, 271/225, 272, 274, 902; 399/297, 388

(56) References Cited

U.S. PATENT DOCUMENTS

| 4,673,176 A | * | 6/1987 | Schenk ................. 271/186 |
| 4,699,367 A | * | 10/1987 | Russel .................. 271/186 X |
| 5,082,272 A | * | 1/1992 | Xydias et al. .......... 271/186 |
| 5,234,211 A | * | 8/1993 | Olexy .................. 271/184 |
| 5,887,868 A | * | 3/1999 | Lambert et al. ........ 271/186 |
| 6,345,170 B1 | * | 2/2002 | Nakazato et al. ...... 399/388 |
| 6,470,169 B2 | * | 10/2002 | Nakazato .............. 399/388 |
| 6,505,014 B2 | | 1/2003 | Aoki et al. ............ 399/55 |

FOREIGN PATENT DOCUMENTS

| JP | 10-218455 | 8/1998 |
| JP | 11-239672 | 8/1999 |
| JP | 2000-230153 | 7/2000 |

* cited by examiner

Primary Examiner—Fred L. Braun
(74) Attorney, Agent, or Firm—Oblon, Spivak, McClelland, Maier & Neustadt, P.C.

(57) ABSTRACT

An image formation apparatus has a branching claw with a first guide surface along a side of a sheet to be fed into a reversing path and a second guide surface along a side of a sheet to be fed out of the reversing path. This branching claw is disposed so as to enable switching between a first switching position where the sheet is allowed to be fed into the reversing path through its conveyance along the first guide surface, and a second switching position where the sheet is allowed to be forwarded from the reversing path toward the downstream side of a sheet conveying path through its conveyance along the second guide surface.

70 Claims, 29 Drawing Sheets

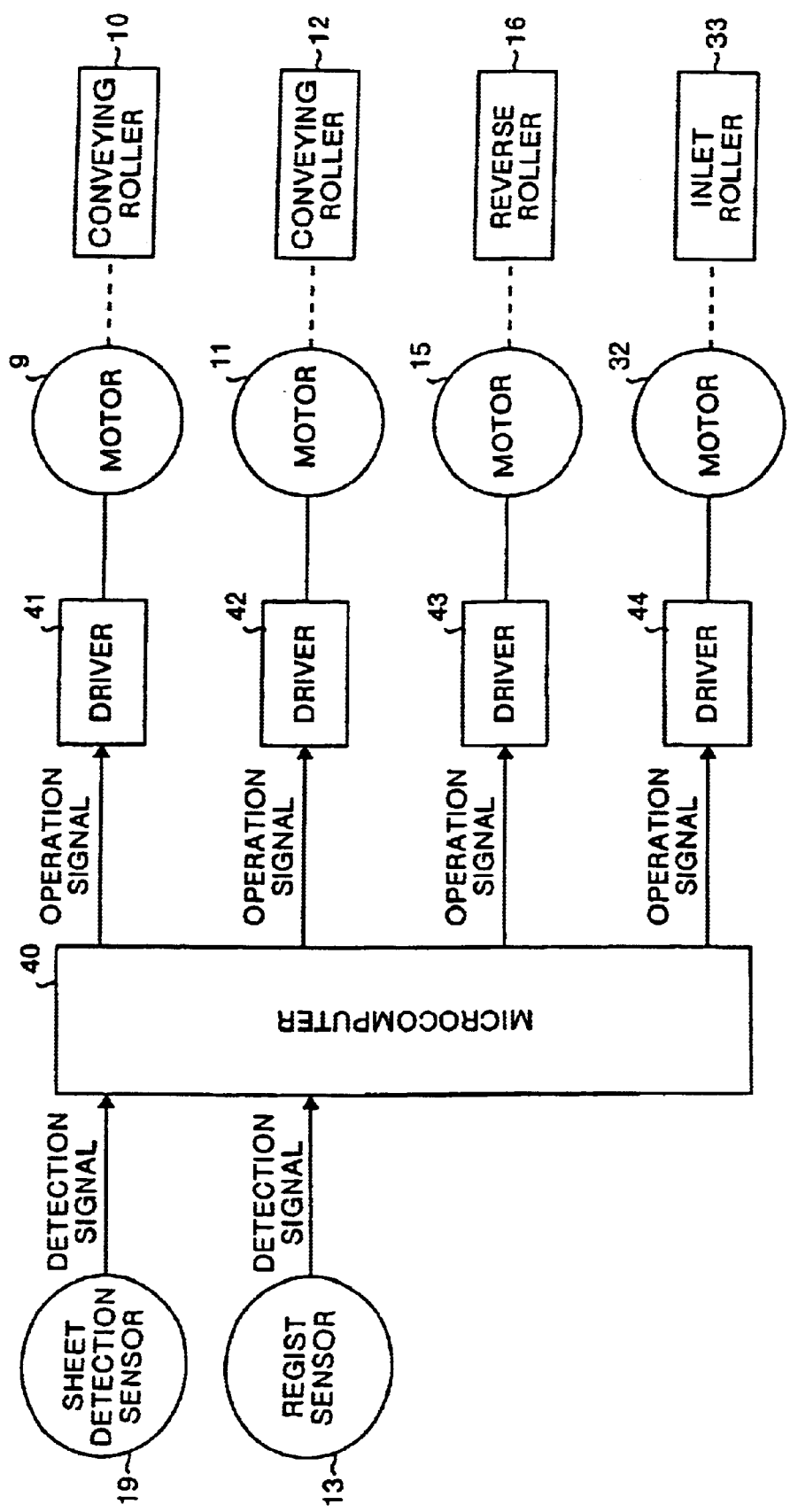

IMAGE FORMATION APPARATUS, PRINTER, COPYING MACHINE, AND FACSIMILE DEVICE

FIELD OF THE INVENTION

The present invention relates to an image formation apparatus, and printer, copying machine, and a facsimile device using the image formation apparatus.

BACKGROUND OF THE INVENTION

A sheet feeding structure of a conventional image forming device is generally formed with a sheet separation/feeding unit that separates and feeds sheets stacked and stored in a sheet storage section one by one, a sheet conveying path that conveys the separated and fed sheet toward an image forming section, and regist rollers disposed at a position immediately before the image forming section on the sheet conveying path.

The sheet separated and fed by the sheet separation/feeding unit is conveyed along the sheet conveying path, is stopped temporarily at the position where the sheet comes into contact with the regist rollers, and fed into the image forming section at a timing at which an image is formed on an appropriate position of the sheet.

If a sheet is fed out by the regist rollers and the rear edge of this sheet and the front edge of a subsequent sheet overlap each other, these two sheets are fed into the image forming section in their overlapping state. Accordingly, one image is disadvantageously formed over the two sheets, therefore, image formation cannot be successfully performed on the sheet. Further, when the overlapping two sheets are fed into the image forming section, a sensor for detecting a sheet size detects that the sheet size is irregular, and the image forming operation is interrupted.

Therefore, when image formation is continuously performed, it has been required to widen each space between fore-and-aft sheets, and to separate and feed the sheets so that the two sheets are prevented from overlapping each other even if the subsequent sheet is fed when the preceding sheet stops at the regist rollers.

Further, in the sheet feeding structure of the conventional image forming device, a space between fore-and-aft sheets is widened by tens of millimeters and the sheets are fed when image formation is continuously performed considering that a slip may occur at the time of sheet separation and feeding by the sheet separation/feeding unit, a sheet conveying speed may be changed over time or depending on environment, or there may be variations in suspended time for registration. Therefore, it is difficult to improve productivity of image formation.

An image forming section based on an electrophotographic system cannot stop the operation because of its structure even when the sheet is not conveyed to the image forming section, and the section performs no-load operation. Therefore, a large space between continuously fed sheets makes longer the time for no-load operation, thus the life of the device is decreased so that the printing number of sheets becomes less than a possible printing number of sheets that the device originally has.

For the above-mentioned reasons, the applicants of this application have proposed an image formation apparatus with a reversing path and a sheet reversing unit provided in some midpoint of a sheet conveying path in Japanese patent application No. 11-239672 and Japanese patent application No. 2000-230153, or the like. More specifically, this image formation apparatus is capable of improving operating efficiency in image formation by narrowing a space between sheets fed into an image forming section when the image formation is continuously performed.

In accordance with the image formation apparatus provided with these reversing path and sheet reversing unit, a sheet separated and fed from a sheet storage section and conveyed along the sheet conveying path is fed into the reversing path, and the sheet is stopped temporarily on the reversing path and then switched back to be fed into the image forming section. Further, a subsequent sheet is fed into the reversing path while the sheet fed into the reversing path is switched back and is forwarded toward the image forming section. The subsequent sheet is started to be fed out from the reversing path toward the image forming section at a timing at which the preceding sheet to be forwarded to the image forming section reaches a predetermined position. Accordingly, the space between the sheets continuously fed into the image forming section can be narrowed, which makes it possible to improve the operating efficiency in image formation. Furthermore, in the image forming section, since the time for no-load operation without image formation is reduced, reduction in the life of the device due to no-load operation can be prevented.

However, according to the image formation apparatus with the reversing path and the sheet reversing unit disposed on some midpoint of the sheet conveying path, it is necessary to reliably switch a sheet conveying direction from the sheet conveying path to the reversing path, and from the reversing path to the sheet conveying path leading to the image forming section. Unsuccessful performance of this switching causes a jam to occur.

With regard to a structure of the sheet reversing unit that feeds a subsequent sheet into the reversing path while a preceding sheet is fed out from the reversing path, there have been requests for a structure that does not produce noise, a simple structure, or a structure such that sheets are fed out reliably.

When the space between fore-and-aft sheets is to be narrowed by switching back the sheet to be forwarded to the image forming section on the reversing path, it is required to set sheet conveying force by conveying rollers to be high in order not to decrease a sheet conveying speed to a value lower than a set value due to conveying load that acts on the sheet during its conveyance. However, by setting the sheet conveying force to be high, there may be such inconvenience that noise may easily be produced or power consumption may easily be increased. Further, by setting the sheet conveying force to be high, there may occur a problem that the front edge of a sheet that is rigid is forcefully pushed into a nip part of the regist rollers when they are stopped rotating and a position for image formation on the sheet is displaced.

SUMMARY OF THE INVENTION

It is an object of this invention to reliably perform switching between conveying directions of each sheet coming into or going away from a reversing path by reducing a space between sheets continuously fed into an image forming section using a reversing path and a sheet reversing unit.

Another object of this invention is to make compact a structure to switch between conveying directions of each sheet coming into or going away from the reversing path by reducing a space between conveyed sheets using the reversing path and the sheet reversing unit.

A further object of this invention is to simplify a structure to switch between conveying directions of each sheet coming into or going away from the reversing path by reducing a space between conveyed sheets using the reversing path and the sheet reversing unit.

A still further object of this invention is to reduce noise due to feeding out of a sheet from the reversing path by reducing a space between sheets continuously fed into the image forming section using the reversing path and the sheet reversing unit.

A still further object of this invention is to allow sheets to smoothly come into and go away from the reversing path by reducing a space between the sheets continuously fed into the image forming section using the reversing path and the sheet reversing unit.

A still further object of this invention is to simplify a structure of the sheet reversing unit by reducing a space between sheets continuously fed into the image forming section using the reversing path and the sheet reversing unit.

A still further object of this invention is to reliably feed out a sheet from the reversing path by reducing a space between sheets continuously fed into the image forming section using the reversing path and the sheet reversing unit.

A still further object of this invention is to prevent occurrence of noise due to sheet conveyance by reducing sheet conveying force when the sheet is conveyed from the reversing path toward the image forming section.

A still further object of this invention is to reduce power consumption due to sheet conveyance by reducing sheet conveying force when the sheet is conveyed from the reversing path toward the image forming section.

A still further object of this invention is to prevent excessive sheet conveying force from acting on a sheet conveyed from the reversing path toward the image forming section.

In the image formation apparatus according to one aspect of this invention, a sheet separation/feeding unit separates and feeds sheets stacked and stored in a sheet storage section one by one, and the sheet is conveyed along a sheet conveying path. A feeding unit feeds the sheet conveyed along the sheet conveying path to a reversing path, and a sheet reversing unit switches back the sheet to feed it out from the reversing path to the sheet conveying path. The sheet is then fed into an image forming section, where image formation is performed.

Feeding a subsequent sheet into the reversing path can be performed while a preceding sheet is fed out from the reversing path and forwarded to the image forming section. Therefore, feeding out the subsequent sheet from the reversing path to the image forming section can be started at the timing at which the preceding sheet is fed into a predetermined position leading to the image forming section, so that a space between the sheets continuously fed into the image forming section can be reduced, thus improving the operating efficiency in image formation.

The feeding unit feeds the sheet into the reversing path by conveying the sheet along a first guide surface of a branching claw that has been switched to a first switching position. On the other hand, the feeding unit feeds out the sheet from the reversing path by conveying the sheet along a second guide surface of the branching claw that has been switched to a second switching position. Accordingly, switching between conveying directions of each sheet coming into or going away from the reversing path can be reliably performed by using the branching claw.

Further, an inlet roller can impart conveying force to a sheet to be fed into the reversing path.

Further, the branching claw and the inlet roller are positioned close to each other. Therefore, a structure to switch between the sheet conveying directions becomes compact by using the branching claw and the inlet roller.

Further, the sheet fed out from the reversing path can be reliably prevented from entering into a nip between the outer circumferential surface of the inlet roller and the first guide surface of the branching claw, and occurrence of a jam caused by such entrance can be prevented.

Further, by pressing a sheet to be fed into the reversing path against the outer circumferential surface of the inlet roller, conveying force can be imparted to the sheet from the rotated inlet roller, thus impartation of the conveying force to the sheet can be performed with a simple structure.

Further, when a sheet is to be fed into the reversing path, the branching claw is turned from the second switching position to the first switching position by the rigidness of the sheet, and the branching claw automatically returns to the second switching position by the biasing force of the biasing unit when the feeding the sheet into the reversing path is finished. Therefore, the structure to switch the branching claw between the first switching position and the second switching position becomes so simple that only the biasing unit is provided. Furthermore, switching of the branching claw from the first switching position to the second switching position can be quickly and accurately performed in response to finishing of feeding the sheet into the reversing path.

Further, one side of a sheet to be fed into the reversing path is in contact with the outer circumferential surface of the inlet roller, and the other side of the sheet is in contact with the driven roller and the first guide surface of the branching claw. Through this contact of the sheet with the driven roller, the conveying force to be imparted to the sheet can be more increased as compared to the case where the other side of the sheet contacts only the first guide surface of the branching claw, thus smoothly feeding the sheet into the reversing path.

Further, a part of the driven roller projecting from the second guide surface of the branching claw rotates in a sheet forwarding direction that feeds out a sheet along the second guide surface from the reversing path. Therefore, feeding out the sheet from the reversing path can be promoted when the projecting part of the driven roller contacts the surface of the sheet fed out of the reversing path.

The projecting dimension of the driven roller from the second guide surface of the branching claw that is located at the second switching position is a radius or less of the driven roller. Therefore, even when the front edge of the sheet fed out of the reversing path comes into contact with the outer circumferential surface of the driven roller, the front edge of the sheet can be prevented from entering into a nip between the outer circumferential surface of the driven roller and the second guide surface of the branching claw.

Further, the need for a dedicated shaft to support the driven roller is eliminated, thus obtaining a compact structure.

In the image formation apparatus according to another aspect of this invention, a sheet separation/feeding unit separates and feeds sheets stacked and stored in a sheet storage section one by one, and the sheet is conveyed along a sheet conveying path. The sheet conveyed along the sheet conveying path is fed into a reversing path, and a sheet reversing unit switches back the sheet to feed it out from the reversing path to the sheet conveying path. The sheet is then fed into an image forming section, where image formation is performed.

Feeding a subsequent sheet into the reversing path can be performed while a preceding sheet is fed out from the reversing path and forwarded to the image forming section. Therefore, feeding out the subsequent sheet from the reversing path toward the image forming section can be started at the timing at which the preceding sheet is fed into a predetermined position leading to the image forming section, so that a space between the sheets continuously fed into the image forming section can be reduced, thus improving the operating efficiency in image formation.

The driven roller coming into contact with the outer circumferential surface of the inlet roller is rotated with rotation of the inlet roller, and the sheet is nipped with the driven roller and the inlet roller to be fed into the reversing path. This driven roller rotates in a direction that forwards the sheet fed out from the reversing path toward the image forming section positioned on the downstream side of the sheet conveying path. Therefore, even when the sheet fed out of the reversing path touches the driven roller, the sheet can be smoothly fed out from the reversing path. Accordingly, switching between the conveying directions of each sheet coming into or going away from the reversing path can be reliably performed with a simple structure having the inlet roller and the driven roller that comes into contact with the outer circumferential surface of the inlet roller and rotates together with the inlet roller.

Further, even when the front edge of the sheet fed out of the reversing path touches the outer circumferential surface of the driven roller, the sheet proceeds along the outer circumferential surface of the driven roller in the direction that forwards the sheet toward the image forming section positioned on the downstream side of the sheet conveying path. Thus, the sheet can be prevented from entering into a nip between the outer circumferential surface of the driven roller and the outer circumferential surface of the inlet roller.

Further, even when the front edge of the sheet touches any part, that is close to the inlet roller, on the outer circumferential surface of the driven roller caused by a curl or a folded part of the front edge of the sheet fed out of the reversing path, the sheet front edge is caught by a sheet front edge catching part formed on the outer circumferential surface of the driven roller. Therefore, the sheet front edge is conveyed to a position, with the rotation of the driven roller, where the sheet is forwarded toward the image forming section positioned on the downstream side of the sheet conveying path, thus smoothly forwarding the sheet fed out of the reversing path.

In the image formation apparatus according to still another aspect of this invention, a sheet separation/feeding unit separates and feeds sheets stacked and stored in a sheet storage section one by one, and the sheet is conveyed along a sheet conveying path. The sheet conveyed along the sheet conveying path is fed into a reversing path, and a sheet reversing unit switches back the sheet to feed it out from the reversing path to the sheet conveying path. The sheet is then fed into an image forming section, where image formation is performed.

Feeding a subsequent sheet into the reversing path can be performed while a preceding sheet is fed out from the reversing path and forwarded to the image forming section. Therefore, feeding out the subsequent sheet from the reversing path to the image forming section can be started at the timing at which the preceding sheet is fed into a predetermined position leading to the image forming section, so that a space between the sheets continuously fed into the image forming section can be reduced, thus improving the operating efficiency in image formation.

The sheet is fed into the reversing path in a state where the sheet is nipped with the inlet roller and a belt. Therefore, a nip width of the sheet nipped with the inlet roller and the belt can be widened, thus smoothly feeding even a rigid sheet into the reversing path.

Further, the sheet fed out of the reversing path can be prevented from entering into the nip between the outer circumferential surface of the inlet roller and the belt, thus smoothly forwarding the sheet fed out from the reversing path.

Further, a larger conveying force can be imparted to the sheet through rotation of the belt, thus more smoothly feeding the sheet into the reversing path.

In the image formation apparatus according to still another aspect of this invention, a sheet separation/feeding unit separates and feeds sheets stacked and stored in a sheet storage section one by one, and the sheet is conveyed along a sheet conveying path. The sheet conveyed along the sheet conveying path is fed into a reversing path, and a sheet reversing unit switches back the sheet to feed it out from the reversing path to the sheet conveying path. The sheet is then fed into an image forming section, where image formation is performed.

Feeding a subsequent sheet into the reversing path can be performed while a preceding sheet is fed out from the reversing path and forwarded to the image forming section. Therefore, feeding out the subsequent sheet from the reversing path toward the image forming section can be started at the timing at which the preceding sheet is fed into a predetermined position leading to the image forming section, so that a space between the sheets continuously fed into the image forming section can be reduced, thus improving the operating efficiency in image formation.

The sheet enters, by the rigidness of its own, into the nip between the outer circumferential surface of the inlet roller and a blade, and is imparted with the conveying force from the inlet roller to be fed into the reversing path. Furthermore, the sheet is fed out of the reversing path so that the sheet proceeds along the rear side of the blade whose the other side is in contact with the inlet roller. Therefore, switching between the conveying directions of each sheet coming into or going away from the reversing path can be reliably performed with a simple structure having the inlet roller and the blade that is pressed against the outer circumferential surface of the inlet roller.

Further, there is no need to additionally provide a unit for pressing the blade against the outer circumferential surface of the inlet roller, thus obtaining a simpler structure.

Further, the blade can be made of a high slip material, thus smoothly feeding the sheet into the reversing path by passing the sheet through between the inlet roller and the blade.

Further, the blade is in close contact with the outer circumferential surface of the inlet roller, and the sheet fed out of the reversing path can be prevented from being caught on the blade, thus smoothly switching between the sheet conveying directions.

Further, the sheet fed out of the reversing path can be more reliably prevented from being caught on the blade, thus more smoothly switching between the sheet conveying directions.

Further, a subsequent sheet can be in a standby state where the sheet is ready to be fed out of the reversing path during feeding out of a preceding sheet from the reversing path. Therefore, when the subsequent sheet is switched back to be fed out of the reversing path, the required smallest possible space with the preceding sheet can be surely maintained, thus making sufficiently smaller the space between the sheets continuously fed into the image forming section.

Further, in accordance with the image formation apparatus, the reversing path is formed in a direction substantially perpendicular to the sheet conveying path formed in a vertical direction between the sheet storage section and the image forming section. Therefore, this reversing path can be formed so as to be positioned within a projection plane of the image forming section. Accordingly, the lateral dimension of the image formation apparatus is not increased despite formation of such a reversing path, thus achieving minimization of the image formation apparatus in lateral dimension.

Further, the image formation apparatus provided with the image forming section based on an electrophotographic system obtains the same advantageous effect as that of any of the above-mentioned aspects of this invention.

Further, the image formation apparatus provided with the image forming section based on a digital electrophotographic system with a digital writing unit obtains the same advantageous effect as that of any of the above-mentioned aspects of this invention.

The copying machine according to still another aspect of this invention also obtains the same advantageous effect as that of any of the above-mentioned aspects of this invention.

In the image formation apparatus according to still another aspect of this invention, a sheet separation/feeding unit separates and feeds sheets stacked and stored in a sheet storage section one by one, and the sheet is conveyed along a sheet conveying path. The sheet conveyed along the sheet conveying path is fed into a reversing path, and a sheet reversing unit switches back the sheet to feed it out from the reversing path to the sheet conveying path. The sheet is then fed into an image forming section, where image formation is performed.

Feeding a subsequent sheet into the reversing path can be performed during feeding out of a preceding sheet from the reversing path. Therefore, feeding out the subsequent sheet from the reversing path toward the image forming section can be started at the timing at which the preceding sheet is fed into a predetermined position leading to the image forming section, so that a space between the sheets continuously fed into the image forming section can be reduced, thus improving the operating efficiency in image formation.

The sheet is fed out of the reversing path by nipping the sheet with a part except a low friction part of a reverse roller and a driven roller and rotating the reverse roller. Therefore, the sheet can be smoothly fed out by imparting the sufficient conveying force to the sheet. Furthermore, at the time of feeding out the sheet from the reversing path, only the reverse roller is rotated. Therefore, occurrence of noise due to a collision between the reverse roller and the driven roller can be prevented.

When no more conveying force needs to be imparted to the sheet from the reverse roller because the sheet has been forwarded to a predetermined position, the reverse roller is stopped to be rotated at a position where the low friction part of the reverse roller faces the driven roller. Frictional resistance with respect to the sheet passing through between these low friction part of the reverse roller and driven roller is low. Therefore, even when the rear side of the sheet fed out of the conveying path in the forwarding direction is nipped with the low friction part and the driven roller, the sheet smoothly proceeds. Furthermore, the subsequent sheet can be smoothly fed into the nip between the low friction part of the reverse roller and the driven roller.

Further, a subsequent sheet can be in a standby state where the sheet is ready to be fed out of the reversing path during feeding out of a preceding sheet from the reversing path. Therefore, when the subsequent sheet is switched back to be fed out of the reversing path, the required smallest possible space with the preceding sheet can be surely maintained, thus making sufficiently smaller the space between the sheets continuously fed into the image forming section.

Further, by facing a flat part toward the driven roller, a space between the reverse roller and the driven roller is produced. Therefore, even when the rear side of the sheet fed out of the reversing path in the forwarding direction is left between the reverse roller and the driven roller, the frictional resistance is not imparted to the sheet, thus smoothly feeding out the sheet. Furthermore, a subsequent sheet is allowed to enter into the space between the flat part and the driven roller and is capable of being fed into the reversing path during feeding out of the preceding sheet from the conveying path.

Further, a driving section can rotate the reverse roller, and a rotational position detecting unit can detect a rotational position of the reverse roller. Therefore, rotation and stop of the reverse roller can be controlled with high precision.

Further, a rotation stop position of the reverse roller can be more precisely controlled, which makes it possible to surely stop the reverse roller at a position where the flat part faces the driven roller.

Further, when the sheet is fed out of the reversing path, uniform force can be applied to the sheet in its lateral direction, thus preventing a skew of the sheet to be fed out.

Further, one wide roller part is provided to make simpler the structure of the reverse roller.

Further, it is possible to prevent occurrence of a slip at the time of feeding out the sheet from the reversing path, thus precisely feeding out the sheet from the reversing path.

Further, a holding structure of the reverse roller and the driven roller becomes simple.

Further, even if sheets have different thickness, the sheet can securely be nipped with the reverse roller and the driven roller, so that feeding out of the sheet can be surely performed. Furthermore, the driving unit is not coupled to the driven roller. Therefore, even when the driven roller is held movably in directions that contacts and moves away from the reverse roller, the holding structure becomes simple.

Further, the sheet fed out of the reversing path can be securely nipped with the reverse roller and the driven roller. Furthermore, it is possible to prevent occurrence of a skew caused by heavy rubbing of the sheet fed out from the conveying path with the sheet guide surface.

Further, the detection result of a detection sensor can be used as a trigger, thus precisely controlling the timing of reversing the reverse roller.

Further, a detection sensor is positioned at a place close to the reversing path. Therefore, it is possible to precisely control the timing of reversing the reverse roller by using the result of detection from this detection sensor as a trigger for a driving unit.

Further, the time since the detection sensor detects the sheet until the reverse roller is reversed can be reduced.

Therefore, it is possible to more precisely control the timing of driving the reverse roller by using the result of detection from this detection sensor as a trigger for the driving unit.

Further, the image formation apparatus having the image forming section based on the electrophotographic system obtains the same advantageous effect as that of any of the above-mentioned aspects of this invention.

Further, the image formation apparatus having the image forming section based on the digital electrophotographic system with the digital writing unit obtains the same advantageous effect as that of any of the above-mentioned aspects of this invention.

Further, the image formation apparatus having an image forming section based on a non-electrophotographic system obtains the same advantageous effect as that of any of the above-mentioned aspects of this invention.

Further, the image formation apparatus, that performs image formation on a card, obtains the same advantageous effect as that of any of the above-mentioned aspects of this invention.

The printer according to still another aspect of this invention can also obtain the same advantageous effect as that of any of the above-mentioned aspects of this invention.

The copying machine according to still another aspect of this invention can also obtain the same advantageous effect as that of any of the above-mentioned aspects of this invention.

The facsimile device according to still another aspect of this invention can also obtain the same advantageous effect as that of any of the above-mentioned aspects of this invention.

Further, in the image formation apparatus, a sheet separation/feeding unit separates and feeds sheets stacked and stored in a sheet storage section one by one, and the sheet is conveyed along a sheet conveying path. The sheet conveyed along the sheet conveying path is fed into a reversing path, where the sheet is temporarily stopped, and a sheet reversing unit then switches back the sheet to feed it out from the reversing path to an image forming section. Image formation is perform on the sheet fed into the image forming section.

Feeding a subsequent sheet into the reversing path is performed during feeding out of a preceding sheet from the reversing path when the sheet reversing unit is brought to an open state. Therefore, when the subsequent sheet is fed out of the reversing path, a space between the two sheets successively fed into the image forming section can be reduced with stability by controlling a sheet forwarding timing and a sheet forwarding speed, thus improving the operating efficiency in image formation.

The sheet fed out of the reversing path is captured by intermediate conveying rollers immediately before the sheet reversing unit is brought to the open state. These intermediate conveying rollers convey the sheet, whose rear side in its conveying direction is released, toward the image forming section.

The intermediate conveying rollers nip and convey the sheet whose rear side in the conveying direction is released, so that conveying load is not acted on the sheet during this conveyance. Therefore, even if the sheet conveying force of the intermediate conveying rollers is reduced, sheet conveyance can be smoothly performed. Furthermore, by reducing the sheet conveying force, occurrence of noise due to the sheet conveyance can be prevented, and power consumption required for the sheet conveyance can be reduced.

Further, the sheet reversing unit consisting of the reverse roller and the driven roller is brought to a sheet forwarding state when the driven roller is brought into contact with the outer circumferential surface of the reverse roller and is rotated together with the reverse roller, and is brought to an open state when the flat part of the reverse roller faces the driven roller to produce a space between the flat part and the outer circumferential surface of the driven roller.

Further, the sheet reversing unit is brought to a sheet forwarding state when a beat roller pair is moved to a position where the outer circumferential surfaces of the beat roller pair come into contact with the sheet to nip the sheet, and is brought to an open state when the roller pair is moved to a position where it is separated away from the sheet.

Further, when the intermediate conveying rollers enter into a state where an excessive sheet conveying force is acted on the rollers, no-load operation occurs in a toque limiter. Therefore, an excessive sheet conveying force is prevented from acting on the sheet conveyed from the reversing path toward the image forming section.

Further, after the front edge of the sheet conveyed by the intermediate conveying rollers comes into contact with regist rollers disposed at a position immediately before the image forming section, the intermediate conveying rollers become slippery with respect to the sheet. Thus, the sheet front edge can be prevented from being pushed into the nip part between the regist rollers or from being folded due to impartation of the excessive sheet conveying force from the intermediate conveying rollers to the sheet.

Other objects and features of this invention will become understood from the following description with reference to the accompanying drawings.

BRIEF DESCRIPTION OF THE DRAWINGS

FIG. 5 is a block diagram showing an electrical connection of a control system relating to sheet conveyance in the image formation apparatus;

FIG. 35A and FIG. 35B are front views for explaining an operating state of the sheet reversing unit, in which FIG. 35A shows an open state and FIG. 35B shows a sheet forwarding state;

FIG. 39A and FIG. 39B are front views for explaining an operating state of a sheet reversing unit for an image formation apparatus according to a twenty-first embodiment of this invention, in which FIG. 39A shows an open state and FIG. 39B shows a sheet forwarding state.

DETAILED DESCRIPTION OF THE PREFERRED EMBODIMENTS

A first embodiment of this invention will be explained below with reference to FIG. 1 to FIG. 8. This embodiment is applied to an image formation apparatus based on a digital electrophotographic system provided with a digital writing unit.

Figure 1:
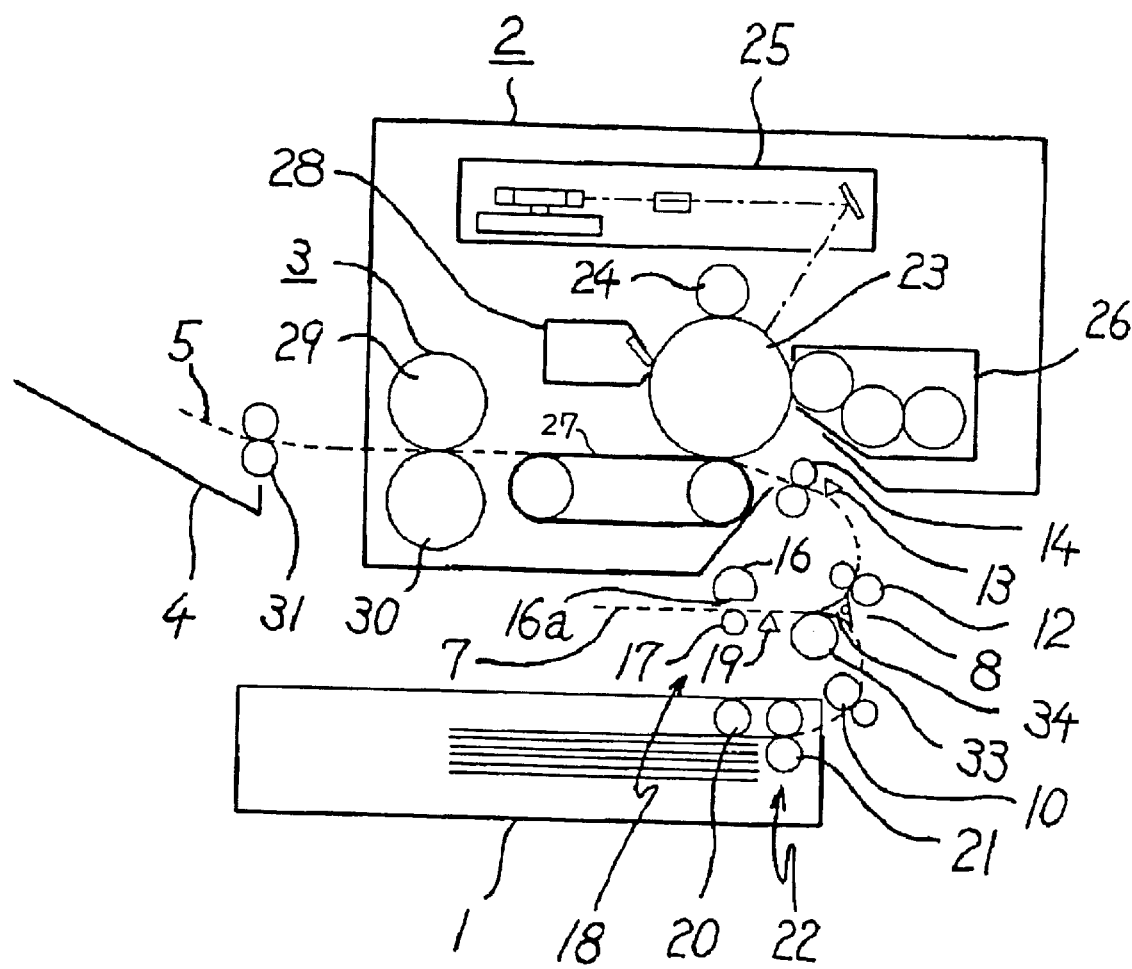
FIG. 1 is a front view schematically showing a structure of an image formation apparatus according to a first embodiment of this invention.

FIG. 1 is a front view schematically showing the structure of the image formation apparatus according to the first embodiment. The image formation apparatus has a conveying path 5 from a sheet feed tray 1 as a sheet storage section that stacks and stores sheets to a discharged sheet stacker section 4 that discharges a sheet with a formed image. More specifically, this conveying path 5 is formed between the two sections through an image forming section 2 that forms an image on a sheet based on the electrophotographic system and a fixing section 3 that fixes the formed image on the sheet. A path from the sheet feed tray 1 up to the image forming section 2 of the conveying path 5 is set as a sheet conveying path 6.

A branching point 8 is provided on some midpoint of the sheet conveying path 6. This branching point 8 branches a reversing path 7 whose rearmost part is a dead end. Conveying rollers 10 driven by a motor (see FIG. 5) 9 to convey the sheet are disposed on the upstream side from this branching point 8 on the sheet conveying path 6. Conveying rollers 12 driven by a motor (see FIG. 5) 11 are disposed on the downstream side from this branching point 8 on the sheet conveying path 6 so as to convey the sheet switched back on the reversing path 7 to the image forming section 2. Regist rollers 14, that perform a registration operation such that the timing of conveying the sheet detected by a regist sensor 13 explained later to the image forming section 2 is synchronized to an image forming operation, are also disposed on the downstream side from the branching point 8 on the sheet conveying path 6. The regist sensor 13 is disposed on the upstream side in the sheet conveying direction from the regist rollers 14. The regist sensor 13 of this embodiment is a reflection type optical sensor that comprises a light-emitting device (not shown) for emitting light and a light-receiving device (not shown) for receiving the light emitted by the light-emitting device. This regist sensor 13 detects each sheet through such steps that a sheet is conveyed, light emitted by the light-emitting device is reflected by the sheet, and the reflected light is received by the light-receiving device.

A sheet reversing device 18 as a sheet reversing unit is disposed on the reversing path 7. More specifically, this sheet reversing device 18 comprises a reverse roller 16 whose outer circumferential part is partially cut, and which is intermittently driven by a motor (see FIG. 5) 15, and a driven roller 17 disposed at a position facing the reverse roller 16 through the reversing path 7 and driven together with this reverse roller when brought into contact with the part except the flat part 16a of the reverse roller 16. The sheet reversing device 18 switches back and feeds out the sheet fed into the reversing path 7 from the reversing path 7.

Figure 4:
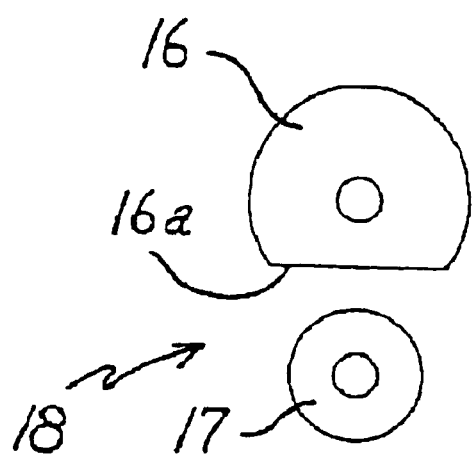
FIG. 4A and FIG. 4B are front views for explaining an operating state of the sheet reversing unit.
Figure 4B:
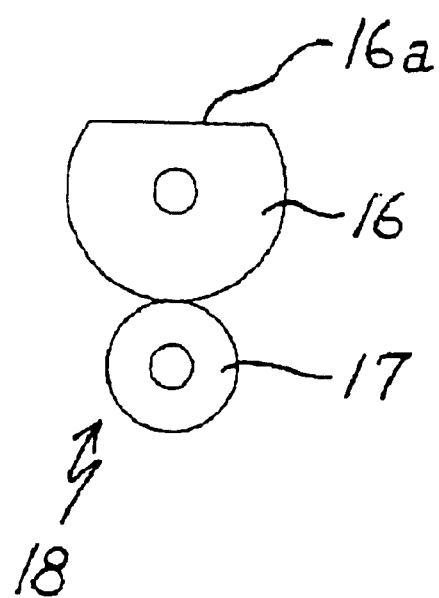

FIG. 4A and FIG. 4B are front views showing an outline of the sheet reversing device 18. As shown in FIG. 4A, when the flat part 16a of the reverse roller 16 faces the driven roller 17, the sheet is allowed to be fed into the reversing path 7. As shown in FIG. 4B, when the outer circumferential surface of the reverse roller 16 and the outer circumferential surface of the driven roller 17 contact each other, the driven roller 17 is driven as the reverse roller 16 is rotated, and the sheet is fed out of the reversing path 7. A sheet detection sensor 19, that controls the timing of feeding the sheet into or out from the reversing path, is disposed on the reversing path 7. This sheet detection sensor 19 is a reflection type optical sensor having the same structure as that of the regist sensor 13.

A sheet separation/feeding device 22 as a sheet separation/feeding unit is disposed on the downstream side of the sheet feed tray 1 in the sheet conveying direction. More specifically, this sheet separation/feeding device 22 comprises a pickup roller 20 that picks up the stacked and stored sheets, and a separation roller 21 that separates the picked-up sheets into one each.

The image forming section 2 comprises a photoreceptor 23 with an image to be formed on its surface, a charger 24 that charges uniformly the photoreceptor 23, and a digital optical writing device 25 as a digital writing unit that optically writes an electrostatic latent image on the photoreceptor 23. This image forming section 2 also comprises a developing unit 26 that forms a toner image by depositing toner on the electrostatic latent image on the photoreceptor 23, a transfer unit 27 that transfers the developed toner image to the sheet, and a cleaning device 28 that removes the remaining toner from the photoreceptor 23. This image forming section 2 forms an image on the sheet through digital electrophotographic process.

The fixing section 3 has a pressurizing roller 29 that fixes the toner image transferred to the sheet thereon and a heating roller 30. Sheet discharge rollers 31, that discharge the sheet with the fixed toner image to a discharged sheet stacker section 4, are disposed on the downstream side from the fixing section 3 in the sheet conveying direction.

A plurality of inlet rollers 33 as a feeding unit and branching claws are disposed near the branching point 8. The inlet rollers 33 are driven by a motor (see FIG. 5) 32 to feed the sheet conveyed along the sheet conveying path 6 into the reversing path 7. These inlet rollers 33 and the branching claws 34 are explained with reference to FIG. 2 and FIG. 3.

Inlet guide plates 35a and 35b, which turn the sheet conveyed along the sheet conveying path 6 by about 90 degrees toward the reversing path 7, are disposed in positions immediately before the branching point 8 on the sheet conveying path 6. The inlet rollers 33 and the branching claws 34 are arranged in positions where the direction of travel along the inlet guide plates 35a and 35b is turned by about 90 degrees. The inlet rollers 33 are always rotated in the direction that feeds the sheet into the reversing path 7.

Each of the branching claws 34 is made of a high slip material such as polyacetal. This branching claw 34 is formed in a substantial triangle having a first guide surface 34a facing the sheet fed into the reversing path 7, a second guide surface 34b facing the sheet fed out of the reversing path 7, and an acute branching claw tip part 34c formed with the first guide surface 34a and the second guide surface 34b and directed toward the reversing path 7. The branching claws 34 are fixed to a supporting shaft 36 disposed adjacent to a central shaft 33a of the inlet rollers 33 and in parallel to this central shaft 33a, and the supporting shaft 36 is pivotally supported by bearings (not shown). One end of an arm 37 is fixed to the end of the supporting shaft 36, and one end of a spring 38 as a biasing unit is engaged with the other end of the arm 37. A stopper 39 for restricting a pivotal position of the arm 37 is disposed at a position in the direction to which the arm 37 pivots by the biasing force of the spring 38.

Figure 2:
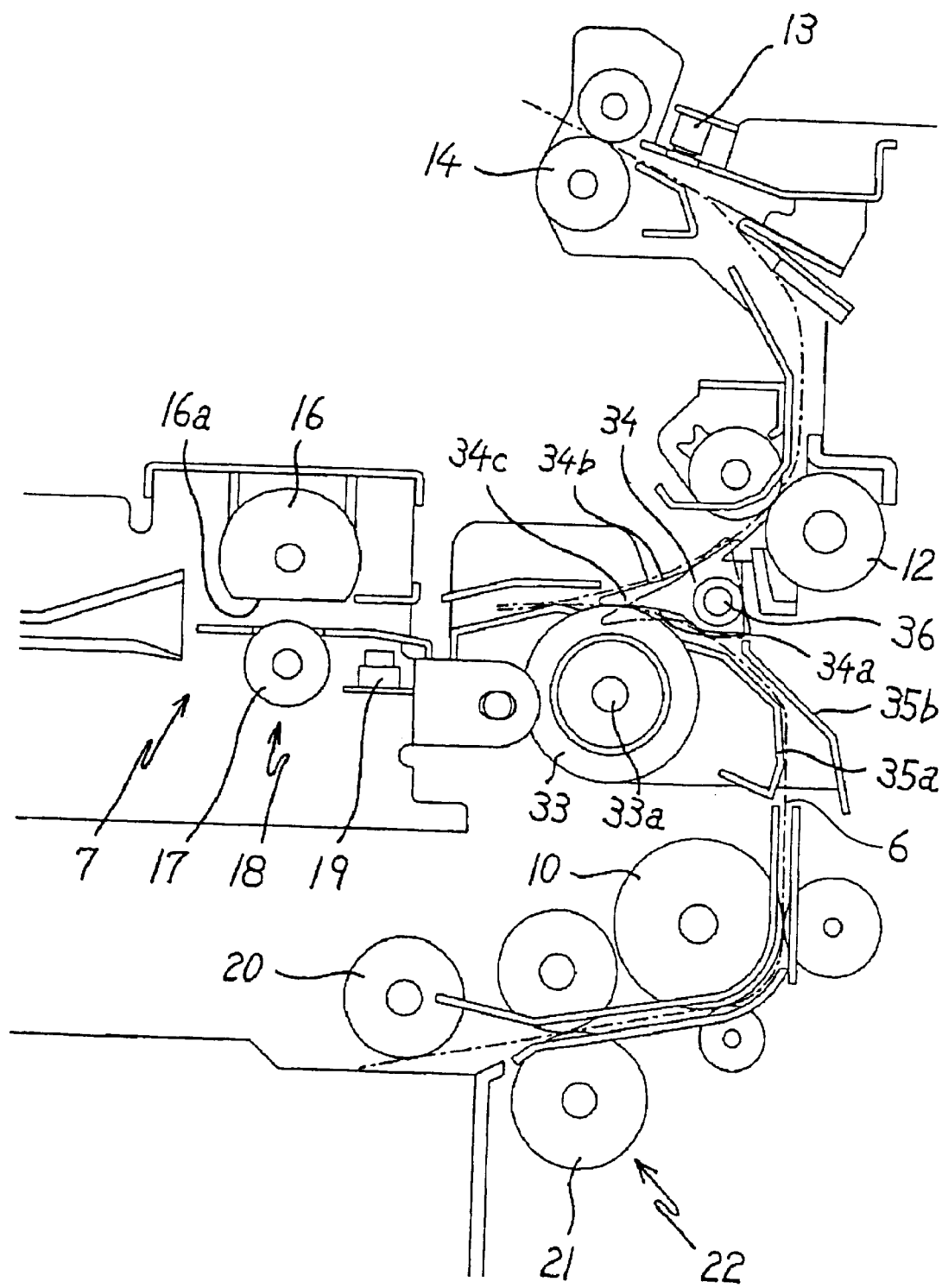
FIG. 2 is a front view of an enlarged key section of this apparatus.
Figure 3:
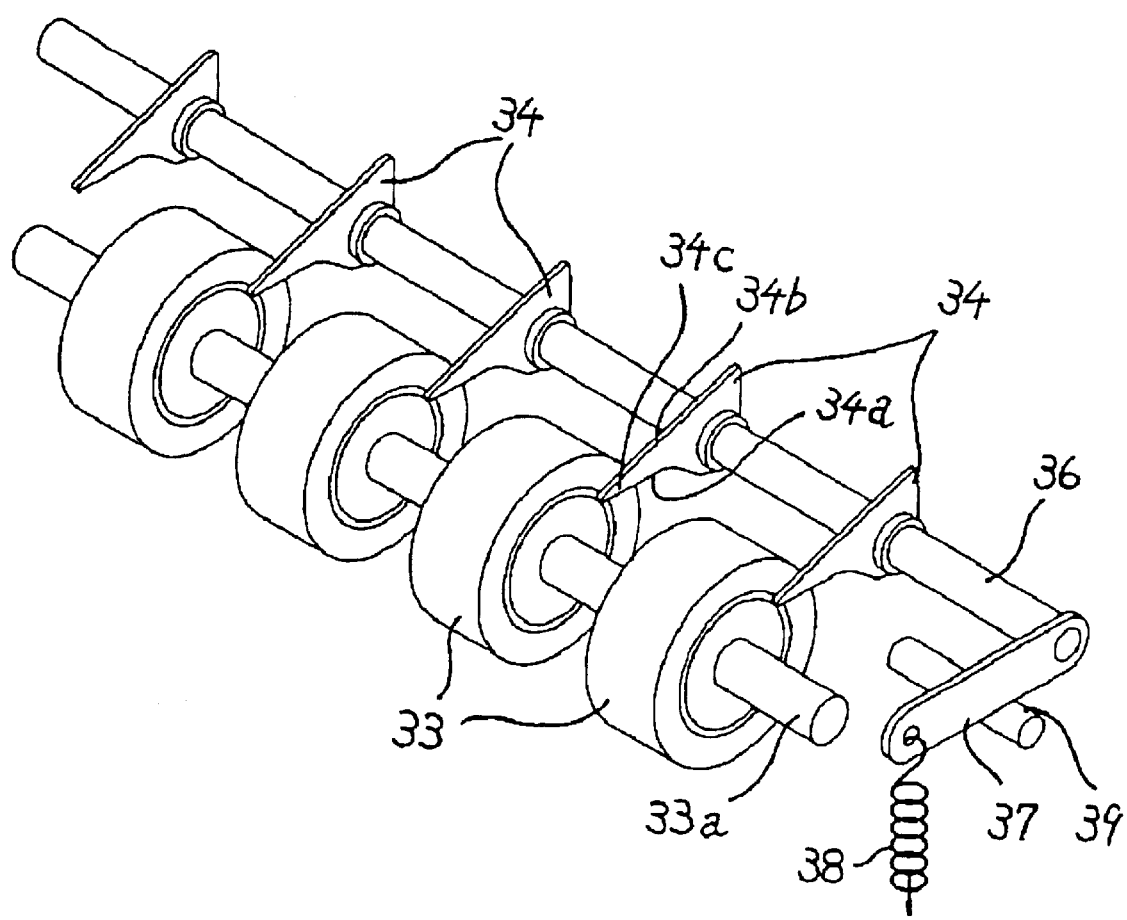
FIG. 3 is a perspective view showing how to arrange inlet rollers and branching claws.

Each of the branching claws 34 is provided pivotally around the shaft center of the supporting shaft 36, and pivots together with the supporting shaft 36 so as to be switched between a first switching position (position indicated by the solid line in FIG. 2) and a second switching position (position indicated by the phantom line in FIG. 2).

The first switching position is a pivotal position when the sheet t be fed into the reversing path 7 is proceeding between the outer circumferential surfaces of the inlet rollers 33 and the first guide surfaces 34a of the branching claws 34. The second switching position is a pivotal position when there is no sheet between the outer circumferential surfaces of the inlet rollers 33 and the first guide surfaces 34a of the branching claws 34.

When the branching claws 34 are turned to the second switching position, each branching claw tip part 34c is positioned inwardly from the outer circumferential surface of the inlet roller 33 as indicated by the phantom line. The biasing force of the spring 38 acts on the branching claw 34. More specifically, this biasing force acts on the sheet, which is to be fed into the reversing path 7 by passing through between the first guide surfaces 34a of the branching claws 34 and the outer circumferential surfaces of the inlet rollers 33, in the direction that presses the sheet against the outer circumferential surfaces of the inlet rollers 33. The biasing force of this spring 38 is set to such strength that each branching claw 34 positioned at the first switching position by the rigidness of the sheet to be fed into the reversing path 7 can be turned to the second switching position.

FIG. 5 is a block diagram showing an electrical connection of a control system relating to sheet conveyance of the sections in the image formation apparatus. The control system relating to the sheet conveyance has a microcomputer 40 that centralizes controls for the whole. The microcomputer 40, not shown, has a structure with ROM that previously stores fixed data such as programs and RAM that can rewrite and store variable data such as a time counted by a timer which are connected to its CPU that centralizes controls for the driving of the sections. This microcomputer 40 is connected with a motor driver 41 that drives a motor 9 for rotating the conveying rollers 10, motor driver 42 that drives a motor 11 for rotating the conveying rollers 12, motor driver 43 that drives a motor 15 for rotating the reverse rollers 16, motor driver 44 that drives a motor 32 for rotating the inlet rollers 33, the sheet detection sensor 19, and the regist sensor 13, or the like.

Based on such a structure, the sheets stacked and stored in the sheet feed tray 1 are separated and fed by the sheet separation/feeding device 22 one by one, and the separated and fed sheets are continuously conveyed along the sheet conveying path 6 by the conveying rollers 10.

When the front edge of the sheet conveyed along the sheet conveying path 6 reaches the branching point 8, the front edge of the sheet touches the first guide surfaces 34a of the branching claws 34 turned to the second switching position. The branching claws 34 are pushed up by the rigidness of the sheet to be turned to the first switching position, and the sheet passes through between the first guide surfaces 34a and the outer circumferential surfaces of the inlet rollers 33 to be fed into the reversing path 7. When the sheet is passing through between the first guide surfaces 34a and the outer circumferential surfaces of the inlet rollers 33, the branching claws 34 press the sheet against the outer circumferential surfaces of the inlet rollers 33 by the biasing force of the spring 38. Accordingly, conveying force is imparted from the rotating inlet rollers 33 to the sheet, and the sheet is fed into the reversing path 7.

When the rear edge of the sheet to be fed into the reversing path 7 has passed through between the first guide surfaces 34a and the outer circumferential surfaces of the inlet rollers 33, the branching claws 34 are automatically turned to the second switching position by the biasing force of he spring 38. Turning the branching claws 34 to the second switching position makes the branching claw tip parts 34c of the branching claws 34 positioned inwardly from the outer circumferential surfaces of the inlet rollers 33. Therefore, when the sheet is fed out of the reversing path 7, the front edge of the sheet can surely be prevented from entering into the nip between the outer circumferential surfaces of the inlet rollers 33 and the first guide surfaces 34a of the branch claws 34. Thus, the sheet can be smoothly fed out from the reversing path 7 toward the image forming section 2.

The reverse roller 16 is driven at the timing at which the preceding sheet is fed into a predetermined position leading to the image forming section 2, and the sheet is fed out of the reversing path 7. The sheet fed out of the reversing path 7 is sent out toward the image forming section 2 along the second guide surfaces 34b of the branching claws 34 turned to the second switching position. During this feeding out of the sheet, as explained above, the branching claw tip parts 34c are positioned inwardly from the outer circumferential surfaces of the inlet rollers 33. Thus, the front edge of the sheet can be surely prevented from entering into the nip between the outer circumferential surfaces of the inlet rollers 33 and the first guide surfaces 34a of the branching claws 34.

After the reverse roller 16 is driven and the sheet is started to be fed out, the reverse roller 16 is stopped at the timing at which the reverse roller rotates one turn. The front edge of the sheet in its conveying direction at this time is fed out as far as a position where the sheet is nipped with the conveying rollers 12. Therefore, the sheet is conveyed toward the image forming section 2 by the conveying force of the conveying rollers 12. The reverse roller 16 is stopped at the position where its flat part 16a faces the driven roller 17 as shown in FIG. 4A. Therefore, a subsequent sheet can be fed into the reversing path 7 after the reverse roller 16 is stopped at the position as shown in FIG. 4A even when the sheet is being fed out from the reversing path 7.

Figure 6:
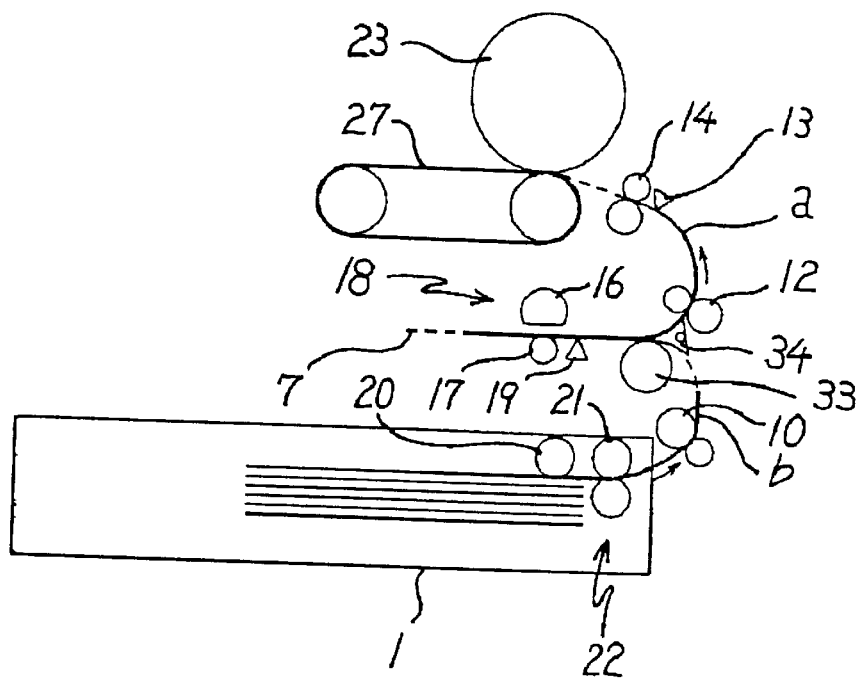
FIG. 6 shows a flow of each sheet when the sheets are continuously conveyed.
Figure 7:
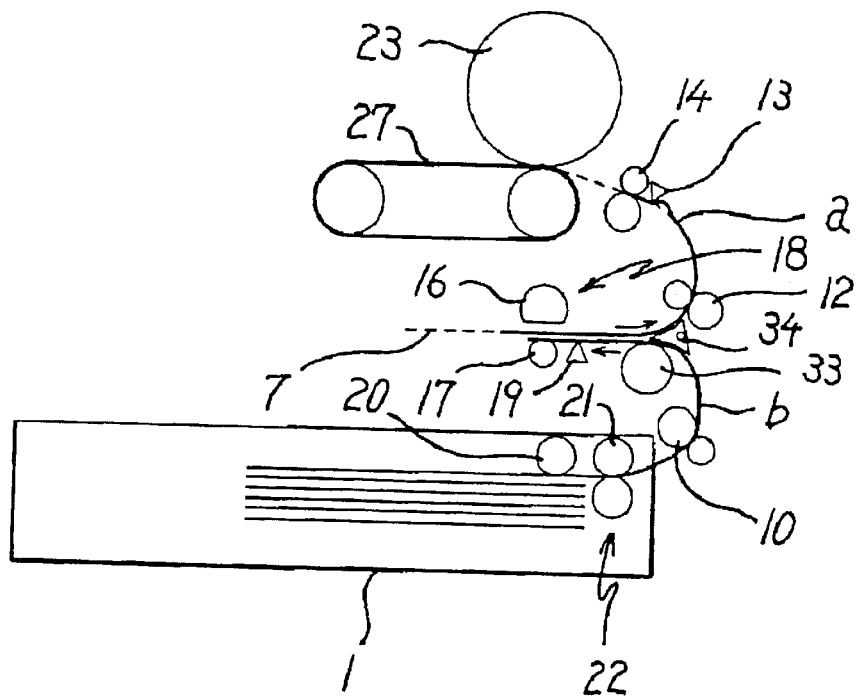
FIG. 7 shows a flow of each sheet when the sheets are continuously conveyed.

FIG. 6 and FIG. 7 show a flow of each sheet when the sheets are continuously conveyed. A subsequent sheet b is conveyed toward the reversing path 7 concurrently when a preceding sheet a is fed out from the reversing path 7 to the sheet conveying path 6. The preceding sheet a is imparted with conveying force by the reverse roller 16 first, and after the reverse roller 16 is stopped at the position as shown in FIG. 4A, the sheet is imparted with conveying force by the conveying rollers 10, and is conveyed. On the other hand, the subsequent sheet b is imparted with conveying force by the conveying rollers 10 and the inlet rollers 33, and is fed into the reversing path 7. Since the reverse roller 16 is stopped at the position of FIG. 4A, the subsequent sheet b can smoothly be fed into the reversing path 7 even when the rear edge of the preceding sheet a is positioned within the reversing path 7. Accordingly, the two sheets conveyed in opposite directions can be made overlap each other within the reversing path 7, and a space between the preceding sheet a and the subsequent sheet b can be reduced. The sheet b to be fed into the reversing path 7 proceeds between the first guide surfaces 34a of the branching claws 34 and the outer circumferential surfaces of the inlet rollers 33, while the sheet a fed out of the reversing path 7 proceeds along the second guide surfaces 34b of the branching claws 34.

The sheet fed out of the reversing path 7 is conveyed by the conveying rollers 12 and temporarily stops after a predetermined time since the regist sensor 13 detects the front edge of the sheet. The sheet front edge is brought into contact with the regist rollers 14, as shown in FIG. 7, while the sheet front edge is slightly warped due to elasticity of the sheet itself.

The regist rollers 14 are rotated in step with starting of image formation in the image forming section 2, and the sheet is conveyed in sync with image formation.

Figure 8:
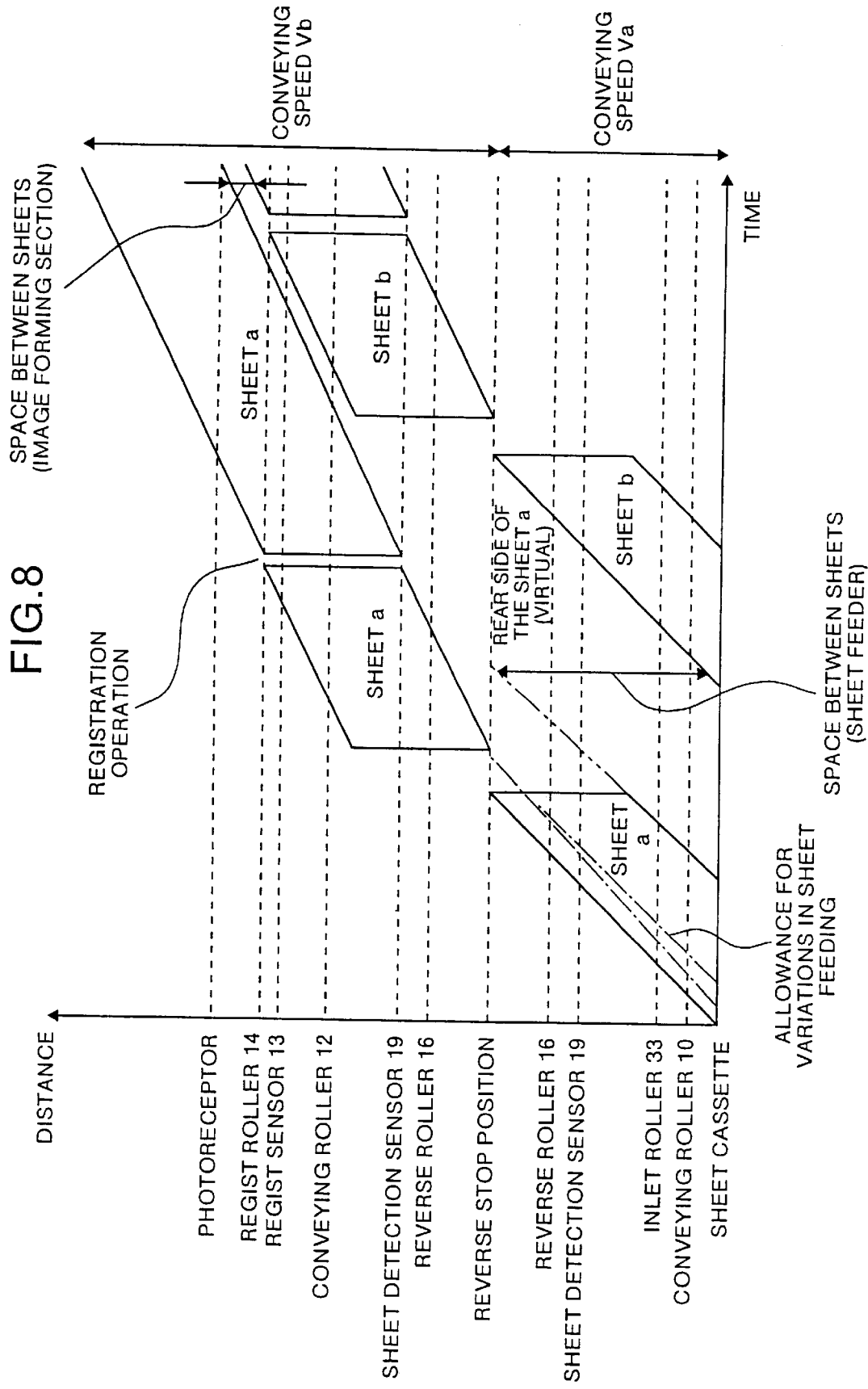
FIG. 8 is a diagram showing sheet conveying operation.

FIG. 8 is a diagram showing the sheet conveying operation. The sheet is conveyed at a speed Va by the conveying rollers 10 and the inlet rollers 33 from the sheet feed tray 1 to the reverse stop position within the reversing path 7, and the sheet is conveyed at a speed Vb, which is equivalent to an image forming speed, by the reverse roller 16 and the conveying rollers 12 from the reverse stop position to the image forming section 2. The speed Va is set to such a sheet conveying speed as to convey the sheet faster than the speed Vb. The sheet to be conveyed to the image forming section 2 has to be synchronized to the image forming speed. Therefore, it is essential that the sheet conveying speed is set to the speed Vb on the downstream side from the regist rollers 14 in the sheet conveying direction. The sheet conveying speed Va is set to be faster than the sheet conveying speed Vb and the image forming speed Vb within a path from the sheet feed tray 1 to the reverse stop position in order to improve productivity of image formation.

In this embodiment, explanation has been given by taking the sheet reversing device 18, as an example, in which the reverse roller 16 is positioned on the upper side and the driven roller 17 is positioned on the lower side. However, conversely to this arrangement, the reverse roller 16 may be positioned on the lower side and the driven roller 17 may be positioned on the upper side. When an image is to be formed on the other side of the sheet with an image formed on its one side, by positioning the reverse roller 16 on the lower side, the surface of the sheet where the image has been formed (upward surface within the reversing path 7) contacts the driven roller 17. Therefore, the surface of the sheet where the image has been formed can be prevented from damaging the image caused by being heavily rubbed with the rotating reverse roller 16.

Figure 9:
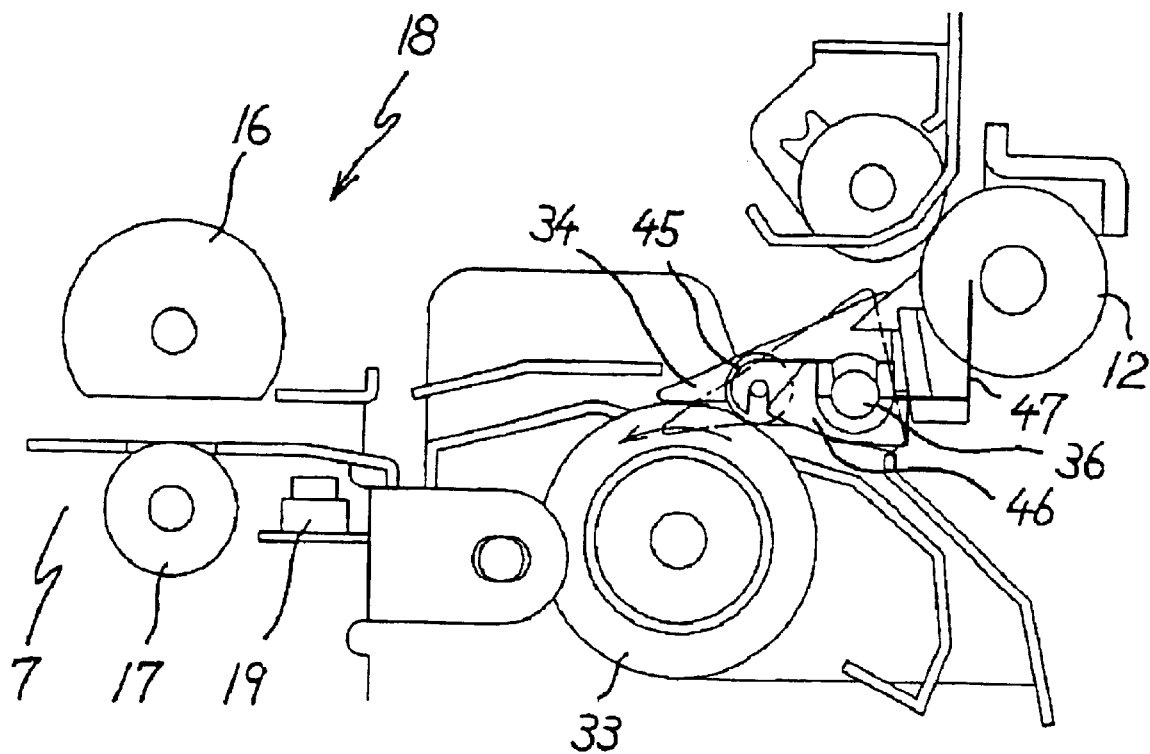
FIG. 9 is a front view showing a structure of a key section of an image formation apparatus according to a second embodiment of this invention.

A second embodiment of this invention will be explained below with reference to FIG. 9. The same legends are assigned to those corresponding to the sections explained in the first embodiment, and explanation is omitted (the same in the following embodiments).

This embodiment has a structure obtained by adding a driven roller 45 to the structure of the first embodiment. The driven roller 45 is provided by one at the central part in the direction of the sheet width perpendicular to the sheet conveying direction, or by two at positions symmetrical with respect to the direction of the sheet width. The driven roller 45 is supported by a bracket 46, which is attached to the supporting shaft 36 so as to be pivotal around the shaft center of the supporting shaft 36. The bracket 46 is biased by a leaf spring 47, and the driven roller 45 is elastically in contact with the outer circumferential surface of the inlet roller 33 by the biasing force of this leaf spring 47. The sheet to be fed into the reversing path 7 passes through between the first guide surface 34a of the branching claw 34 and the outer circumferential surface of the inlet roller 33 as explained in the first embodiment, and passes through a contact part between the outer circumferential surface of the driven roller 45 and the outer circumferential surface of the inlet roller 33.

When the branching claw 34 is located at the second switching position (position indicated by the phantom line), a part of the driven roller 45 is projected by less than its radius from the second guide surface 34b of the branching claw 34.

Based on such a structure, when the sheet is fed into the reversing path 7, one side of the sheet is in contact with the outer circumferential surface of the inlet roller 33, while the other side of the sheet is in contact with the outer circumferential surface of the driven roller 45 and the first guide surface 34a of the branching claw 34. Accordingly, the conveying force with respect to the sheet can be increased more as compared to the case where the other side of the sheet is only in contact with the first guide surface 34a of the branching claw 34 as explained in the first embodiment. Thus, the sheet can be smoothly fed into the reversing path 7.

The part of the driven roller 45 projecting from the second guide surface 34b of the branching claw 34 rotates along the direction that feeds out the sheet from the reversing path 7. Therefore, the feeding out the sheet from the reversing path 7 is promoted through contact of the surface of the fed out sheet with the driven roller 45.

Further, the dimension of the part of the driven roller 45 projecting from the second guide surface 34b of the branching claw 34 located at the second switching position is a radius of the driven roller 45 or less. Therefore, even when the front edge of the sheet fed out of the reversing path 7 comes into contact with the outer circumferential surface of the driven roller 45, the front edge of the sheet proceeds along the outer circumferential surface of the driven roller 45 in association with its rotation. Thus, the sheet can be prevented from entering into the nip between the outer circumferential surface of the driven roller 45 and the second guide surface 34b of the branching claw 34.

Figure 10:
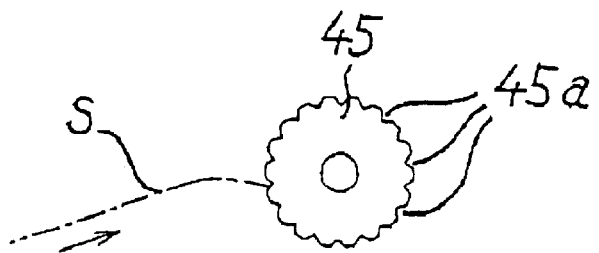
FIG. 10 is a front view showing a driven roller used in an image formation apparatus according to a third embodiment of this invention.

A third embodiment of this invention will be explained below with reference to FIG. 10. This embodiment is provided by forming a sheet front edge catching part 45a on the outer circumferential surface of the driven roller 45. More specifically, when the front edge of the sheet fed out of the reversing path 7 comes into contact with the driven roller 45, the sheet front edge is caught by the sheet front edge catching part 45a. The sheet front edge catching part 45a of this embodiment is formed with a plurality of grooves extending in parallel to the shaft center of the driven roller 45 whose cross section is a gear like shape. However, any shape such as a structure with a plurality of projections may be used if the shape can catch the front edge of the sheet S coming into contact with the outer circumferential surface of the driven roller 45.

Based on such a structure, a sheet S fed out of the reversing path 7 may be curled or folded toward the inlet roller 33, and when the front edge of such a sheet S comes into contact with the outer circumferential surface of the driven roller 45, the sheet may enter into the nip between the outer circumferential surface of the driven roller 45 and the second guide surface 34b of the branching claw 34, which may cause a jam.

However, by forming the sheet front edge catching part 45a of this embodiment along the outer circumferential surface of the driven roller 45, even when the sheet whose front edge is curled or folded toward the inlet roller 33 comes into contact with the outer circumferential surface of the driven roller 45, the front edge of the sheet is caught by the sheet front edge catching part 45a formed along its outer circumferential surface, and the sheet front edge is conveyed to the position, with rotation of the driven roller 45, where the sheet is forwarded toward the image forming section 2. Accordingly, the sheet fed out of the reversing path 7 can be prevented from being jammed caused by entering into between the second guide surface 34b of the branching claw 34 and the outer circumferential surface of the driven roller 45.

Figure 11:
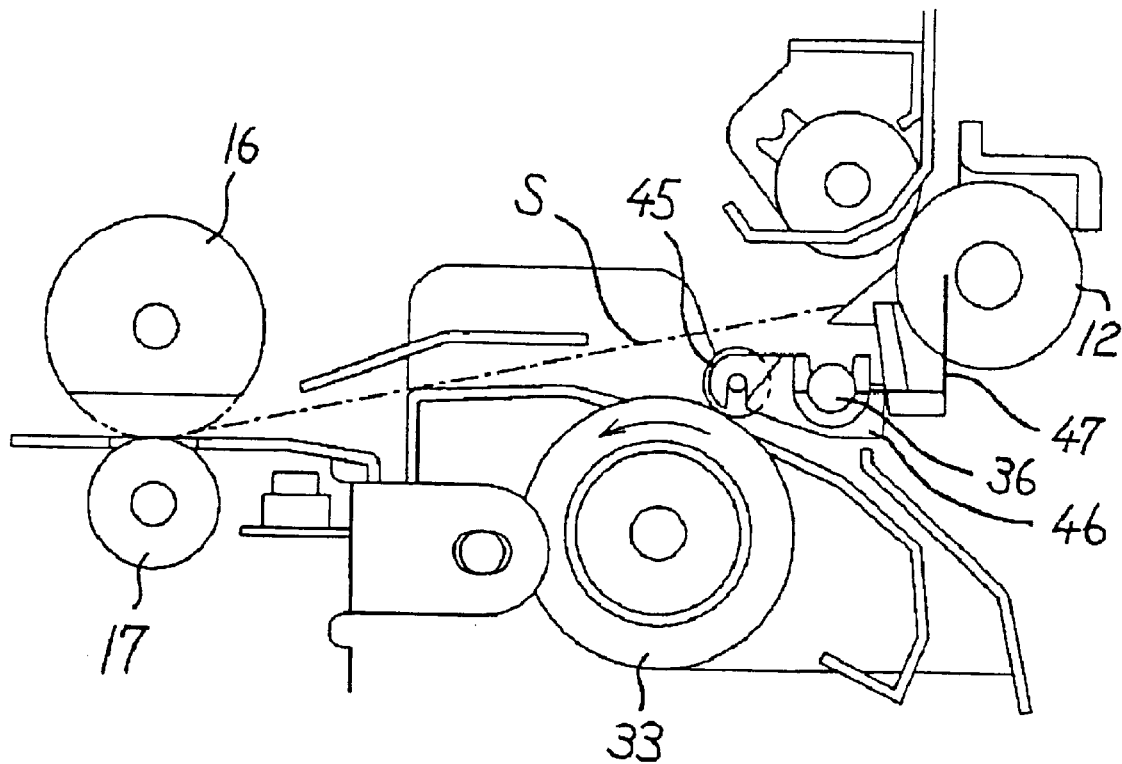
FIG. 11 is a front view showing a structure of a key section of an image formation apparatus according to a fourth embodiment of this invention.

A fourth embodiment of this invention will be explained below with reference to FIG. 11. This embodiment has a structure obtained by removing the branching claw 34 from the structure of the first embodiment and adding the driven roller 45 explained in the second embodiment. This driven roller 45 is provided by one at the central part in the direction of the sheet width perpendicular to the sheet conveying direction, or by two at positions symmetrical with respect to the direction of the sheet width. The driven roller 45 is supported by the bracket 46, which is held near the central shaft 33a of the inlet roller 33 so as to be pivotal around the shaft center of the supporting shaft 36 disposed in parallel to this central shaft 33a. The bracket 46 is biased by the leaf spring 47, and the driven roller 45 is elastically in contact with the outer circumferential surface of the inlet roller 33 by the biasing force of this leaf spring 47.

The sheet to be fed into the reversing path 7 passes through a contact part between the outer circumferential surface of the driven roller 45 and the outer circumferential surface of the inlet roller 33.

Further, the driven roller 45 is disposed at a position where its central shaft is arranged closer to the inlet roller 33 with respect to a path along which the sheet S fed out of the reversing path 7 is conveyed.

Based on such a structure, the sheet is fed into the reversing path 7 by being nipped with the outer circumferential surface of the inlet roller 33 and the outer circumferential surface of the driven roller 45. The sheet to be fed into the reversing path 7 is imparted with conveying force from the rotating inlet roller 33 and is smoothly fed into the reversing path 7.

The sheet fed out of the reversing path 7 proceeds along a part of the driven roller 45 rotating in the direction that feeds out the sheet. Therefore, even when the sheet fed out of the reversing path 7 comes into contact with the driven roller 45, the sheet can be smoothly forwarded toward the image forming section 2 positioned on the downstream side of the sheet conveying path 6. Furthermore, the central shaft of the driven roller 45 is arranged at the position closer to the inlet roller 33 with respect to a path along which the sheet fed out of the reversing path 7 is conveyed. Therefore, when the front edge of the sheet fed out of the reversing path 7 comes into contact with the outer circumferential surface of the driven roller 45, the sheet proceeds along the outer circumferential surface of the driven roller 45 in the direction that feeds out the sheet toward the image forming section 2. Thus, the sheet can be prevented from being jammed caused by entering into between the outer circumferential surface of the driven roller 45 and the outer circumferential surface of the inlet roller 33.

Accordingly, it is possible to reliably switch between the conveying directions of each sheet coming into or going away from the reversing path 7 with such a simple structure that the inlet roller 33 and the driven roller 45 in contact with the outer circumferential surface of the inlet roller 33 are provided.

The sheet front edge catching part 45a as explained in the third embodiment (FIG. 10) maybe formed on the driven roller 45 of this embodiment. With these parts, the sheet can be more reliably prevented from being jammed caused by entering into between the outer circumferential surface of the driven roller 45 and the outer circumferential surface of the inlet roller 33.

Figure 12:
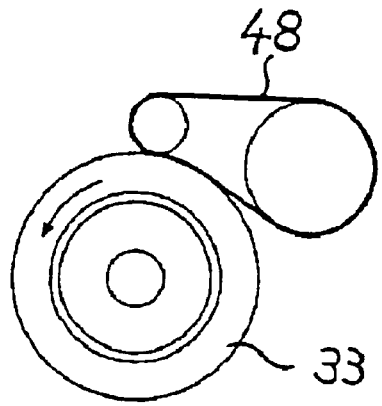
FIG. 12 is a front view showing a structure of a key section of an image formation apparatus according to a fifth embodiment of this invention.

A fifth embodiment of this invention will be explained below with reference to FIG. 12. This embodiment is provided with a belt 48 as a component that switches between the conveying directions of each sheet coming into or going away from the reversing path 7.

This belt 48 is arranged in a direction such that it has a surface along the sheet to be fed into the reversing path 7 and a surface along the sheet fed out of the reversing path 7, presses the sheet to be fed into the reversing path 7 against the outer circumferential surface of the inlet roller 33, and is driven together with the inlet roller 33.

Based on such a structure, the sheet is fed into the reversing path 7 by being nipped with the inlet roller 33 and the belt 48. Therefore, a nip width of the sheet with the inlet roller 33 and the belt 48 can be widened, so that even rigid sheet can be smoothly fed into the reversing path 7.

The sheet fed out of the reversing path 7 proceeds along a part of the belt 48 rotating in the sheet forwarding direction. Therefore, when the sheet fed out of the reversing path 7 comes into contact with the belt 48, the sheet can be smoothly fed out toward the image forming section 2 positioned on the downstream side of the sheet conveying path 6.

Although this embodiment has such a structure that the belt 48 is brought into contact with the outer circumferential surface of the inlet roller 33 and is driven together with the inlet roller 33, a motor (not shown) as a driving unit that rotates the belt 48 in the direction that rotates together with the roller may be provided. By providing such a driving unit to rotate the belt 48, the sheet can be more smoothly fed into the reversing path 7.

Figure 13:
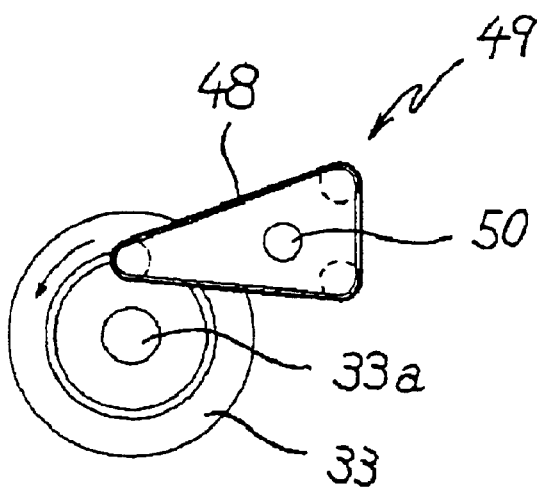
FIG. 13 is a front view showing a structure of a key section of an image formation apparatus according to a sixth embodiment of this invention.

A sixth embodiment of this invention will be explained below with reference to FIG. 13. This embodiment has a belt unit 49 including the belt 48 pivotally provided based on a supporting shaft 50, as a fulcrum, in parallel to the central shaft 33a of the inlet roller 33. When the sheet is started to be fed out of the reversing path 7, the belt unit 49 has been turned to the position where the front part of the belt 48 directed toward the reversing path 7 is positioned inwardly from the outer circumferential surface of the inlet roller 33. When the sheet is fed into the reversing path 7, the belt unit 49 is turned to the position where the belt 48 is in contact with the outer circumferential surface of the inlet roller 33. As a mechanism to turn the belt unit 49, a biasing unit such as the spring 38 as explained in the first embodiment may be used, or a solenoid or the like may be used.

Based on such a structure, the sheet fed out of the reversing path 7 can be prevented from entering into between the outer circumferential surface of the inlet roller 33 and the belt 48, which makes it possible to smoothly feed out the sheet from the reversing path 7.

A seventh embodiment of this invention will be explained below with reference to FIG. 14. This embodiment is provided with a blade 51 as a component that switches between the conveying directions of each sheet coming into or going away from the reversing path 7.

This blade 51 is a leaf spring like member, whose one end is fixed to a supporting shaft (not shown) and the other end is extended along the direction that feeds the sheet fed into the reversing path 7. The front end of this blade 51 is pressed against the outer circumferential surface of the inlet roller 33 by elasticity of its own. Further, a contact part of the blade 51 with the outer circumferential surface of the inlet roller 33 is bent along the shape of the outer circumferential surface of the inlet roller 33.

Based on such a structure, the sheet is fed into the reversing path 7 by entering into the nip between the outer circumferential surface of the inlet roller 33 and the blade 51 by the rigidness of the sheet itself and being imparted with conveying force from the inlet roller 33. The sheet is fed out of the reversing path 7 by being conveyed along the rear side of the blade 51 whose one side is in contact with the inlet roller 33. Accordingly, switching between the conveying directions of each sheet coming into or going away from the reversing path 7 can be accurately performed with a simple structure such that the inlet roller 33 and the blade 51 pressed against the outer circumferential surface of the inlet roller 33 are provided. Furthermore, the blade 51 is pressed against the outer circumferential surface of the inlet roller 33 by its own elasticity. Therefore, there is no need to additionally provide a unit for pressing the blade 51 against the outer circumferential surface of the inlet roller 33, which makes it possible to obtain a simpler structure.

Further, the blade 51 is bent along the shape of the outer circumferential surface of the inlet roller 33, so that the blade 51 is in close contact with the outer circumferential surface of the inlet roller 33. Therefore, the sheet fed out of the reversing path 7 can be prevented from being caught on the blade 51.

Figure 15:
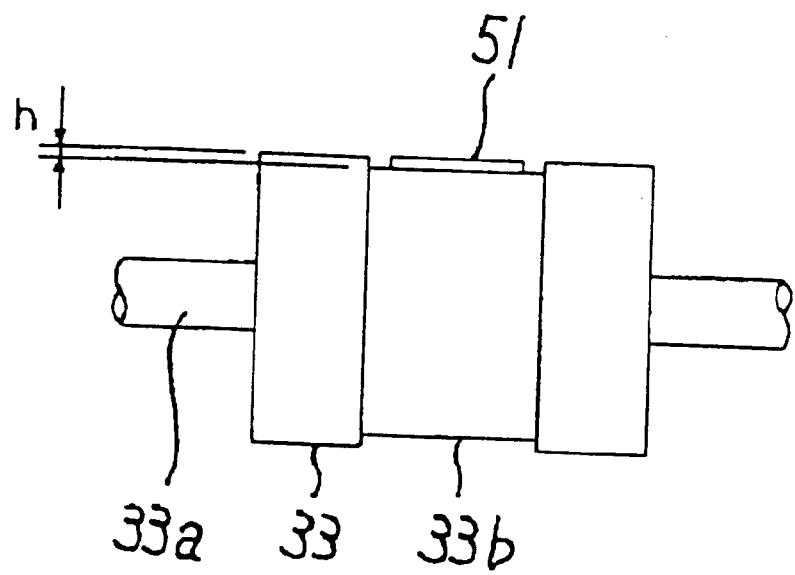
FIG. 15 is a side view showing a structure of a key section of an image formation apparatus according to an eighth embodiment of this invention.

An eighth embodiment of this invention will be explained below with reference to FIG. 15. This embodiment is provided with the blade 51 as a component that switches between the conveying directions of each sheet coming into or going away from the reversing path 7, and further with a smaller diameter part 33b formed on a portion of the inlet roller 33 which the blade 51 contacts. A depth "h" of the smaller diameter part 33b is set to the substantially same dimension as the plate thickness of the blade 51.

Based on such a structure, the sheet fed out of the reversing path 7 can be more surely prevented from being caught on the blade 51, which makes it possible to more smoothly perform switching between the sheet conveying directions.

Figure 16:
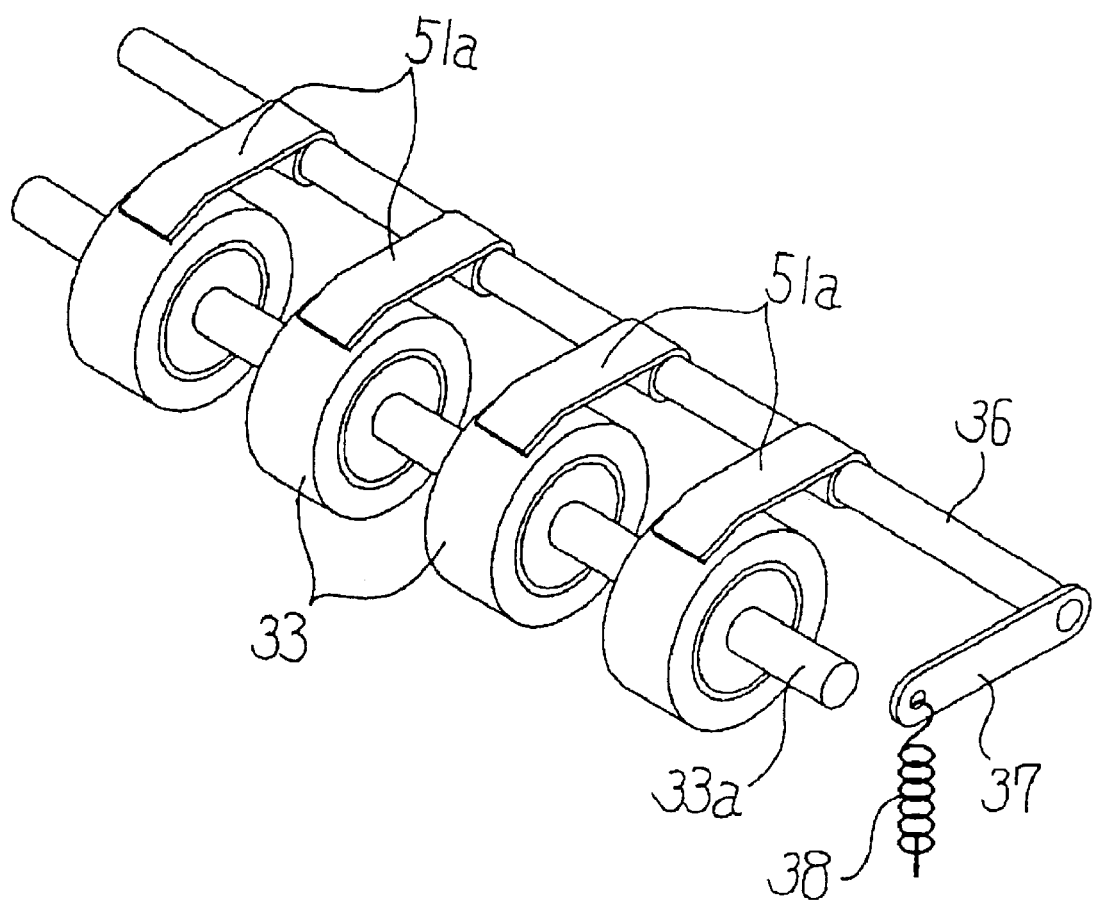
FIG. 16 is a perspective view showing how to arrange inlet rollers and blades according to a ninth embodiment of this invention.

A ninth embodiment of this invention will be explained below with reference to FIG. 16. The basic structure of this embodiment is the same as that of the seventh embodiment (FIG. 14), which is provided with a plurality of blades 51a as components for switching between the conveying directions of each sheet coming into or going away from the reversing path 7. These blades 51 are made of a high slip material such as polyacetal with no elasticity of their own.

Each one end of these blades 51a is fixed to the supporting shaft 36 and each the other end is in contact with the outer circumferential surface of the inlet roller 33. One end of the arm 37 is fixed to the end of the supporting shaft 36, and one end of the spring 38 as a biasing unit is engaged with the other end of the arm 37. The other end of the blade 51a is pressed against the outer circumferential surface of the inlet roller 33 by the biasing force of the spring 38.

Figure 14:
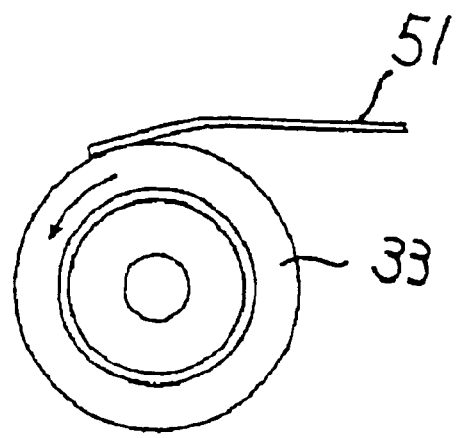
FIG. 14 is a front view showing a structure of a key section of an image formation apparatus according to a seventh embodiment of this invention.

A contact part of the blade 51a with the outer circumferential surface of the inlet roller 33 is bent along the shape of the outer circumferential surface of the inlet roller 33 like the blade 51 shown in FIG. 14.

Based on such a structure, the sheet is fed into the reversing path 7 by entering into between the outer circumferential surfaces of the inlet rollers 33 and the blades 51a using the rigidness of the sheet itself and being imparted with conveying force from the inlet rollers 33. The sheet is fed out of the reversing path 7 by being conveyed along each rear side of the blades 51a whose one sides are in contact with the inlet rollers 33. Accordingly, switching between the conveying directions of each sheet coming into or going away from the reversing path 7 can be accurately performed with a simple structure such that the inlet rollers 33 and the blades 51a pressed against the outer circumferential surfaces of the inlet rollers 33 are provided.

By forming these blades 51 with a high slip material such as polyacetal, it is possible to smoothly feed the sheet into the reversing path 7 by passing through the sheet between the inlet rollers 33 and the blades 51a.

Figure 17:
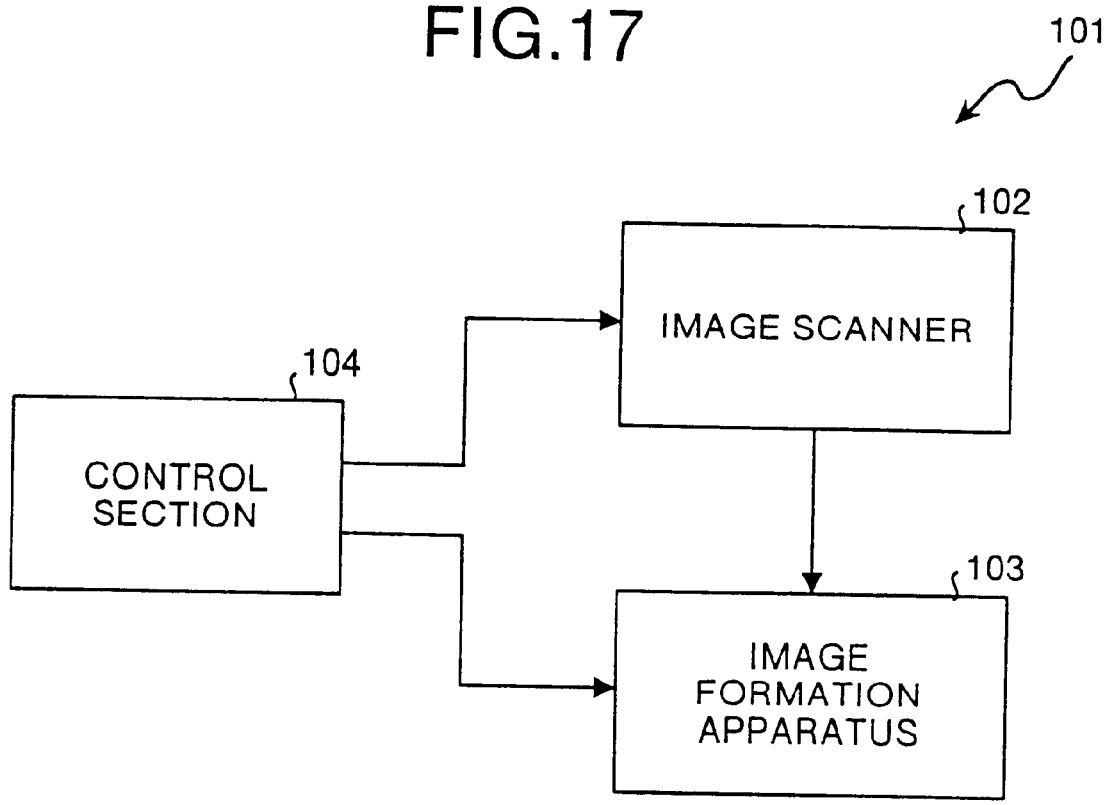
FIG. 17 is a block diagram of a copying machine according to a tenth embodiment of this invention.

A tenth embodiment of this invention will be explained below with reference to FIG. 17. FIG. 17 is a block diagram showing a schematic configuration of a copying machine 101 according to this embodiment. This copying machine 101 comprises an image scanner 102 that scans an image of an original, the image formation apparatus 103 explained in any of the first to ninth embodiments, and a control section 104 that controls the image scanner 102 and the image formation apparatus 103 to allow the image formation apparatus 103 to form an image on the sheet based on the image data of the original scanned by the image scanner 102.

Therefore, in accordance with this copying machine 101, the same advantageous effect as that explained in the first to ninth embodiments can be obtained.

An eleventh embodiment of this invention will be explained below with reference to FIG. 18 to FIG. 26. This embodiment is applied to the image formation apparatus based on the digital electrophotographic system provided with the digital writing unit.

Figure 18:
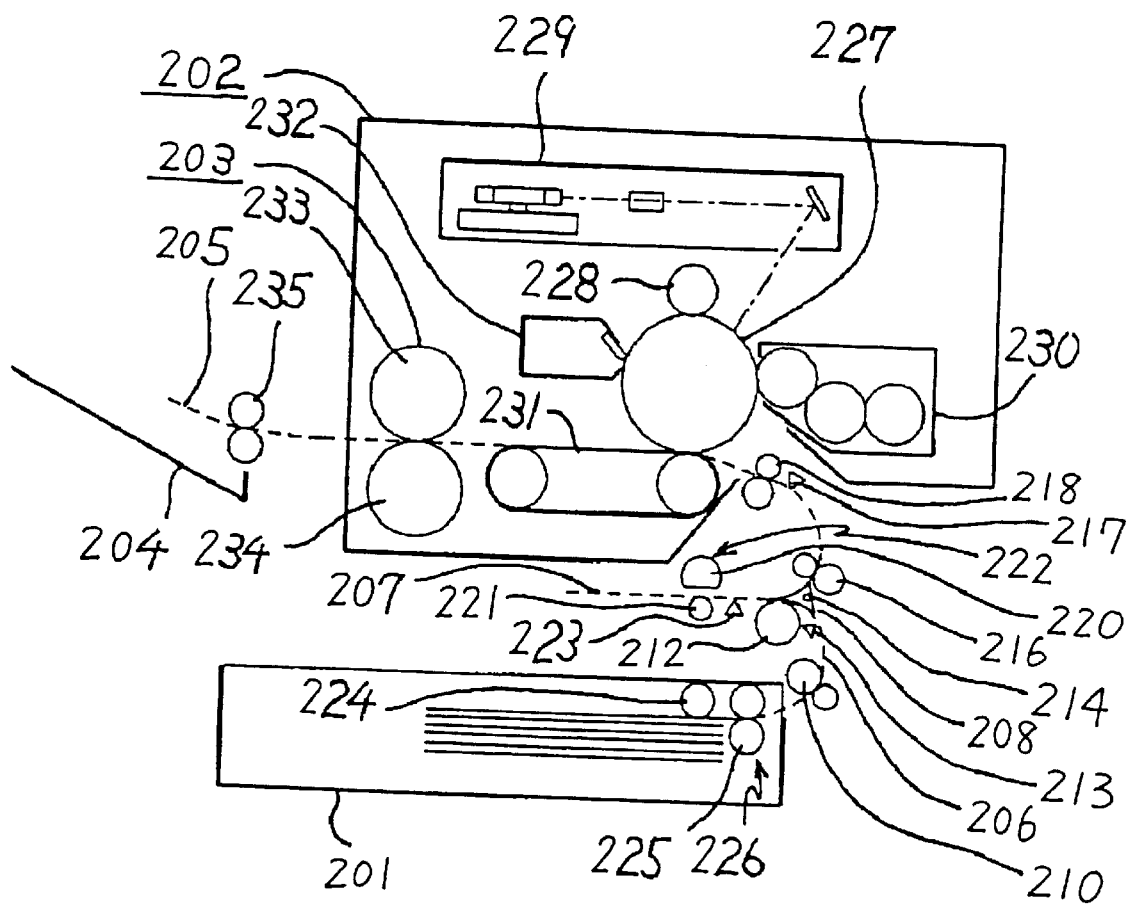
FIG. 18 is a front view schematically showing a structure of an image formation apparatus according to an eleventh embodiment of this invention.
Figure 19:
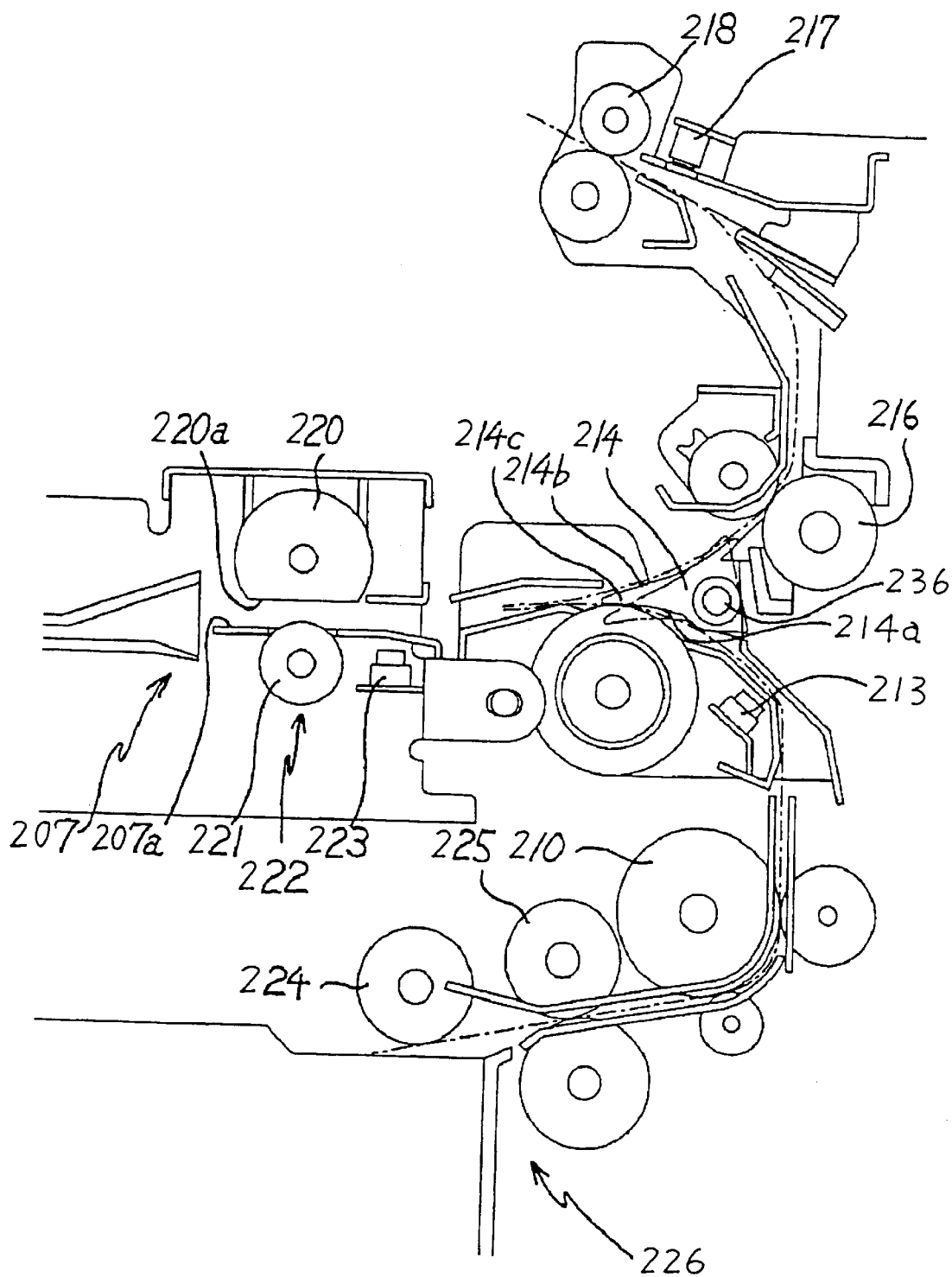
FIG. 19 is a front view of an enlarged key section of this apparatus.

FIG. 18 is a front view schematically showing the structure of the image formation apparatus according to the eleventh embodiment. The image formation apparatus has a conveying path 205 from a sheet feed tray 201 as a sheet storage section that stacks and stores sheets to a discharged sheet stacker section 204 that discharges each sheet with a formed image. More specifically, this conveying path 205 is formed between the above-mentioned two sections through an image forming section 202 that forms an image on the sheet based on the electrophotographic system and a fixing section 203 that fixes the formed image on the sheet. A path from the sheet feed tray 201 to the image forming section 202 of the conveying path 205 is set as a sheet conveying path 206.

A branching point 208 is provided on some midpoint of the sheet conveying path 206. This branching point 208 branches a reversing path 207 whose rearmost part is a dead end. Conveying rollers 210 driven by a motor (see FIG. 23) 209 to convey each sheet are disposed on the upstream side from this branching point 208 on the sheet conveying path 206. An inlet roller 212, an inlet sensor 213, and a branching claw 214 are disposed in the location of the branching point 208. More specifically, the inlet roller 212 is driven by a motor (see FIG. 23) 211 to feed each sheet to the reversing path 207. The inlet sensor 213 is positioned on the upstream side from the inlet roller 212 on the sheet conveying path 206, and detects the front edge of each sheet to pass through the sensor. Further, the branching claw 214 switches between paths of each sheet to be fed into and fed out of the reversing path 207. The inlet sensor 213 of this embodiment is a reflection type optical sensor that comprises a light-emitting device (not shown) for emitting light and a light-receiving device (not shown) for receiving the light emitted by the light-emitting device. This inlet sensor 213 detects each sheet through the following process such that a sheet arrives, light emitted by the light-emitting device is reflected by the sheet, and the reflected light is received by the light-receiving device.

Conveying rollers 216 and regist rollers 218 are disposed on the downstream side from the branching point 208 on the sheet conveying path 206. More specifically, the conveying rollers 216 are driven by a motor (see FIG. 23) so as to feed the sheet switched back in the reversing path 207 toward the image forming section 202. The regist rollers 218 perform a registration operation such that the timing of conveying the sheet detected by a regist sensor 217 explained later to the image forming section 202 is synchronized to an image forming operation. The regist sensor 217 is the same reflection type sensor as the inlet sensor 213.

A sheet reversing device 222 as a sheet reversing unit is disposed on the reversing path 207. This sheet reversing device 222 comprises a reverse roller 220 whose outer circumferential part is partially cut to form a flat part 220a as a low friction part and which is intermittently driven by a stepping motor (see FIG. 23) 219, and a driven roller 221 disposed at a position facing the reverse roller 220 through the reversing path 207, coming into contact with the part except the flat part 220a during rotation of the reverse roller 220, and driven together with the reverse roller through the contact. The sheet fed into the reversing path 207 is switched back by the sheet reversing device 222 to be fed out from the reversing path 207. The sheet reversing device 222 feeds out the switched-back sheet from the reversing path 207 to the sheet conveying path 206 and allows a subsequent sheet to be fed into the reversing path 207 during the feeding out of the preceding sheet. The sheet fed out of the reversing path 207 and the subsequent sheet to be fed into the reversing path 207 during the feeding out of the preceding sheet are conveyed so that at least respective parts of these sheets overlap each other. A reverse sensor 223 that detects the front edge of the fed sheet is disposed on the downstream side from the inlet roller 212 in the conveying direction of the sheet fed into the reversing path 207. This reverse sensor 223 is the same reflection type sensor as the inlet sensor 213.

A sheet separation/feeding device 226 as a sheet separation/feeding unit is disposed on the downstream side from the sheet feed tray 201 in the sheet conveying direction. This sheet separation/feeding device 226 comprises a pickup roller 224 that picks up each stacked and stored sheet, and a separation roller 225 that separates the picked-up sheets into one each.

The image forming section 202 comprises a photoreceptor 227 with an image to be formed on its surface, a charger 228 that charges uniformly the photoreceptor 227, and a digital optical writing device 229 as a digital writing unit that optically writes an electrostatic latent image on the photoreceptor 227. This image forming section 202 also comprises a developing unit 230 that forms a toner image by depositing toner on the electrostatic latent image on the photoreceptor 227, a transfer unit 231 that transfers the developed toner image to the sheet, and a cleaning device 232 that removes the remaining toner from the photoreceptor 227. This image forming section 202 forms an image on the sheet through digital electrophotographic process.

The fixing section 203 has a pressurizing roller 233 that fixes the toner image transferred to the sheet thereon and a heating roller 234. Sheet discharge rollers 235, that discharge the sheet with the fixed toner image to a discharged sheet stacker section 204, are disposed on the downstream side from the fixing section 203 in the sheet conveying direction.

This branching claw 214 disposed at the branching point 208 is formed in a substantial triangle having a first guide surface 214a facing a sheet to be fed into the reversing path 207, a second guide surface 214b facing a sheet fed out of the reversing path 207, and an acute branching claw tip part 214c formed with the first guide surface 34a and the second guide surface 34b and directed toward the reversing path 7. This branching claw 214 is held pivotally around the shaft center of a supporting shaft 236, and is biased by a spring (not shown) in the direction that presses the first guide surface 214a against the sheet to be fed to the outer circumferential surface of the reversing path 207. The sheet conveyed from the sheet feed tray 201 enters into the nip between the outer circumferential surface of the inlet roller 212 and the first guide surface 214a of the branching claw 214 to push up the branching claw 214 by the rigidness of the sheet itself, and passes through between the first guide surface 214a and the outer circumferential surface of the inlet roller 212 to be fed into the reversing path 207.

Figure 20:
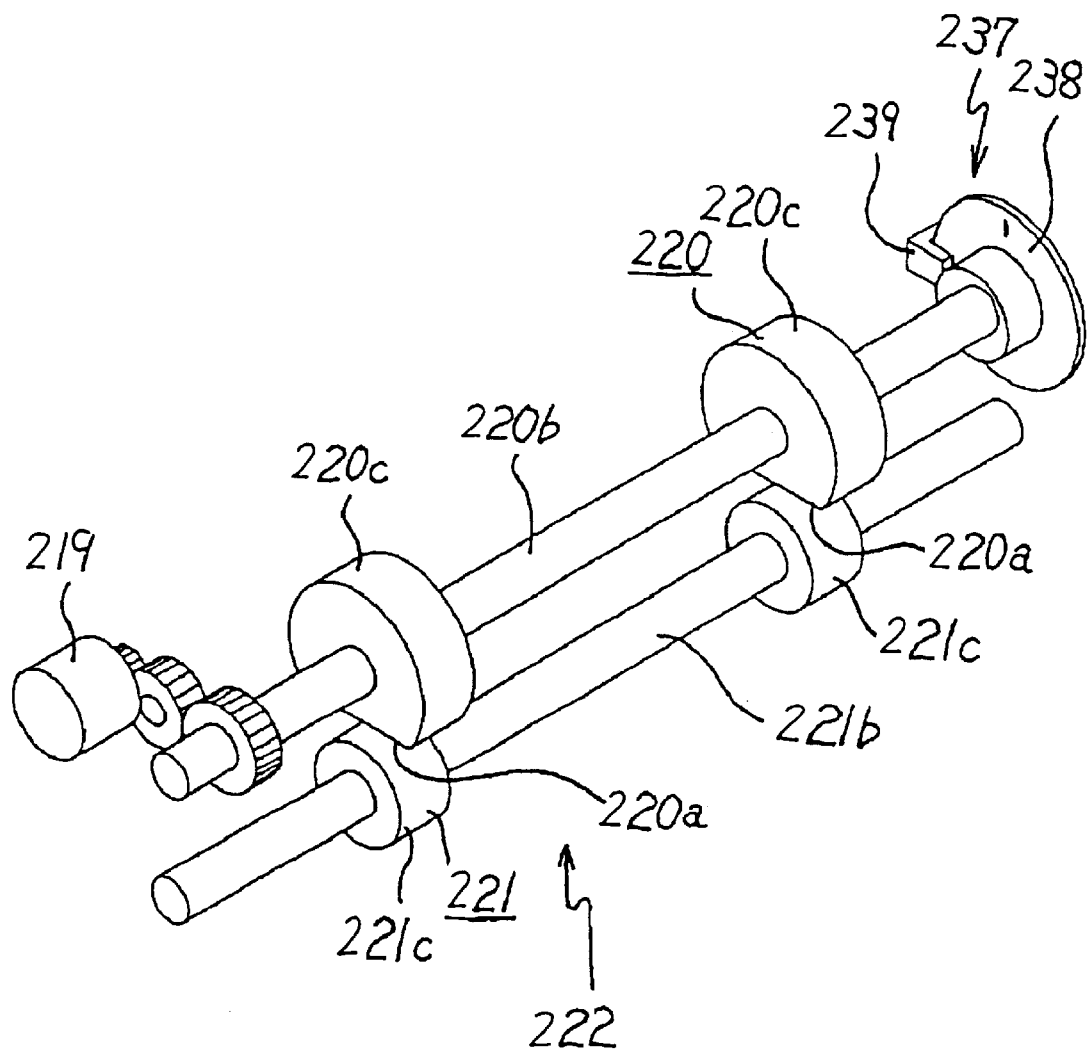
FIG. 20 is a perspective view showing a sheet reversing device.
Figure 21A:
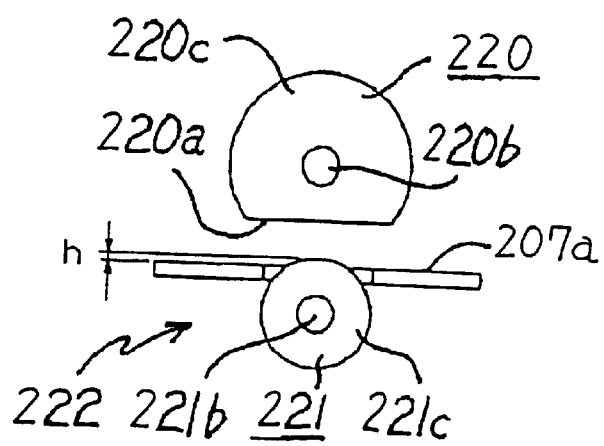
FIG. 21A and FIG. 21B are front views for explaining an operating state of the sheet reversing device.
Figure 21B:
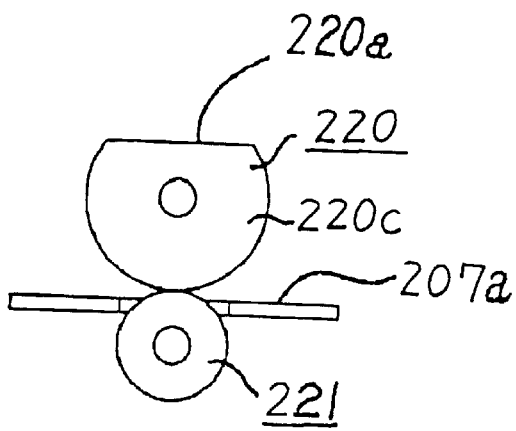
Figure 22:
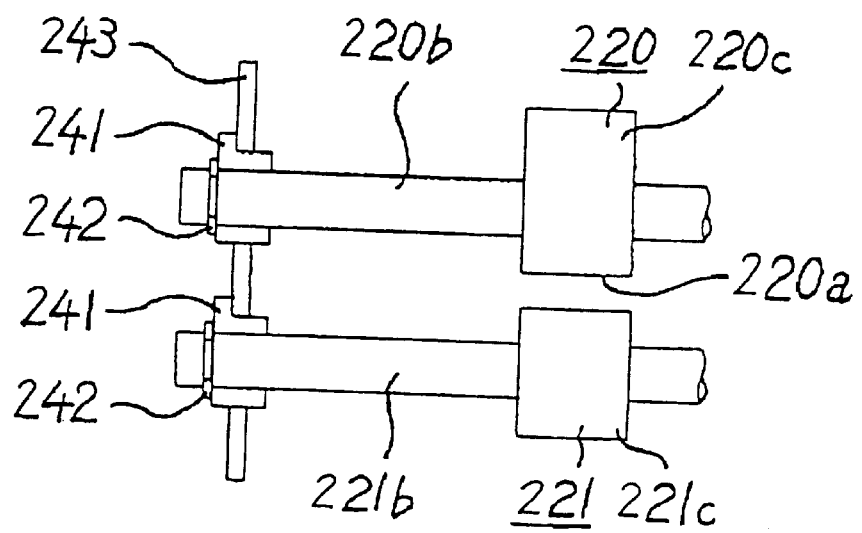
FIG. 22 is a vertical cross-sectional view showing a holding structure of the sheet reversing device.

FIG. 20 to FIG. 22 show the detailed the sheet reversing device 222. As shown in FIG. 20, the reverse roller 220 is formed with two roller parts 220c fixed to a roller shaft 220b, and the flat part 220a is formed on each of the roller parts 220c. The two roller parts 220c are positioned symmetrically with respect to the lateral direction of the sheet perpendicular to the sheet conveying direction so that the rollers are positioned within a range of the sheet width even if the sheet has the minimum width. Each of the roller parts 220c of the reverse roller 220 is a rubber roller made of urethane rubber, styrene-butadiene rubber, butadiene rubber, nitryl rubber, chloroprene rubber, ethylene propylene rubber, or the like.

The stepping motor 219 as a driving section is coupled to one end of the roller shaft 220b, and an encoder 237 as a rotational position detecting unit is mounted on the other end of the roller shaft 220b. This encoder 237 is composed of a disk with a slit 238 secured to the roller shaft 220b, and a light-emitting section 239 and a light-receiving section (not shown) disposed on opposite sides of this disk with a slit 238. Each roller part 221c of a driven roller 221 is a rubber roller made of urethane rubber, styrene-butadiene rubber, butadiene rubber, nitryl rubber, chloroprene rubber, and ethylene propylene rubber, a roller made of a polyurethane foaming material, or a metal roller made of aluminum stainless steel, or the like.

As shown in FIG. 20, the driven roller 221 is formed with the two roller parts 221c fixed to a roller shaft 221b, and the two roller parts 221c are disposed at positions vertically facing the respective roller parts 220c of the reverse roller 220.

FIG. 21A and FIG. 21B are front views schematically showing the sheet reversing device 222. As shown in FIG. 21A, when the flat part 220a of the reverse roller 220 faces the driven roller 221, a space is produced between the reverse roller 220 and the driven roller 221, so that the sheet is allowed to be fed into the reversing path 207. As shown in FIG. 21B, when the outer circumferential surface of the reverse roller 220 and the outer circumferential surface of the driven roller 221 are in contact with each other, the driven roller 221 is rotated as the reverse roller 220 is rotated, and the sheet nipped with the reverse roller 220 and the driven roller 221 is fed out of the reversing path 207 toward the image forming section 202. The upper side of the outer circumferential part of the driven roller 221 slightly projects from the sheet guide surface 207a of the reversing path 207. This projection height "h" is about 1 mm.

FIG. 22 shows a holding structure of the roller shaft 220b of the reverse roller 220 and the roller shaft 221b of the driven roller 221. Both ends of these roller shafts 220b and 221b have bearings 241 fixed thereto with E rings 242. These bearings 241 are secured to side plates 243 positioned at both sides in the lateral direction of the sheet perpendicular to the sheet conveying direction of the reversing path 207.

Figure 23:
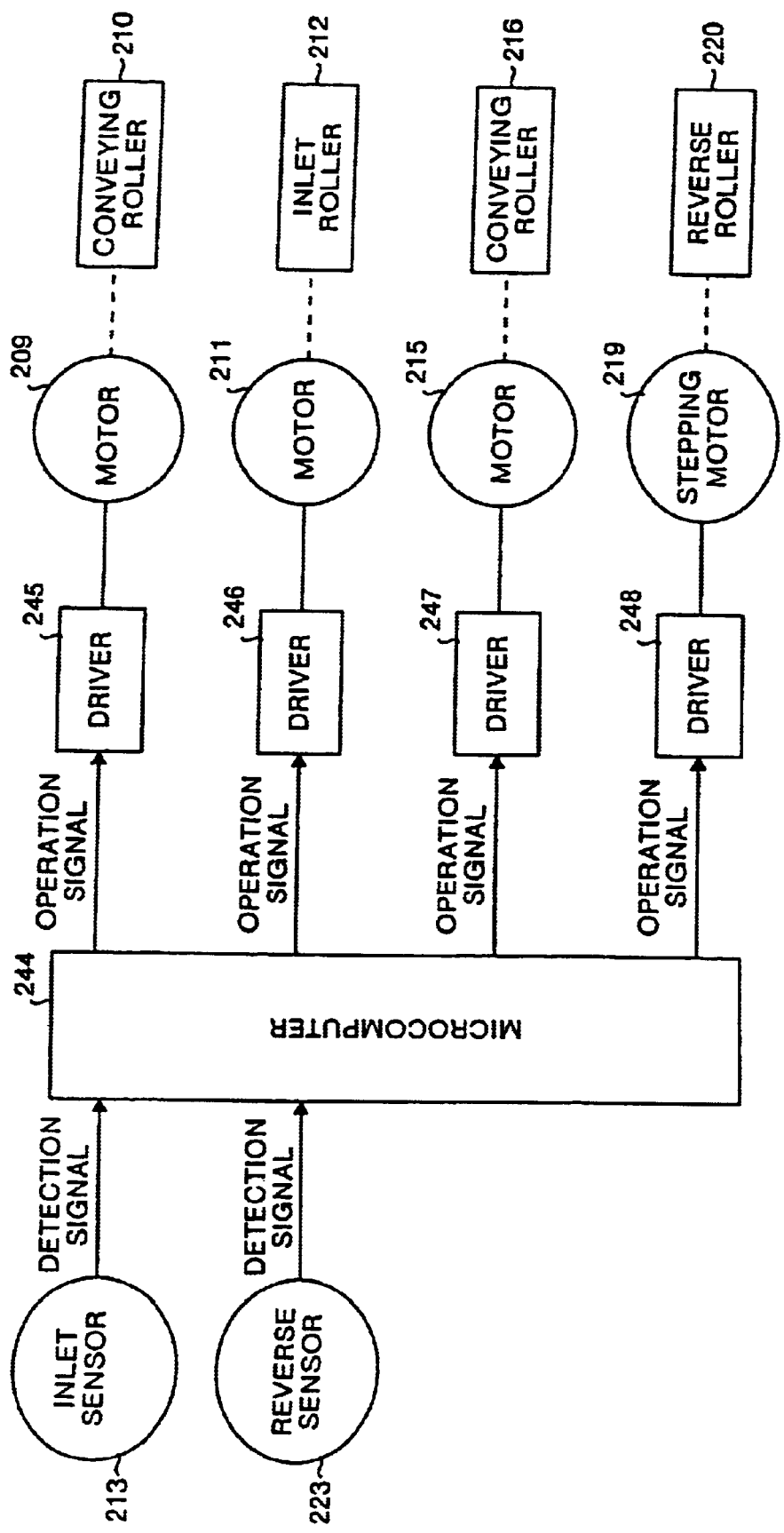
FIG. 23 is a block diagram showing an electrical connection of a control system relating to sheet conveyance in the image formation apparatus.

FIG. 23 is a block diagram showing an electrical connection of a control system relating to sheet conveyance out of the sections in the image formation apparatus. The control system relating to the sheet conveyance has a microcomputer 244 that performs centralized control for the whole. The microcomputer 244 has a structure of ROM that previously stores fixed data such as programs and RAM that can rewrite and store variable data such as a time counted by a timer, connected to its CPU that performs centralized control for driving of the sections, although it is not particularly shown. This microcomputer 244 is connected with a motor driver 245 that drives a motor 209 for rotating the conveying rollers 210, a motor driver 246 that drives a motor 211 for rotating the inlet roller 212, a motor driver 247 that drives a motor 215 for rotating the conveying rollers 216, a motor driver 248 that drives a stepping motor 219 for rotating the reverse roller 220, the inlet sensor 213, and the reverse sensor 223, or the like.

Based on such a structure, the sheets stacked and stored in the sheet feed tray 201 are separated and fed by the sheet separation/feeding device 226 one by one, and the separated and fed sheets are continuously conveyed along the sheet conveying path 206 by the conveying rollers 210.

When the front edge of the sheet conveyed along the sheet conveying path 26 reaches the branching point 208, the front edge of the sheet touches the first guide surface 214a of the branching claw 214. The branching claw 214 is pushed up by the rigidness of the sheet, and the sheet passes through between the first guide surface 214a and the outer circumferential surface of the inlet roller 212 to be fed into the reversing path 207. When the sheet is passing through between the first guide surface 214a and the outer circumferential surface of the inlet roller 212, the branching claw 214 is pressed against the sheet by the biasing force of the spring. Accordingly, the sheet is pressed against the outer circumferential surface of the inlet roller 212 and is imparted with conveying force from the inlet roller 212.

When the sheet is fed into the reversing path 207, the reverse roller 220 and the driven roller 221 are stopped at the positions apart from each other as shown in FIG. 21A. Therefore, the sheet can be smoothly fed into the reversing path 207 (feeding of the sheet into the space between the reverse roller 220 and the driven roller 221).

The sheet is fed out of the reversing path 207 by rotating the reverse roller 220 one turn by the driving unit as one of the functions of the microcomputer 244. This rotation is performed according to a result of detection of the sheet front edge by the inlet sensor 213 or to a result of detection of the sheet front edge by the reverse sensor 223 after a predetermined period of time elapses since the detection is performed. The sheet is nipped with the reverse roller 220 and the driven roller 221 through rotation of the reverse roller 220 and is imparted with conveying force, and is fed out of the reversing path 207 toward the image forming section 202. The timing of feeding out the sheet is set so as to ensure the dimension of a space wide enough to avoid overlapping between the front edge of the fed-out sheet and the rear edge of the preceding fed-out sheet at the position of the regist rollers 218, and make the dimension minimum within its allowable range.

The position of the conveying rollers 216 is set so that the front edge of the sheet in the conveying direction is captured by the conveying rollers 216 when the reverse roller 220 rotates one turn to feed the sheet out. Therefore, even when the reverse roller 220 having fed out the sheet is rotated one turn and is stopped at the position as shown in FIG. 21A, the sheet is imparted with conveying force from the conveying rollers 216 and is continuously conveyed.

When the reverse roller 220 rotates one turn to stop at the position as shown in FIG. 21A and the rear edge of the sheet fed out of the reversing path 207 is proceeding between the reverse roller 220 and the driven roller 221, a subsequent sheet can be fed into the reversing path 207 in the above-mentioned manner.

Further, by providing the inlet sensor 213 and the reverse sensor 223 before and after the inlet roller 212, these two sensors 213 and 223 can be used as a jam detection sensor in the location of the inlet roller 212. That is, when the inlet sensor 213 detects the sheet but the reverse sensor 223 does not detect the sheet, occurrence of a jam in the location of the inlet roller 212 can be detected.

The inlet sensor 213 may detect the rear edge of the sheet. By detecting the rear edge of the sheet, the time from its detection until the reverse roller 220 is driven is reduced. Thus, it is possible to more accurately control the timing of driving the reverse roller 220 by using the result of detection from this inlet roller 212 as a trigger for the driving unit.

When the sheet is to be fed out of the reversing path 207, the reverse roller 220 is rotated, and the sheet is nipped with the part except the flat part 220a of the reverse roller 220 and the driven roller 221 and is fed out. Therefore, there occurs no noise during feeding out of the sheet.

Figure 24:
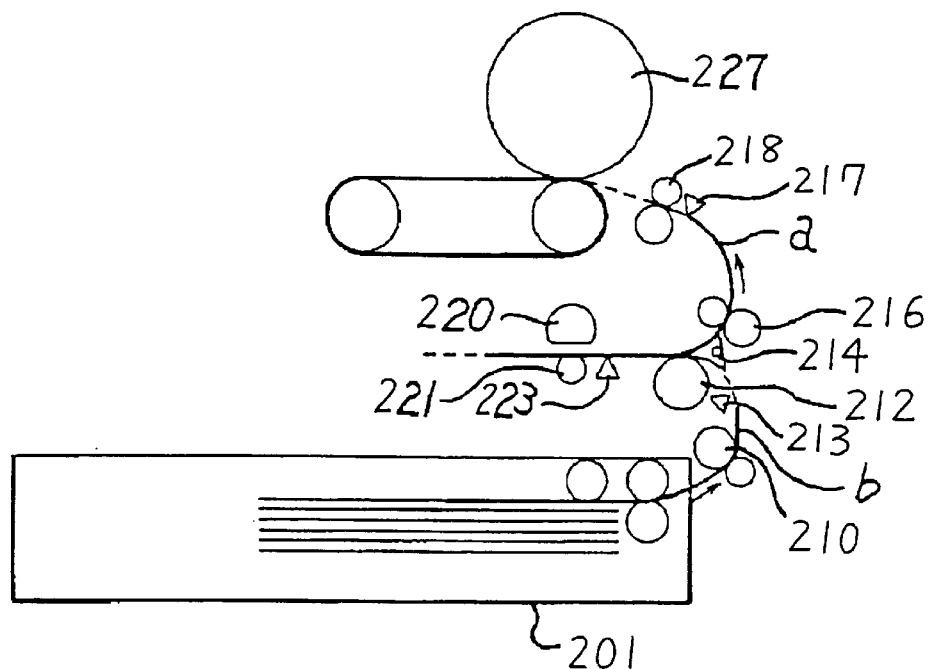
FIG. 24 shows a flow of each sheet when the sheets are continuously conveyed.
Figure 25:
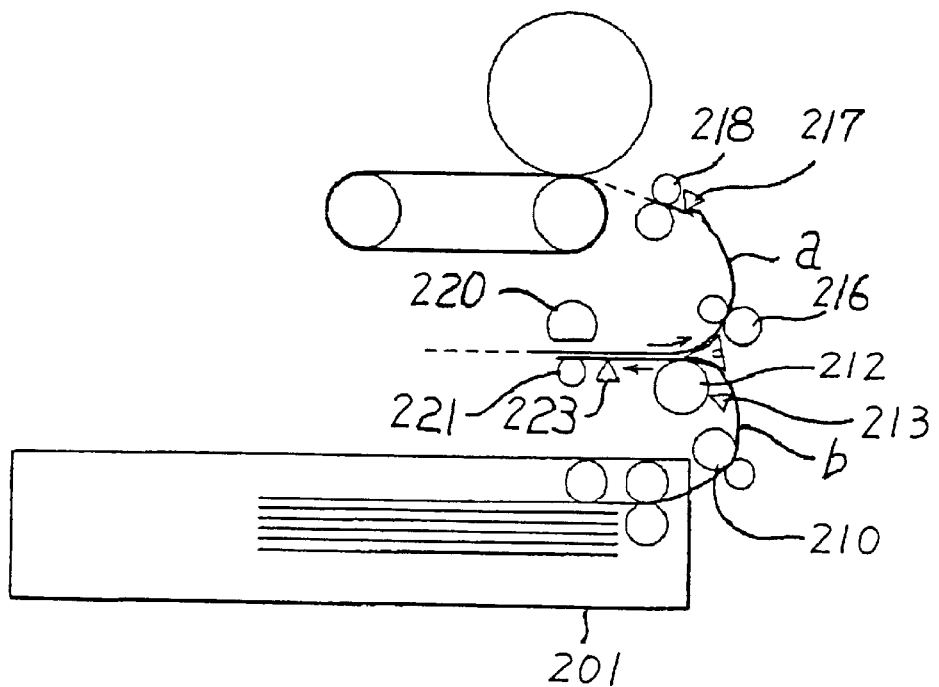
FIG. 25 shows a flow of each sheet when the sheets are continuously conveyed.

FIG. 24 and FIG. 25 show a flow of each sheet when the sheets are continuously conveyed. A subsequent sheet b is conveyed toward the reversing path 207 concurrently when a preceding sheet a is fed out of the reversing path 207 to the sheet conveying path 206. The preceding sheet a is imparted with conveying force by the reverse roller 220 first, and after the reverse roller 220 is stopped at the position as shown in FIG. 21A, the sheet is imparted with conveying force by the conveying rollers 210, and is conveyed. On the other hand, the subsequent sheet b is imparted with conveying force by the conveying rollers 210 and the inlet roller 212 to be fed into the reversing path 207. Since the reverse roller 220 is stopped at the position of FIG. 21A, the subsequent sheet b can be smoothly fed into the reversing path 207 even when the rear edge of the preceding sheet a fed out of the reversing path 207 is positioned within the reversing path 207. Accordingly, the two sheets, whose conveying directions are opposite to each other, can be made overlap each other within the reversing path 207, and a space between the preceding sheet a and the subsequent sheet b can be reduced.

The sheet fed out of the reversing path 207 is conveyed by the conveying rollers 216 and is temporarily stopped after a predetermined time since the regist sensor 217 detects the front edge of the sheet. As shown in FIG. 24, the front edge of the sheet comes into contact with the regist rollers 218 in a state where the sheet is slightly warped due to elasticity of the sheet itself.

The regist rollers 218 are rotated in step with starting of image formation in the image forming section 202, and the sheet is conveyed in sync with image formation.

Figure 26:
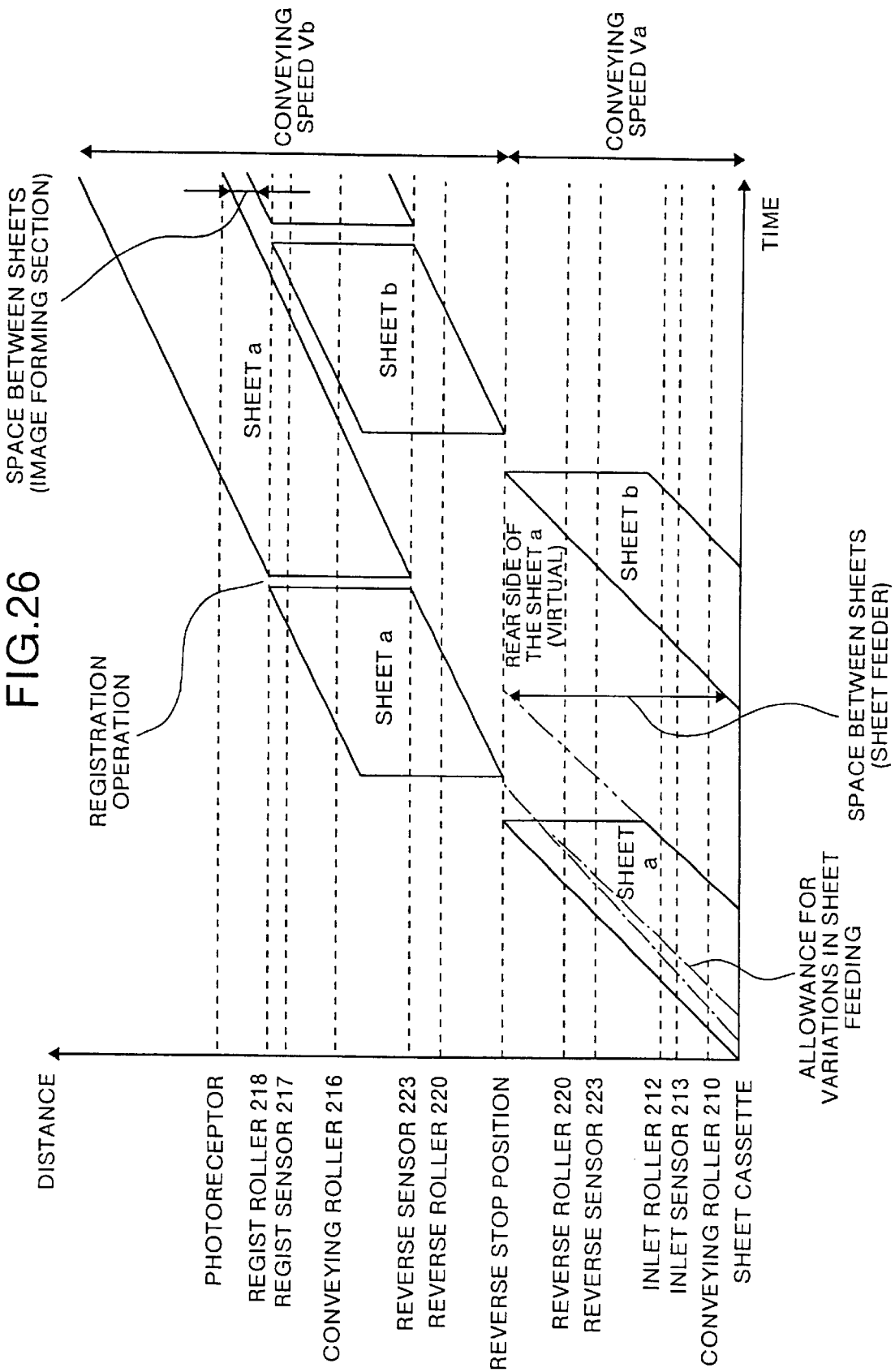
FIG. 26 is a diagram showing sheet conveying operation.

FIG. 26 is a diagram showing the sheet conveying operation. The sheet is conveyed at a speed Va by the conveying rollers 210 and the inlet roller 212 from the sheet feed tray 201 to the reverse stop position within the reversing path 207. The sheet is conveyed at a speed Vb, which is equivalent to an image forming speed, by the reverse roller 220 and the conveying rollers 216 from the reverse stop position to the image forming section 202. The speed Va is set to such a sheet conveying speed as to convey a sheet faster than the speed Vb. The sheet to be conveyed to the image forming section 202 has to be synchronized to the image forming speed. Therefore, it is essential that the sheet conveying speed is set to the speed Vb on the downstream side from the regist rollers 218 in the sheet conveying direction. The sheet conveying speed Va is set to be faster than the speed Vb in a path from the sheet feed tray 201 to the reverse stop position in order to improve productivity of image formation.

In this embodiment, explanation has been given by taking the case, as an example, where the flat part 220a is formed as a low friction part of the reverse roller 220. However, a part of the reverse roller 220 is formed with any material having a low frictional coefficient, or a part of the reverse roller 220 is coated by any material with a low frictional coefficient to form a low friction part whose radius dimension is the same as that of the other part.

Further, in this embodiment, the explanation has been given by taking the sheet reversing device 222, as an example, in which the reverse roller 220 is positioned on the upper side and the driven roller 221 is positioned on the lower side. However, conversely to this arrangement, the reverse roller 220 may be positioned on the lower side and the driven roller 221 may be positioned on the upper side. When an image is to be formed on the other side of the sheet with an image formed on one side, by positioning the reverse roller 220 on the lower side, the surface of the sheet where the image has been formed (upward surface within the reversing path 207) comes into contact with the driven roller 221. Therefore, it is possible to prevent the surface of the sheet where the image has been formed from damaging the image caused by being heavily rubbed with the rotating reverse roller 220.

Further, in this embodiment, the explanation has been given by taking the image formation apparatus, as an example, which has the image forming section 202 based on the digital electrophotographic system provided with the digital writing unit. However, an image forming section based on the non-electrophotographic system can be used instead of the image forming section 202.

Figure 27:
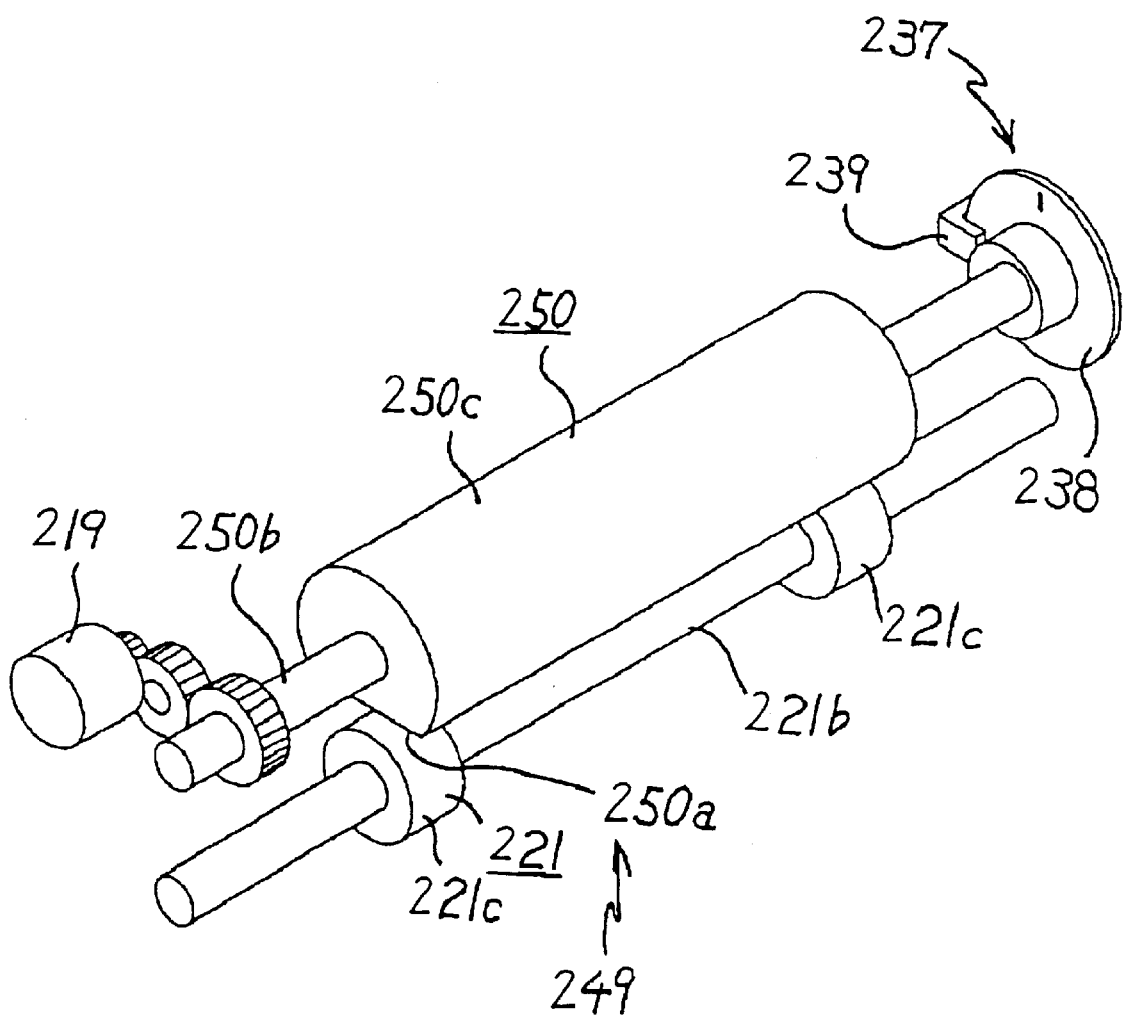
FIG. 27 is a perspective view showing a sheet reversing device of an image formation apparatus according to a twelfth embodiment of this invention.

A twelfth embodiment of this invention will be explained below with reference to FIG. 27. The same legends are assigned to those corresponding to the sections explained in the eleventh embodiment, and explanation is omitted (the same in the following embodiments).

This embodiment is provided by changing the structure of the sheet reversing device 249 as a sheet reversing unit. The sheet reversing device 249 is composed of a reverse roller 250 that is intermittently rotated and a driven roller 221.

The reverse roller 250 is formed with one wide roller part 250c that is positioned at the center of the lateral direction perpendicular to the sheet conveying direction and is fixed to a roller shaft 250b. The outer circumferential part of the roller part 250c is partially cut to form a flat part 250a as a low friction part. Like in the eleventh embodiment, the roller part 250c is formed with urethane rubber, styrene-butadiene rubber, butadiene rubber, nitryl rubber, chloroprene rubber, ethylene propylene rubber, or the like.

The driven roller 221 has the same structure as that of the eleventh embodiment, and is formed with two roller parts 221c fixed to the roller shaft 221b.

Based on such a structure, the reverse roller 250 has only one roller part 250c, which makes easier the positioning operation for fixing the roller part 250c to the roller shaft 250b as compared to the case where there are a plurality of roller parts 220c like in the eleventh embodiment, and which also makes the structure inexpensive.

Figure 28:
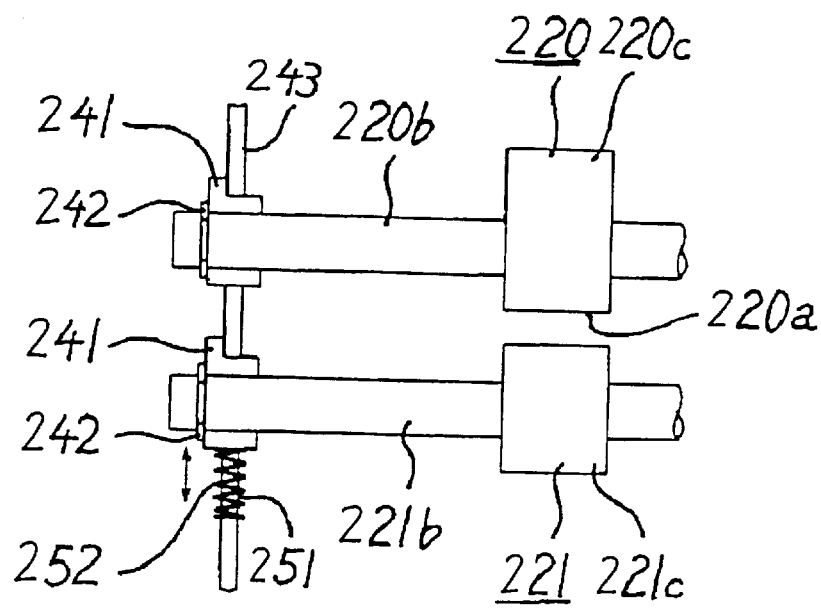
FIG. 28 is a vertical cross-sectional view showing a holding structure of a sheet reversing device of an image formation apparatus according to a thirteenth embodiment of this invention.

A thirteenth embodiment of this invention will be explained below with reference to FIG. 28. This embodiment is provided by changing a holding structure of the roller shaft 221b of the driven roller 221 as compared to that of the first and twelfth embodiments. Both ends of the roller shaft 221b of the driven roller 221 have bearings 241 fixed thereto with E rings 242. These bearings 241 are engaged in long holes 251 formed on side plates 243 positioned on both sides in the lateral direction of the sheet perpendicular to the sheet conveying direction of the reversing path 207, so that the driven roller 221 is movable within the long holes 251 in directions of contacting and being separated away from the reverse roller 220. Further, a spring 252 as a biasing unit, that biases the driven roller 221 in the direction that comes into contact with the reverse roller 220, is fixed within the long hole 251.

Bearings 241 are secured to both ends of the roller shaft 220b of the reverse roller 220 with the E rings 242, and fixed to side plates 243 like in the eleventh embodiment.

Based on such a structure, when the outer circumferential surface of the reverse roller 220 and the outer circumferential surface of the driven roller 221 come into contact with each other, the driven roller 221 is pressed against the reverse roller 220 by biasing force of the spring 252. Even if the sheet is thin, the sheet can be securely nipped with the reverse roller 220 and the driven roller 221, so that the sheet can be smoothly fed out of the reversing path 207. Further, even if the sheet is thick, the sheet can be securely nipped with the reverse roller 220 and the driven roller 221, so that the sheet can be smoothly fed out of the reversing path 207.

The stepping motor 219 or the like is not coupled to the driven roller 221. Therefore, even if the driven roller 221 is held movably in directions of contacting and being separated away from the reverse roller 220, its holding structure can be simplified.

Figure 29:
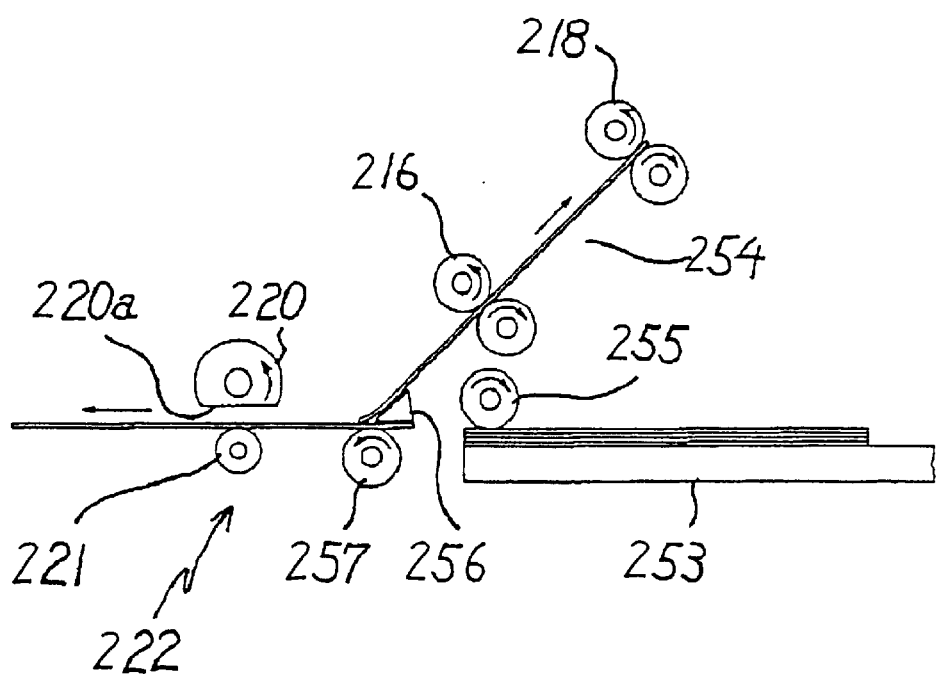
FIG. 29 is a front view schematically showing a structure of an image formation apparatus that conveys a card and forms an image on the card according to a fourteenth embodiment of this invention.

A fourteenth embodiment of this invention will be explained below with reference to FIG. 29. The image formation apparatus of this embodiment performs image formation on a conveyed card such as a ticket and a prepaid card for trains and buses.

This image formation apparatus has a conveying path formed from a card tray 253 as a card storage section that stacks and stores cards to a discharged sheet stacker section (not shown) that discharges the card with a formed image through an image forming section (not shown) that forms the image on the sheet. A path from the card tray 253 to the image forming section of this conveying path is set as a sheet conveying path 254.

The reversing path 207, whose rearmost part is a dead end, is branched on some midpoint of the sheet conveying path 254. A claw 256 and an inlet roller 257 are provided in the location of the branching point. More specifically, this claw 256 switches card conveying directions between the direction that feeds the card supplied from the card tray 253 by a sheet feeding roller 255 into the reversing path 207 and the direction that conveys the card fed out of the reversing path 207 by the sheet reversing device 222 toward the image forming section. This inlet roller 257 is rotated in a direction that feeds the card into the reversing path 207.

A subsequent card b is fed into the reversing path 207 after a preceding card a having been fed into the reversing path 207 is started to be fed out by the sheet reversing device 222. Accordingly, the subsequent card b can be fed out toward the image forming section at the timing at which the preceding card a reaches a predetermined position. Therefore, the cards can be supplied to the image forming section by reducing a space interval between the cards, thus improving the operating efficiency in image formation on the cards.

Further, the sheet reversing device 222 can obtain the same advantageous effect as that explained in the embodiments by applying any of the embodiments to this device.

Figure 30:
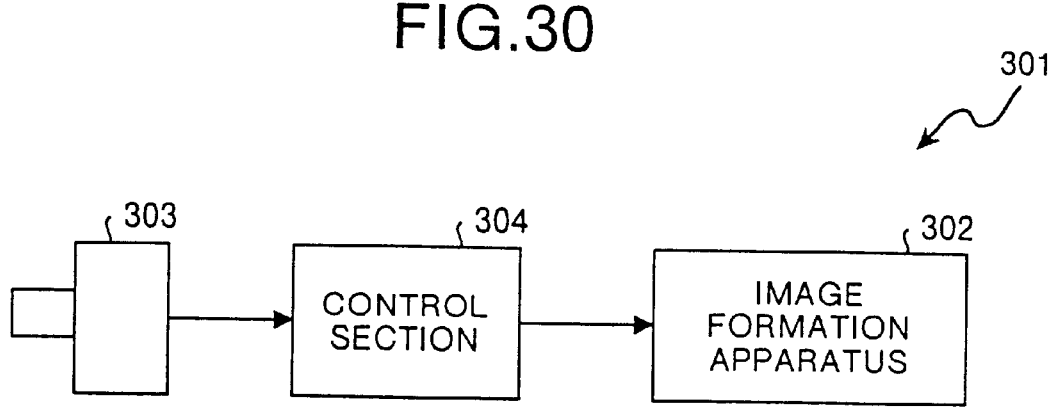
FIG. 30 is a block diagram of a printer according to a fifteenth embodiment of this invention.

A fifteenth embodiment of this invention will be explained below with reference to FIG. 30. The block diagram in FIG. 30 shows a schematic structure of a printer 301 as this embodiment. This printer 301 has the image formation apparatus 302 as explained in any of the eleventh to fourteenth embodiments, input terminal 303 that receives input of image data from an external device such as a personal computer, and the control section 304 that controls the image formation apparatus 302 so as to form an image on the sheet based on the image data.

Therefore, according to this printer 301, the same advantageous effect as that explained in any of the eleventh to fourteenth embodiments can be obtained.

Figure 31:
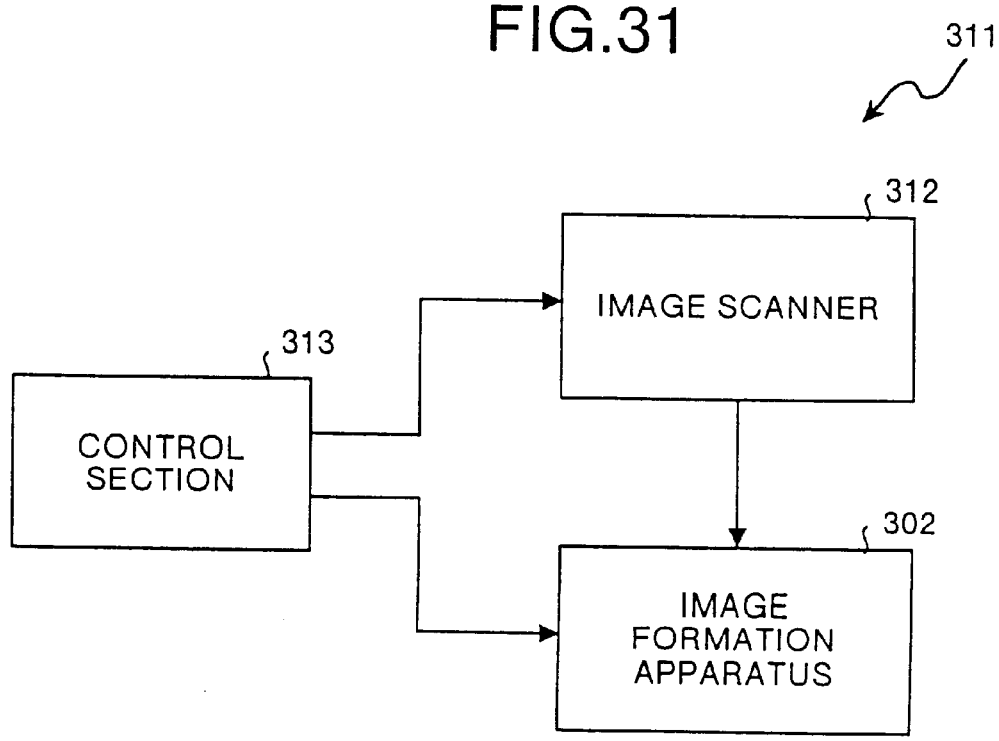
FIG. 31 is a block diagram of a copying machine according to a sixteenth embodiment of this invention.

A sixteenth embodiment of this invention will be explained below with reference to FIG. 31. The block diagram in FIG. 31 shows a schematic structure of a copying machine 311 as this embodiment. This copying machine 311 has the image scanner 312 that scans an image of an original, image formation apparatus 302 as explained in any of the eleventh to fourteenth embodiments, and the control section 313 that controls the image scanner 312 and image formation apparatus 302 to allow the image formation apparatus to form an image on the sheet based on the image data scanned by the image scanner 312.

Therefore, according to this copying machine 311, the same advantageous effect as that explained in any of the eleventh to fourteenth embodiments can be obtained.

Figure 32:
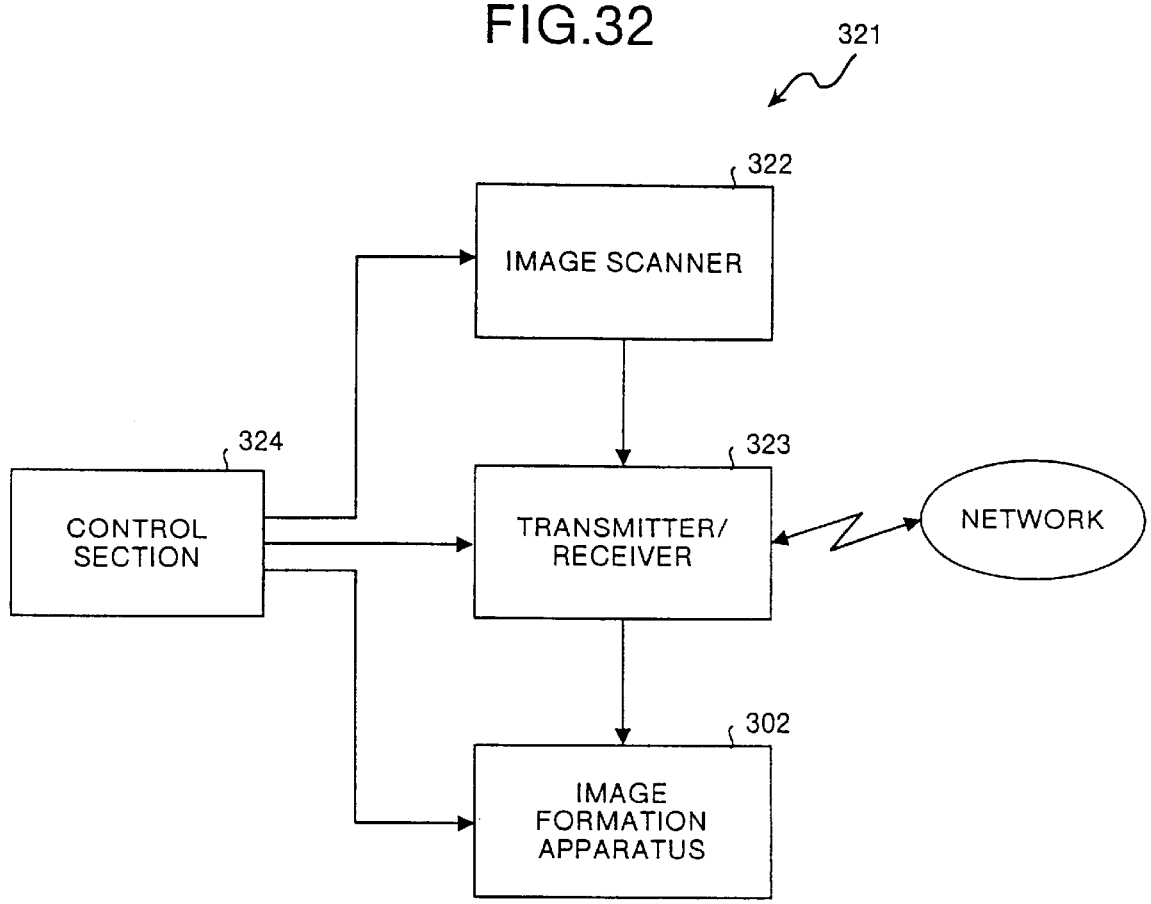
FIG. 32 is a block diagram of a facsimile device according to a seventeenth embodiment of this invention.

A seventeenth embodiment of this invention will be explained below with reference to FIG. 32. The block diagram in FIG. 32 shows a schematic structure of a facsimile device 321 as this embodiment. This facsimile device 321 has the image scanner 322 that scans an image of an original, image formation apparatus 302 as explained in any of the eleventh to fourteenth embodiments, transmitter/receiver 323 that transmits and receives image data with the outside through a network, and the control section 324 that controls the image scanner 322, image formation apparatus 302, and the transmitter/receiver 323. Under the control of this control section 324, the image data of the original scanned by the image scanner 322 is transmitted to the outside through the transmitter/receiver 323, or the image formation apparatus 302 forms an image on the sheet based on the image data received by the transmitter/receiver 323 from the outside through a network.

Therefore, according to this facsimile device 321, during image formation based on the received image data, the same advantageous effect as that explained in any of the eleventh to fourteenth embodiments can be obtained.

Figure 33:
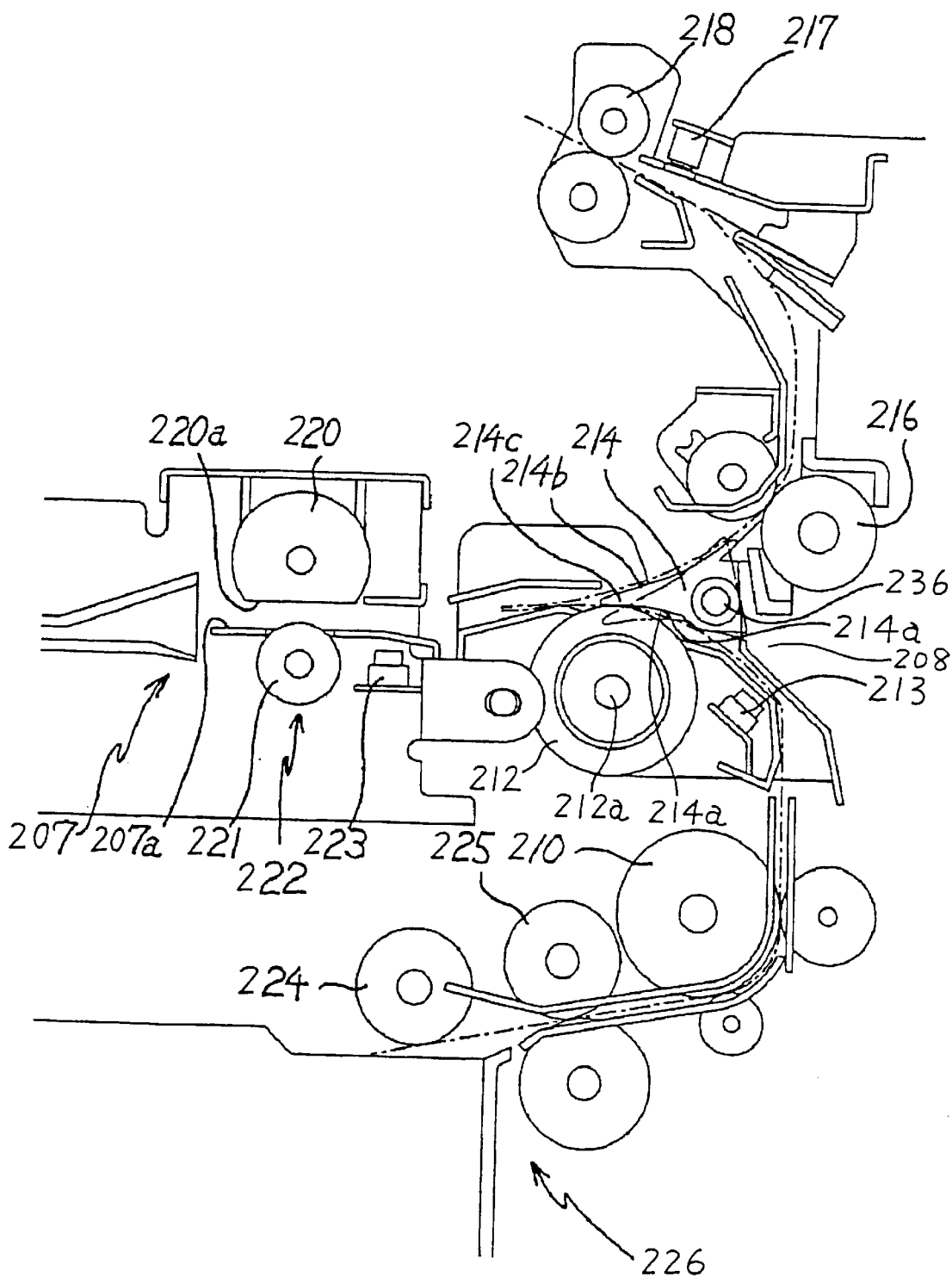
FIG. 33 is a front view showing an enlarged mechanism part to switch back a conveyed sheet.
Figure 34:
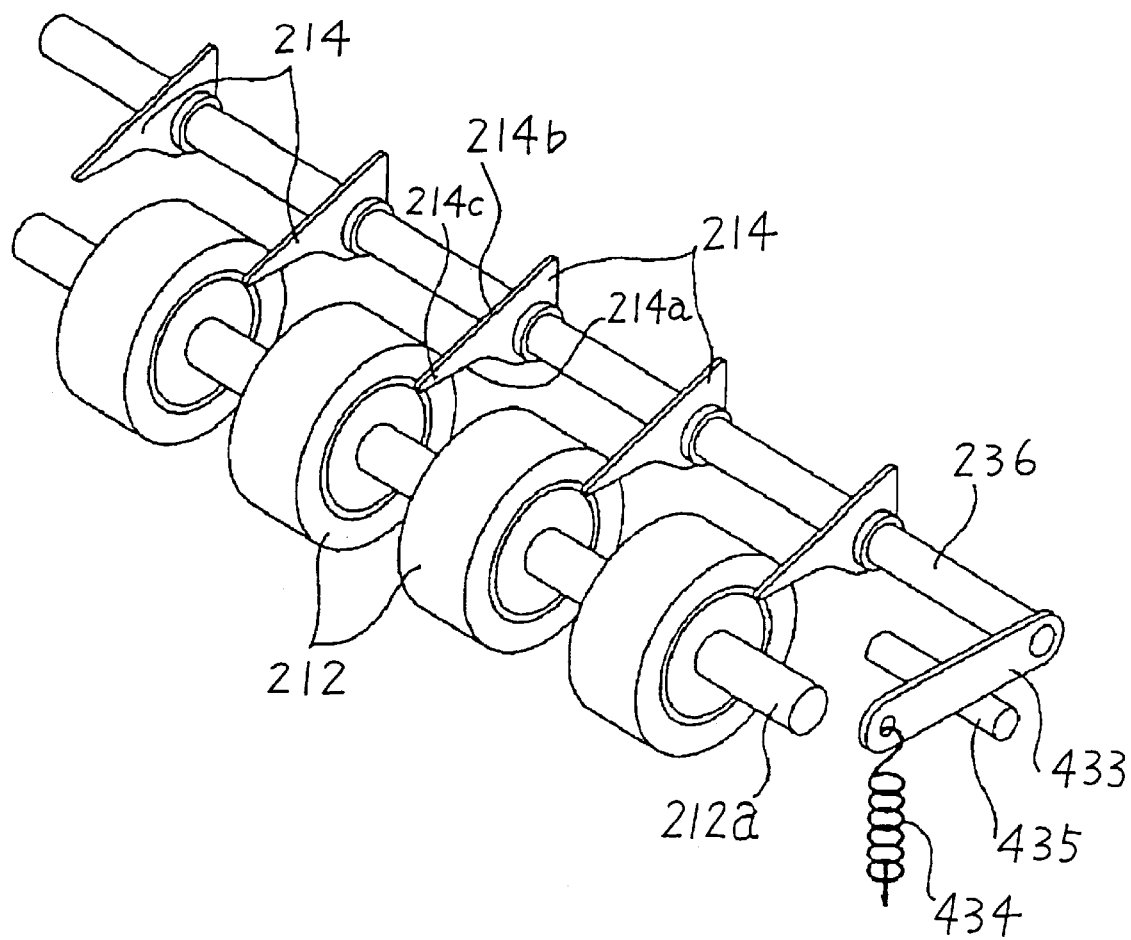
FIG. 34 is a perspective view showing how to arrange inlet rollers and branching claws as a part of the mechanism to switch back a conveyed sheet.
Figure 35A:
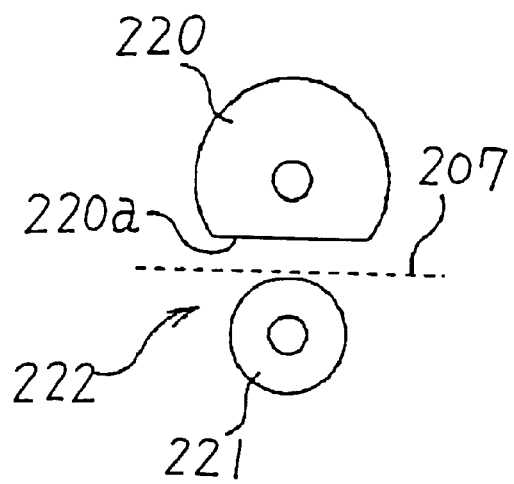
Figure 35B:
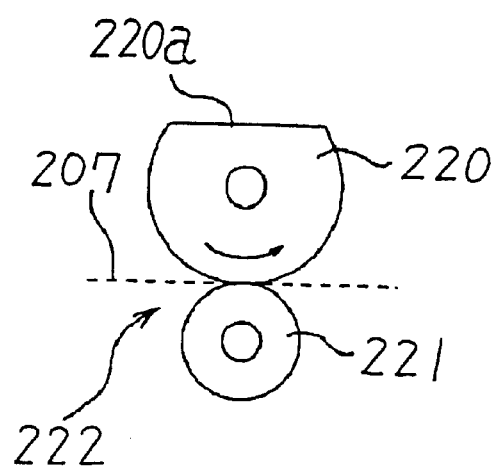
Figure 36:
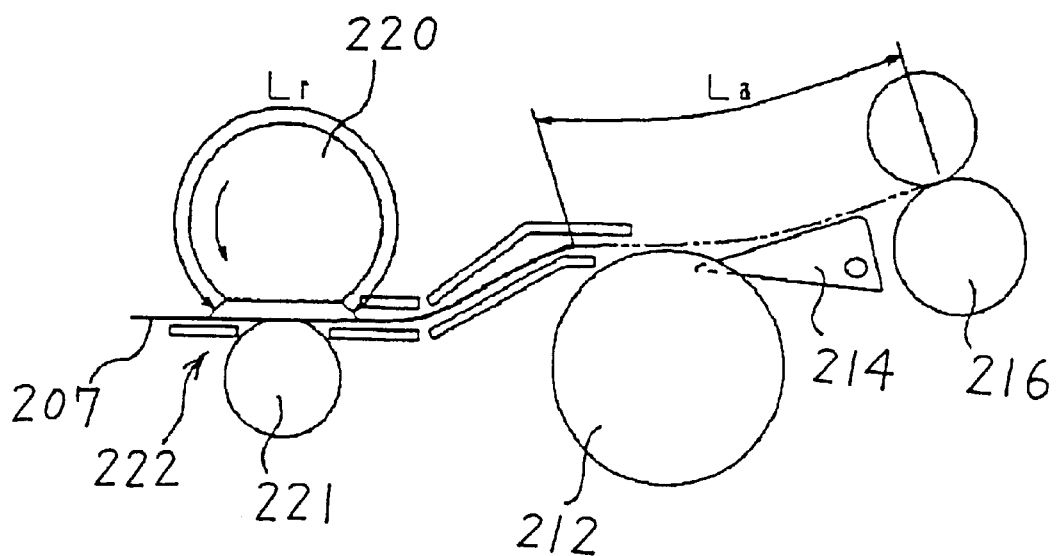
FIG. 36 shows a flow of each sheet when the sheets are continuously conveyed.

An eighteenth embodiment of this invention will be explained below with reference to FIG. 33 to FIG. 36. FIG. 33 is a front view showing an enlarged mechanism part to switch back a conveyed sheet. FIG. 34 is a perspective view showing how to arrange inlet rollers and branching claws as a part of the mechanism for switching back each conveyed sheet. FIG. 35A and FIG. 35B are front views for explaining an operating state of the sheet reversing unit. FIG. 36 shows a flow of each sheet when the sheets are continuously conveyed.

The same legends are assigned to those corresponding to the sections explained in the eleventh embodiment, and explanation is omitted. Only portions specific to the eighteenth embodiment will be explained in detail below.

A branching point 208 is provided on some midpoint of the sheet conveying path 206. A reversing path 207 is branched from this branching point 208. This reversing path 207 functions so as to switch back the sheet conveyed along the sheet conveying path 206. That is, the sheet supplied from the sheet tray 201 is fed into the reversing path 207 once, is then switched back by a sheet reversing unit explained later, and is fed out again to the sheet conveying path 206.

A sheet reversing device 212 comprises a reverse roller 220 intermittently rotated by a stepping motor (not shown), and a driven roller 221 disposed at a position facing the reverse roller 207 through the reversing path 207 and rotated together with the reverse roller when brought into contact with the outer circumferential surface of the reverse roller 220 (see FIG. 35). A flat part 220a is formed on a part of the outer circumferential part of the reverse roller 220. This flat part 220a produces a space with the outer circumferential surface of the driven roller 221 when the flat part 220a faces the driven roller 221. FIG. 35B shows a sheet forwarding state in which the sheet nipped with the reverse roller 220 and the driven roller 221 is fed out from the reversing path 207 when the outer circumferential surface of the reverse roller 220 and the outer circumferential surface of the driven roller 221 come into contact with each other and the reverse roller 220 is rotated in the direction indicated by the arrow. FIG. 35A shows an open state such that a space is produced between the outer circumferential surface of the reverse roller 220 and the driven roller 221 when the flat part 220a faces the driven roller 221. The sheet is fed into the reversing path 207 during this open state.

In the reverse roller 220, its outer circumferential dimension, excluding the part where the flat part 220a is formed, is set to "Lr" (see FIG. 36). The dimension between the rear edge of the sheet (that indicates the front edge when the sheet is fed back) when the sheet fed into the reversing path 207 is stopped within the reversing path 207 and the intermediate conveying rollers 413 is set to "La". The outer circumferential dimension "Lr" and the dimension "La" are the substantially same, and "Lr" is set to be slightly longer than "La". That is, when the sheet fed into the reversing path 207 is imparted with sheet conveying force by the sheet reversing device 222 and is fed out from the reversing path 207, the flat part 220a faces the sheet and the sheet reversing device 222 is brought to an open state immediately after the front edge of the sheet reaches the position of the intermediate conveying rollers 216, and the rear edge of the sheet in the conveying direction is released.

In at least one of the intermediate conveying rollers 216, preferably, in the driving-side roller, its outer circumferential surface is formed with resin having frictional resistance with respect to the sheet of 0.5 or less.

A torque limiter (not shown) is provided between a roller part and a shaft part of the driving-side roller of the intermediate conveying rollers 216. This torque limiter makes the roller part perform no-load operation when more than predetermined level of load is acted on the roller part.

The branching claws 214 are fixed to a supporting shaft 236 disposed adjacent to a central shaft 212a of the inlet rollers 212 and in parallel to this central shaft 212a. The supporting shaft 236 is pivotally supported by bearings (not shown). One end of an arm 433 is fixed to the end of the supporting shaft 236, and one end of a spring 434 is engaged with the other end of the arm 433. A stopper 435 for restricting a pivotal position of the arm 433 is disposed at a position in the direction to which the arm 433 pivots by the biasing force of the spring 434 (see FIG. 34).

The branching claw 214 is pivotally provided around the shaft center of the supporting shaft 236 and pivots together with this supporting shaft 236 so as to be switched between a first switching position (position indicated by the solid line in FIG. 33) and a second switching position (position indicated by the phantom line in FIG. 33). The first switching position is a pivotal position when the rigidness of the sheet to be fed into the reversing path 207 makes the branching claws 214 pivot against the biasing force of the spring 434 and the sheet is proceeding between the outer circumferential surfaces of the inlet rollers 212 and the first guide surfaces 214a of the branching claws 214. The second switching position is a pivotal position when there is no sheet between the outer circumferential surfaces of the inlet rollers 212 and the first guide surfaces 214a of the branching claws 214 and the arm 433 comes into contact with the stopper 435 by the biasing force of the spring 434. When the branching claws 214 are turned to the second switching position, each branching claw tip part 214c is positioned inwardly from the outer circumferential surface of the inlet roller 212 as indicated by the phantom line.

Based on such a structure, the sheets stacked and stored in the sheet tray 201 are separated and fed by the sheet separation/feeding unit 226 one by one, and the separated and fed sheets are continuously fed out along the sheet conveying path 206.

When the front edge of the sheet fed out along the sheet conveying path 206 reaches the branching point 208 and is detected by the inlet sensor 213, the inlet rollers 212 are rotated. The front edge of the sheet having reached the branching point 208 touches the first guide surfaces 214a of the branching claws 214 turned to the second switching position. The branching claws 214 are pushed up by the rigidity of the sheet to be turned to the first switching position, and the sheet passes through between the first guide surfaces 214a and the outer circumferential surfaces of the inlet rollers 212 to be fed into the reversing path 207. When the sheet is passing through between the first guide surfaces 214a and the outer circumferential surfaces of the inlet rollers 212, the branching claws 214 press the sheet against the outer circumferential surfaces of the inlet rollers 212 by the biasing force of the spring 434. Accordingly, sheet conveying force is imparted from the rotating inlet rollers 212 to the sheet, and the sheet is smoothly fed into the reversing path 207. When the sheet is fed into the reversing path 207, the sheet reversing device 222 is in the open state as shown in FIG. 35A.

When the rear edge of the sheet to be fed into the reversing path 207 has passed through between the first guide surfaces 214a and the outer circumferential surfaces of the inlet rollers 212, the branching claws 214 are automatically turned to the second switching position by the biasing force of the spring 434. When the branching claws 434 are turned to the second switching position, each branching claw tip part 214c of the branching claws 214 is positioned inwardly from the outer circumferential surface of the inlet roller 212. Accordingly, when the sheet is fed out from the reversing path 207, the front edge of the sheet is surely prevented from entering into between the outer circumferential surfaces of the inlet rollers 212 and the first guide surfaces 214a of the branching claws 214. Thus, the sheet can be smoothly fed out from the reversing path 207 toward the image forming section 402.

A sheet is fed out from the reversing path 207 by the sheet reversing device 222 by imparting sheet conveying force to the sheet nipped with the reverse roller 220 and the driven roller 221 through such steps that the reverse roller 220 is rotated in the counterclockwise direction as indicated by the arrow in FIG. 36, and the outer circumferential surfaces of the reverse roller 220 and the driven roller 221 come into contact with each other to be brought to the sheet forwarding state as shown in FIG. 35B.

The dimension of sheet feeding from the reversing path 207 by the sheet reversing device 222 is "Lr". When the sheet is fed out by the predetermined dimension "Lr", the front edge of the sheet is captured by the intermediate conveying rollers 216. Immediately after the front edge of the sheet is captured by the intermediate conveying rollers 216, the sheet reversing device 222 is brought to the open state as shown in FIG. 35A, and the rear edge of the sheet nipped with the intermediate conveying rollers 216 in the conveying direction is released.

The sheet nipped with the intermediate conveying rollers 216 is imparted with the sheet conveying force from the intermediate conveying rollers 216, and is conveyed as far as the place where the sheet is brought into contact with the regist rollers 218. Through rotation of the regist rollers 218 at a predetermined timing, the sheet is fed into the image forming section 202, where image formation is performed on the sheet.

Further, immediately after the sheet fed out of the reversing path 207 is captured by the intermediate conveying rollers 216, the sheet reversing device 222 is brought to the open state as shown in FIG. 35A and stopped. Therefore, a subsequent sheet can be fed into the reversing path 207 even when the rear edge of the sheet to be fed out still remains between the reverse roller 220 and the driven roller 221.

The intermediate conveying rollers 216 nip and convey the sheet whose rear edge in its conveying direction is released, and conveying load is not acted on the sheet during this conveyance. Therefore, even if the sheet conveying force of the intermediate conveying rollers 216 is reduced, sheet conveyance by the intermediate conveying rollers 216 can be smoothly carried out. For example, when the sheet whose rear edge is nipped with another conveying rollers is to be conveyed, it is required to impart the sheet conveying force of about 19.6 N to the sheet, while in this embodiment, the sheet conveying force to be imparted from the intermediate conveying rollers 216 to the sheet can be reduced to 9.8 N or less. By reducing the sheet conveying force to be imparted to the sheet, occurrence of noise during the sheet conveyance can be prevented, and further, power consumption required for the sheet conveyance can be reduced.

The torque limiter is provided on the intermediate conveying rollers 216. Therefore, when more than predetermined level of load is acted on the intermediate conveying rollers 216, no-load operation is generated in this torque limiter. Accordingly, the excessive sheet conveying force can be prevented from acting on the sheet conveyed from the reversing path 207 toward the image forming section 202.

The outer circumferential part of the driving-side roller of the intermediate conveying rollers 216 is formed with resin having frictional resistance with respect to the sheet of 0.5 or less. Therefore, after the front edge of the sheet conveyed by the intermediate conveying rollers 216 comes into contact with the regist rollers 218, the intermediate conveying rollers 216 become slippery with respect to the sheet. Thus, the front edge of the sheet can be prevented from being pushed into the nip part between the regist rollers 218 or from being folded due to impartation of excessive sheet conveying force from the intermediate conveying rollers 216 to the sheet.

The flow of each sheet when the sheets are continuously conveyed will be explained below with reference to FIG. 24 and FIG. 25. A subsequent sheet b is conveyed toward the reversing path 207 concurrently when a preceding sheet a is fed out from the reversing path 207 to the sheet conveying path 206. The preceding sheet a is imparted with sheet conveying force by the sheet reversing device 222 first, and after the sheet reversing device 222 is stopped in the open state as shown in FIG. 35A, the sheet is imparted with sheet conveying force by the intermediate conveying rollers 216 and is conveyed toward the image forming section 202. On the other hand, the subsequent sheet b is imparted with sheet conveying force by the conveying rollers 210 and the inlet rollers 212, and is fed into the reversing path 207 when the sheet reversing device 222 is stopped in the open state as shown in FIG. 35A. That is, the subsequent sheet b can be fed into the reversing path 207 during feeding out of the sheet a from the reversing path 207 when the sheet reversing device 222 is brought to the open state. As explained in the diagram of FIG. 40, that is referred to later, by making faster the speed of feeding the sheet into the reversing path 207 than the speed of feeding out the sheet from the reversing path 207, the subsequent sheet b fed into the reversing path 207 and the preceding sheet a fed out therefrom can overlap each other within the reversing path 207, so that the subsequent sheet b can be fed out from the reversing path 207 with a reduced space with the preceding sheet a. Thus, by reducing the space between the sheets a and b to be continuously fed into the image forming section 202, the operating efficiency in the image formation can be improved.

A method of making smaller a space between fore-and-aft sheets fed into the image forming section 202 is not limited to a method of making slower the speed of feeding out the sheet from the reversing path 207 than the speed of feeding the sheet into the reversing path 207. For example, the timing of feeding out sheets from the reversing path 207 may be controlled so that the space between the two sheets is reduced, or the sheet conveying speed may be decelerated on the downstream side from the regist rollers 218.

The sheet conveying operation will be explained below with reference to the diagram of FIG. 26. The sheet is conveyed at a speed Va by the conveying rollers 210 and the inlet rollers 212 from the sheet tray 201 to a reverse stop position within the reversing path 207, while the sheet is conveyed at a speed Vb, which is equivalent to an image forming speed, by the reverse roller 220 and the intermediate conveying rollers 216 from the reverse stop position to the image forming section 202. The speed Va is set to a value faster than the speed Vb.

Figure 37:
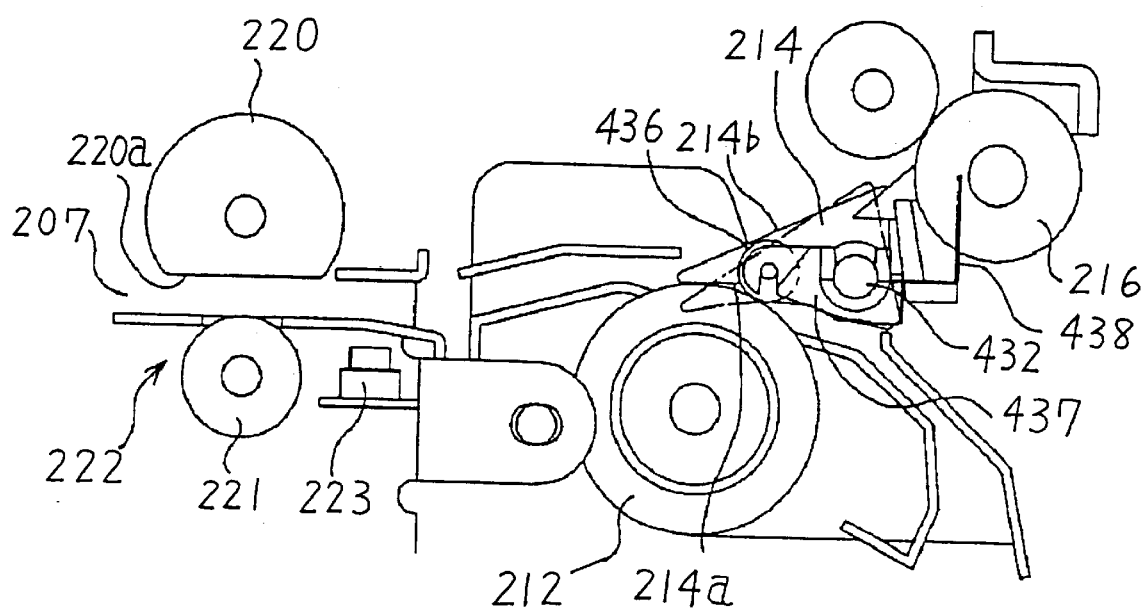
FIG. 37 is a front view showing an enlarged mechanism part to switch back a conveyed sheet in an image formation apparatus according to a nineteenth embodiment of this invention.

A nineteenth embodiment of this invention will be explained below with reference to FIG. 37. The same legends are assigned to those corresponding to the sections explained in the eighteenth embodiment, and explanation is also omitted (the same in the following embodiments).

This embodiment has a structure obtained by adding a driven roller 436 to the place adjacent to the branching claw 214 based on the eighteenth embodiment. The driven roller 436 is provided by one at the central part in the direction of the sheet width perpendicular to the sheet conveying direction, or by two at positions symmetrical with respect to the direction of the sheet width. The driven roller 436 is supported by a bracket 437, which is attached to the supporting shaft 236 so as to be pivotal around its shaft center. The bracket 437 is biased by a leaf spring 438, and the driven roller 436 is elastically in contact with the outer circumferential surface of the inlet roller 212 by the biasing force of this leaf spring 438. As explained in the eighteenth embodiment, the sheet to be fed into the reversing path 207 passes through between the first guide surface 214a of the branching claw 214 and the outer circumferential surface of the inlet roller 212 and passes through a contact part between the outer circumferential surface of the driven roller 436 and the outer circumferential surface of the inlet roller 212.

When the branching claw 214 is positioned at the second switching position (position indicated by the phantom line), a part of the driven roller 436 whose dimension is a radius or less is projected from the second guide surface 214b of the branching claw 214.

Based on such a structure, when the sheet is fed into the reversing path 207, one side of the sheet comes into contact with the outer circumferential surface of the inlet roller 212, while the other side of the sheet comes into contact with the outer circumferential surface of the driven roller 436 and the first guide surface 214a of the branching claw 214. Accordingly, the sheet conveying force to be imparted to the sheet through contact with the driven roller 436 can be increased as compared to the case where the other side of the sheet contacts only the first guide surface 214a of the branching claw 214 as explained in the eighteenth embodiment. Thus, the sheet can be smoothly fed into the reversing path 207.

The part of the driven roller 436 projecting from the second guide surface 214b of the branching claw 214 is rotated along the direction that forwards the sheet fed out of the reversing path 207. Therefore, the underside of the sheet fed out of the reversing path 207 comes into contact with the outer circumferential surface of the driven roller 436, thus promoting feeding out the sheet from the reversing path 207.

Further, when the branching claw 214 is located at the second switching position, the dimension that the driven roller 45 is projected from the second guide surface 412b is not more than its radius. Therefore, even when the front edge of the sheet fed out of the reversing path 207 comes into contact with the outer circumferential surface of the driven roller 436, the front edge of the sheet proceeds along the outer circumferential surface of the driven roller 436 in the rotating direction of the driven roller 436. Thus, the sheet can be prevented from entering into the nip between the outer circumferential surface of the driven roller 436 and the second guide surface 214b of the branching claw 214.

Figure 38:
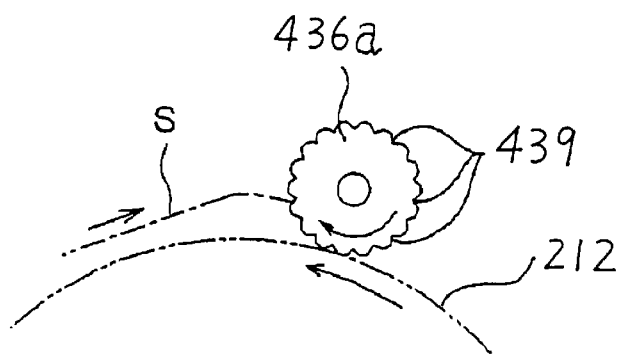
FIG. 38 is a front view showing a driven roller used in an image formation apparatus according to a twentieth embodiment of this invention.

A twentieth embodiment of this invention will be explained below with reference to FIG. 38. This embodiment uses a driven roller 436a instead of the driven roller 436 as explained in the nineteenth embodiment. A sheet front edge catching part 439 that catches the front edge of the sheet fed out of the reversing path 207 is formed on the outer circumferential surface of the driven roller 436a. The sheet front edge catching part 439 has a plurality of grooves extending in parallel to the shaft center of the driven roller 436a, and by forming the sheet front edge catching part 439, the cross section of the driven roller 436a in the direction perpendicular to its central shaft becomes a gear like shape.

Based on such a structure, when such a front edge as curled or folded toward the inlet roller 212 of the sheet S fed out of the reversing path 207 comes into contact with the driven roller 436a, the front edge of the sheet S is caught by the sheet front edge catching part 439 to be conveyed toward the image forming section 202. Therefore, the sheet S can be prevented from occurrence of a jam caused by being folded due to its colliding against the driven roller 436a.

A twenty-first embodiment of this invention will be explained below with reference to FIG. 39A and FIG. 39B. This embodiment is provided with a beat roller pair 440 as a sheet reversing unit. This beat roller pair 440 is composed of a driving roller 440a that rotates and a driven roller 440b that comes into contact with the driving roller 440a to be rotated together with this driving roller 440a. The driven roller 440b is supported by a fulcrum 441 and biased toward the driving roller 440a by a biasing force of a spring 442. Further, a solenoid is provided. This solenoid is used to move the driven roller 440b to the position where the driven roller 440b is separated away from the driving roller 440a against the biasing force of the spring 442.

Figures 39A, 39B:
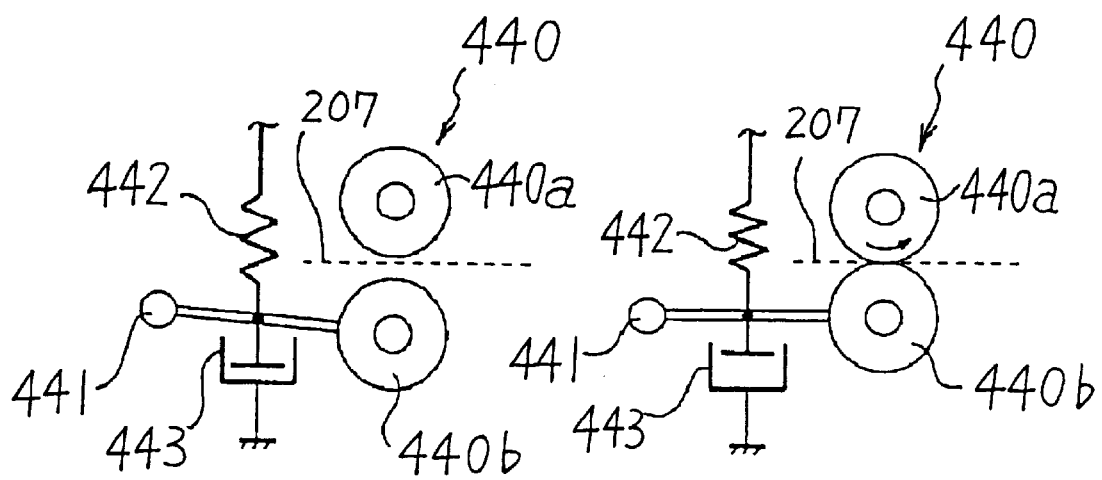

FIG. 39B shows a sheet forwarding state in which the sheet nipped with the driving roller 440a and the driven roller 440b is fed out from the reversing path 207 when the outer circumferential surface of the driving roller 440a and the outer circumferential surface of the driven roller 440b come into contact with each other and the driving roller 440a is rotated in the direction indicated by the arrow. FIG. 39A shows an open state where the driven roller 440b is pulled downward through driving of the solenoid 443 to produce a space between the driving roller 440a and the driven roller 440b. During this open state, the sheet is fed into the reversing path 207.

Based on such a structure, when the beat roller pair 440 is brought to the sheet forwarding state as shown in FIG. 39B, the sheet is fed out from the reversing path 207. Immediately after the front edge of the sheet fed out from the reversing path 207 is captured by the intermediate conveying rollers 216, the beat roller pair 440 is brought to the open state as shown in FIG. 39A, and the subsequent sheet is fed into the reversing path 207. By switching back the sheet using this reversing path 207, a space between fore-and-aft sheets can be reduced within the image forming section 202, thus improving the operating efficiency in continuous image formation.

According to the image formation apparatus as one aspect of this invention, switching between conveying directions of each sheet coming into or going away from the reversing path can be reliably performed by providing the branching claw that is selectable between the first switching position and the second switching position.

Further, in the image formation apparatus, the feeding unit is the inlet roller disposed at the branching point between the sheet conveying path and the reversing path, and which is rotated in the direction that feeds a sheet from the sheet conveying path to the reversing path, and the sheet is conveyed so as to pass through between the outer circumferential surface of the inlet roller and the first guide surface of the branching claw to be fed into the reversing path. Therefore, the inlet roller can impart conveying force to the sheet to be fed into the reversing path, thus smoothly feeding the sheet into the reversing path.

Further, in the image formation apparatus, the branching claw is pivotally disposed around the shaft center of the supporting shaft that is arranged adjacent to the central shaft of the inlet roller in parallel with this central shaft, so that the branching claw and the inlet roller are positioned close to each other. Therefore, a structure to switch between the sheet conveying directions can be made compact by using the branching claw and the inlet roller.

Further, in the image formation apparatus, when the branching claw is located at the second switching position, the branching claw tip part, which is formed with the first guide surface and the second guide surface of the branching claw and directed toward the reversing path, is positioned inwardly from the outer circumferential surface of the inlet roller. Therefore, the sheet fed out of the reversing path can be reliably prevented from entering into the nip between the outer circumferential surface of the inlet roller and the first guide surface of the branching claw, and occurrence of a jam caused by such entrance can be prevented.

Further, the image formation apparatus further comprises the biasing unit that biases the branching claw in the direction that presses a sheet to be fed into the reversing path against the outer circumferential surface of the inlet roller. Therefore, by pressing the sheet to be fed into the reversing path against the outer circumferential surface of the inlet roller, conveying force can be imparted to the sheet from the rotating inlet roller, thus a structure to impart the conveying force to the sheet can be made simple.

Further, in the image formation apparatus, the biasing force of the biasing unit is set to such strength that the rigidness of a sheet to be fed into the reversing path can make the branching claw turn from the second switching position to the first switching position. Therefore, the structure to switch the branching claw between the first switching position and the second switching position can be made simple only by providing the biasing unit. Furthermore, switching of the branching claw between the first switching position and the second switching position can be performed quickly and accurately in response to feeding of the sheet into the reversing path and to finishing of the feeding.

Further, the image formation apparatus further comprises a driven roller disposed close to the branching claw. This driven roller is in contact with the outer circumferential surface of the inlet roller, rotates together with the inlet roller, and nips a sheet to be fed into the reversing path with the outer circumferential surface of the inlet roller at the contact point between both rollers. Therefore, through contact of the driven roller with one side of the sheet along the first guide surface of the branching claw, the conveying force to be imparted to the sheet can be increased more as compared to the case where the side of the sheet along the branching claw contacts only the first guide surface of the branching claw, thus smoothly feeding the sheet into the reversing path.

Further, in the image formation apparatus, a part of the driven roller whose dimension is its radius or less projects from the second guide surface of the branching claw located at the second switching position, and this projecting part rotates in the direction that forwards a sheet fed out of the reversing path along the second guide surface. Accordingly, when the projecting part of the driven roller contacts the surface of the sheet fed out of the reversing path, forwarding the sheet fed out of the reversing path can be promoted. Furthermore, the dimension of the projection is a radius or less of the driven roller. Therefore, even when the front edge of the sheet fed out of the reversing path touches the outer circumferential surface of the driven roller, the sheet can be forwarded in its forwarding direction without entering into the nip between the outer circumferential surface of the driven roller and the second guide surface of the branching claw.

Further, in the image formation apparatus, the driven roller is pivotally supported by the supporting shaft of the branching claw. Therefore, the need for a dedicated shaft to support the driven roller is eliminated, thus obtaining a compact structure.

According to the image formation apparatus as another aspect of this invention, switching between the conveying directions of each sheet coming into or going away from the reversing path can be reliably performed with a simple structure having the inlet roller and the driven roller that is in contact with the outer circumferential surface of the inlet roller and rotates together with the inlet roller.

Further, in the image formation apparatus, the driven roller is disposed at a position where the central shaft of the driven roller is arranged closer to the inlet roller with respect to a path along which the sheet fed out of the reversing path is conveyed. Therefore, even when the front edge of the sheet fed out of the reversing path touches the outer circumferential surface of the driven roller, the sheet proceeds along the outer circumferential surface of the driven roller in the direction that forward the sheet toward the image forming section. Thus, the sheet can be prevented from entering into the nip between the outer circumferential surface of the driven roller and the outer circumferential surface of the inlet roller, and occurrence of a jam caused by such entrance can also be prevented.

Further, in the image formation apparatus, the driven roller has the sheet front edge catching part, which catches the front edge of the sheet fed out of the reversing path and coming into contact with the driven roller, formed on its outer circumferential surface. Therefore, even when the front edge of the sheet fed out of the reversing path is curled or folded toward the inlet roller and such sheet comes into contact with the outer circumferential surface of the driven roller, the front edge of the sheet is caught by the sheet front edge catching part formed on the outer circumferential surface of the driven roller. Therefore, the front edge of the sheet can be conveyed to a position, with rotation of the driven roller, where the sheet is forwarded toward the image forming section, thus smoothly forwarding the sheet fed out of the reversing path.

According to the image formation apparatus as still another aspect of this invention, switching between conveying directions of each sheet coming into or going away from the reversing path can be performed by the belt. Furthermore, feeding of the sheet into the reversing path can be performed in a state where the sheet is nipped with the inlet roller and the belt. Therefore, a nip width of the sheet nipped with by the inlet roller and the belt can be widened, thus smoothly feeding even a rigid sheet into the reversing path.

Further, in the image formation apparatus, the belt unit including the belt is provided pivotally on a supporting shaft as a fulcrum in parallel to the central shaft of the inlet roller, and when a sheet is started to be fed out of the reversing path, the belt unit has been turned to a position where the front part of the belt directed toward the reversing path is positioned inwardly from the outer circumferential surface of the inlet roller. Therefore, the sheet fed out of the reversing path can be prevented from entering into the nip between the outer circumferential surface of the inlet roller and the belt, and occurrence of a jam caused by such entrance can be prevented, thus smoothly forwarding the sheet fed out of the reversing path.

Further, the image formation apparatus further comprises the driving unit that rotates the belt in its driven direction. Therefore, a larger conveying force can be imparted to the sheet by rotating the belt, thus more smoothly feeding the sheet into the reversing path.

According to the image formation apparatus as still another aspect of this invention, switching between the conveying directions of each sheet coming into or going away from the reversing path can be reliably performed with a simple structure having the inlet roller and the blade to be pressed against the outer circumferential surface of the inlet roller.

Further, in the image formation apparatus, the blade is pressed against the outer circumferential surface of the inlet roller by elasticity of its own. Therefore, there is no need to additionally provide a unit for pressing the blade against the outer circumferential surface of the inlet roller, thus obtaining a simpler structure.

Further, in the image formation apparatus, the blade is pressed against the outer circumferential surface of the inlet roller by the biasing force of the biasing unit. Therefore, the blade can be made of a high slip material, thus smoothly feeding the sheet into the reversing path by passing the sheet through between the inlet roller and the blade.

Further, in the image formation apparatus, a contact part of the blade with the outer circumferential surface of the inlet roller is bent along a shape of the outer circumferential surface of the inlet roller. Therefore, the blade can be in close contact with the outer circumferential surface of the inlet roller, and the sheet fed out of the reversing path can be prevented from being caught on the blade, thus smoothly switching between the sheet conveying directions.

Further, in the image formation apparatus, the smaller diameter part is formed on the outer circumferential part of the inlet roller, and the front edge of the blade is in contact with the smaller diameter part. Therefore, the sheet fed out of the reversing path can be more reliably prevented from being caught on the blade, thus more smoothly switching between the sheet conveying directions.

Further, in the image formation apparatus, a sheet switched back and forwarded from the reversing path to the downstream side of the sheet conveying path and a subsequent sheet to be fed into the reversing path during forwarding of the sheet are conveyed so that at least respective parts of the sheets overlap each other. Accordingly, the subsequent sheet can be in a standby state so as to be ready to be fed out of the reversing path during forwarding of the preceding sheet from the reversing path. Therefore, when the subsequent sheet is switched back to be fed out of the reversing path, the required smallest possible space with the preceding sheet can be surely maintained, thus making sufficiently smaller the space between the sheets continuously fed into the image forming section.

Further, in the image formation apparatus, the sheet conveying path is formed in a vertical direction between the sheet storage section positioned on the lower side and the image forming section positioned on the upper side, and the reversing path is formed in a direction substantially perpendicular to the sheet conveying path. Therefore, in accordance with the image formation apparatus, the reversing path can be formed so as to be positioned within a projection plane of the image forming section. Accordingly, the lateral dimension of the image formation apparatus is not increased despite formation of such a reversing path, thus achieving minimization of the image formation apparatus in lateral dimension.

Further, in the image formation apparatus, the image forming section is based on the electrophotographic system. Therefore, the image formation apparatus provided with the image forming section based on the electrophotographic system can obtain the same advantageous effect as that of any of the above-mentioned aspects of this invention.

Further, in the image formation apparatus, the image forming section is based on the digital electrophotographic system provided with the digital writing unit. Therefore, the image formation apparatus provided with the image forming section based on the digital electrophotographic system with the digital writing unit can obtain the same advantageous effect as that of any of the above-mentioned aspects of this invention.

The copying machine according to still another aspect of this invention comprises the image scanner that scans an image of an original, the image formation apparatus according to the invention, and the control section that controls the image scanner and the image formation apparatus to allow the image formation apparatus to form an image on a sheet based on the image data for the original scanned by the image scanner. Therefore, this copying machine can also obtain the same advantageous effect as that of any of the above-mentioned aspects of this invention.

According to image formation apparatus as still another aspect of this invention, when a sheet is fed out of the reversing path, feeding is performed by nipping the sheet with a part except the low friction part of the reverse roller and the driven roller and rotating the reverse roller. Therefore, the sheet can be smoothly forwarded by imparting the sufficient conveying force to the sheet. Furthermore, during feeding out of the sheet from the reversing path, only the reverse roller is rotated. Therefore, occurrence of noise due to a collision between the reverse roller and the driven roller can be prevented. Furthermore, by stopping the reverse roller at the position where the low friction part faces the driven roller, frictional resistance with respect to the sheet passing through between the reverse roller and the driven roller becomes low. Therefore, the sheet can smoothly pass through the space between the reverse roller in its stopped state and the driven roller.

Further, in the image formation apparatus, a sheet switched back and forwarded from the reversing path to the downstream side of the sheet conveying path and a subsequent sheet fed into the reversing path during forwarding of the sheet are conveyed so that at least respective parts of the sheets overlap each other. Accordingly, the subsequent sheet can be in a standby state so as to be ready to be fed out from the reversing path during feeding out of the preceding sheet from the reversing path. Therefore, when the subsequent sheet is switched back to be fed out from the reversing path, the required smallest possible space with the preceding sheet can be surely maintained, thus making sufficiently smaller the space between the sheets continuously fed into the image forming section.

Further, in the image formation apparatus, the reverse roller has a flat part as a low friction part partially formed on its outer circumferential part. Therefore, when the reverse roller is stopped at the position where the flat part faces the driven roller, a space between the reverse roller and the driven roller is produced, thus smoothly passing through the sheet between the reverse roller and the driven roller.

Further, in the image formation apparatus, the driving section is coupled to one end of the roller shaft of the reverse roller and the rotational position detecting unit is provided on the other end of the roller shaft. Therefore, the rotational position detecting unit can detect more accurately a rotational position of the reverse roller, thus controlling the rotation and stopping of the reverse roller with high precision.

Further, in the image formation apparatus, the driving section is a stepping motor. Therefore, rotation and stopping of the reverse roller can be controlled more precisely, thus securely stopping the reverse roller at the position where the flat part faces the driven roller.

Further, in the image formation apparatus, the reverse roller has a plurality of roller parts arranged along the lateral direction perpendicular to the sheet conveying direction. Therefore, uniform force can be applied to the sheet in its lateral direction when the sheet is fed out from the reversing path, thus preventing a skew of the sheet to be fed out.

Further, in the image formation apparatus, the reverse roller has one wide roller part at a central part in the lateral direction perpendicular to the sheet conveying direction. Therefore, the structure of the reverse roller is made simpler to obtain an inexpensive sheet reversing unit.

Further, in the image formation apparatus, at least one of the reverse roller and the driven roller is a rubber roller. Therefore, occurrence of a slip can be prevented when the sheet is fed out of the reversing path, thus precisely feeding out the sheet from the reversing path.

Further, in the image formation apparatus, both ends of the roller shaft of the reverse roller and the roller shaft of the driven roller are held by respective bearings, and the bearings are fixed to the side plates positioned on both sides in the lateral direction perpendicular to the sheet conveying direction on the reversing path. Therefore, the holding structure of the reverse roller and the driven roller is made simpler to obtain an inexpensive sheet reversing unit.

Further, in the image formation apparatus, the reverse roller is held at a fixed position, while the driven roller is held movably in directions of contacting and being separated away from the reverse roller, and is biased by the biasing unit in the direction that contacts the reverse roller. Therefore, even if sheets have different thickness, the sheet can securely be nipped with the reverse roller and the driven roller, so that forwarding of the sheet can be surely performed. Furthermore, the driving section is not coupled to the driven roller. Therefore, even when the driven roller is held movably, the holding structure can be made simple.

Further, in the image formation apparatus, the upper side of the outer circumferential part of the driven roller slightly projects from the sheet guide surface of the reversing path. Therefore, the sheet fed out of the reversing path can be securely nipped with the reverse roller and the driven roller and smoothly forwarded. Furthermore, it is possible to prevent occurrence of a skew caused by heavy rubbing of the sheet fed out of the conveying path with the sheet guide surface.

Further, the image formation apparatus further comprises the detection sensor that detects a sheet to be fed into the reversing path, and the driving unit that reverses the reverse roller after a predetermined period of time elapses according to a detection result by the detection sensor. Therefore, the detection result by the detection sensor can be used as a trigger for the driving unit, thus precisely controlling the timing of reversing the reverse roller.

Further, in the image formation apparatus, the detection sensor is disposed at least one side in front of and behind the branching point between the sheet conveying path and the reversing path. Therefore, the detection sensor is positioned at a place close to the reversing path, thus more precisely controlling the timing of reversing the reverse roller by using the result of detection from this detection sensor as a trigger for the driving unit.

Further, in the image formation apparatus, the detection sensor detects the rear edge of a sheet. Therefore, the time since the detection sensor detects the sheet until the reverse roller is rotated in reverse direction can be reduced, thus more precisely controlling the timing of driving the reverse roller by using the result of detection from this detection sensor as a trigger for the driving unit.

Further, in the image formation apparatus, the image forming section is based on the electrophotographic system. Therefore, the image formation apparatus having the image forming section based on the electrophotographic system can obtain the same advantageous effect as that of any of the above-mentioned aspects of this invention.

Further, in the image formation apparatus, the image forming section is based on the digital electrophotographic system provided with the digital writing unit. Therefore, the image formation apparatus having the image forming section based on the digital electrophotographic system with the digital writing unit can obtain the same advantageous effect as that of any of the above-mentioned aspects of this invention.

Further, in the image formation apparatus, the image forming section is based on the non-electrophotographic system. Therefore, the image formation apparatus having the image forming section based on the non-electrophotographic system can obtain the same advantageous effect as that of any of the above-mentioned aspects of this invention.

Further, in the image formation apparatus, the sheet to be used is a card. Therefore, the image formation apparatus, that performs image formation on the conveyed card, can obtain the same advantageous effect as that of any of the above-mentioned aspects of this invention.

The printer according to still another aspect of this invention comprises the image formation apparatus according to the invention, the input terminal that receives input of image data, and the control section that controls the image formation apparatus so as to form an image on the sheet based on the image data. Therefore, this printer can also obtain the same advantageous effect as that of any of the above-mentioned aspects of this invention.

The copying machine according to still another aspect of this invention comprises the image scanner that scans an image of an original, the image formation apparatus according to the invention, and the control section that controls the image scanner and the image formation apparatus to allow the image formation apparatus to form an image on the sheet based on the image data for the original scanned by the image scanner. Therefore, this copying machine can also obtain the same advantageous effect as that of any of the above-mentioned aspects of this invention.

The facsimile device according to still another aspect of this invention comprises the image scanner that scans an image of an original, image formation apparatus according to the invention, transmitter/receiver that performs transmission and reception of image data with the outside through a network, and the control section that controls the image scanner, image formation apparatus, and the transmitter/receiver so as to allow the transmitter/receiver to transmit the image data for the original scanned by the image scanner to the outside through a network, and allow the image formation apparatus to form an image on the sheet based on the image data received from the outside through the network. Therefore, this facsimile device can also obtain the same advantageous effect as that of any of the above-mentioned aspects of this invention.

Further, in the image formation apparatus, when the sheet fed out of the reversing path is captured by the intermediate conveying rollers to be conveyed to the image forming section, the rear side of the sheet in the conveying direction nipped with the intermediate conveying rollers is released, so that conveyance load is not acted on the sheet. Therefore, even if the sheet conveying force of the intermediate conveying rollers is reduced, sheet conveyance can be smoothly performed, occurrence of noise during the sheet conveyance can be prevented by reducing the sheet conveying force, and power consumption required for the sheet conveyance can be reduced.

Further, in the image formation apparatus, the sheet reversing unit, that switches back and feeds out the sheet from the reversing path the sheet, comprises the reverse roller intermittently rotated, and the driven roller in contact with the outer circumferential surface of the reverse roller to be rotated together with the reverse roller. The flat part, which produces a space with the outer circumferential surface of the driven roller, is formed on the outer circumferential part of the reverse roller. Therefore, when the driven roller is brought into contact with the outer circumferential surface of the reverse roller and is rotated together with the reverse roller, the sheet reversing unit is brought to the sheet forwarding state, thus feeding out the sheet from the reversing path. The sheet reversing unit is brought to the open state when the flat part of the reverse roller faces the driven roller and a space is produced with the outer circumferential surface of the driven roller, thus feeding the sheet into the reversing path.

Further, in the image formation apparatus, the sheet reversing unit that feeds out the sheet from the reversing path is a beat roller pair that is movable between a position where the outer circumferential surfaces of the rollers come into contact with a sheet to nip the sheet and a position where the rollers are separated away from the sheet, and at least one of the rollers is rotated in the normal and reverse directions. Therefore, when the beat roller pair is moved to the position where their outer circumferential surfaces come into contact with the sheet to nip the sheet, the sheet reversing unit is brought to the sheet forwarding state, thus feeding out the sheet from the reversing path. When the beat roller pair is moved to the position where the roller is separated away from the sheet, the sheet reversing unit is brought to the open state, thus feeding the sheet into the reversing path.

Further, in the image formation apparatus, the intermediate conveying rollers have the toque limiter that performs no-load operation when load becomes a predetermined level or more. Therefore, when the intermediate conveying rollers are brought to a state where an excessive sheet conveying force is acted on the intermediate conveying rollers, no-load operation occurs in the toque limiter, thus preventing the excessive sheet conveying force from acting on the sheet to be conveyed from the reversing path to the image forming section.

Further, in the image formation apparatus, frictional resistance of at least one of the intermediate conveying rollers with respect to a sheet is not more than 0.5. Therefore, after the front edge of the sheet conveyed by the intermediate conveying rollers is brought into contact with the regist rollers disposed at a position immediately before the image forming section, the intermediate conveying rollers become slippery with respect to the sheet. Thus, the front edge of the sheet can be prevented from being pushed into the nip part between the regist rollers or from being folded due to impartation of the excessive sheet conveying force from the intermediate conveying rollers to the sheet.

The present document incorporates by reference the entire contents of Japanese priority documents, 2000-326375 filed in Japan on Oct. 26, 2000, 2000-329412 filed in Japan on Oct. 27, 2000, 2001-021528 filed in Jan. 30, 2001, 2001-279355 filed in Japan on Sep. 14, 2001, and 2001-281144 filed in Japan on Sep. 17, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image formation apparatus comprising:

a sheet storage section that stacks and stores sheets;

a sheet separation/feeding unit that separates and feeds said sheets from said sheet storage section one by one;

an image forming section that forms an image on said fed sheet;

a sheet conveying path from said sheet storage section to said image forming section;

a reversing path connected to some midpoint of said sheet conveying path, and into which said separated and fed sheet is fed;

a feeding unit that feeds said sheet conveyed along said sheet conveying path into said reversing path;

a sheet reversing unit that switches back said sheet fed into said reversing path, forwards said sheet to the downstream side of said sheet conveying path, and allows a subsequent sheet to be fed into said reversing path during forwarding of said sheet; and a branching claw disposed at a branching point between said sheet conveying path and said reversing path, and which has a first guide surface and a second guide surface and is selectable between a first switching position, that allows said sheet to be fed into said reversing path through its conveyance along said first guide surface, and a second switching position that allows said sheet to be fed out from said reversing path to the downstream side of said sheet conveying path through its conveyance along said second guide surface.

2. The image formation apparatus according to claim 1, wherein said feeding unit is an inlet roller disposed at said branching point between said sheet conveying path and said reversing path, and which is rotated in a direction that feeds a sheet from said sheet conveying path to said reversing path, and said sheet is conveyed so as to pass through between an outer circumferential surface of said inlet roller and said first guide surface of said branching claw to be fed into said reversing path.

3. The image formation apparatus according to claim 2, wherein said branching claw is pivotally disposed around a shaft center of a supporting shaft that is provided adjacent to a central shaft of said inlet roller in parallel with said central shaft.

4. The image formation apparatus according to claim 2, wherein, when said branching claw is located at the second switching position, a branching claw tip part, which is formed with said first guide surface and said second guide surface of said branching claw and directed toward said reversing path, is positioned inwardly from said outer circumferential surface of said inlet roller.

5. The image formation apparatus according to claim 2 further comprising a biasing unit that biases said branching claw in a direction that presses a sheet to be fed into said reversing path against the outer circumferential surface of said inlet roller.

6. The image formation apparatus according to claim 5, wherein the biasing force of said biasing unit is set to such strength that the rigidity of a sheet to be fed into said reversing path can make said branching claw turn from the second switching position to the first switching position.

7. The image formation apparatus according to claim 2 further comprising a driven roller disposed close to said branching claw, said driven roller contacting the outer circumferential surface of said inlet roller, rotating together with said inlet roller, and nipping a sheet to be fed into said reversing path with the outer circumferential surface of said inlet roller at the contact point between both rollers.

8. The image formation apparatus according to claim 7, wherein a part of said driven roller whose dimension is its radius or less projects from said second guide surface of said branching claw that is located at the second switching position.

9. The image formation apparatus according to claim 7, wherein said driven roller is pivotally supported by said supporting shaft of said branching claw.

10. The image formation apparatus according to claim 1, wherein a sheet to be switched back and forwarded from said reversing path to the downstream side of said sheet conveying path and a subsequent sheet to be fed into said reversing path during forwarding of said sheet are conveyed so that at least respective parts of said sheets overlap each other.

11. The image formation apparatus according to claim 1, wherein said sheet conveying path is formed in a vertical direction between said sheet storage section positioned on the lower side and said image forming section positioned on the upper side, and said reversing path is formed in a direction substantially perpendicular to said sheet conveying path.

12. The image formation apparatus according to claim 1, wherein said image forming section is based on an electrophotographic system.

13. The image formation apparatus according to claim 1, wherein said image forming section is based on a digital electrophotographic system provided with a digital writing unit.

14. The image formation apparatus according to claim 1, wherein said sheet reversing unit is selectable between a sheet forwarding state in which a sheet fed into said reversing path is switched back and forwarded to said sheet conveying path, and an open state in which the sheet forwarding state is released and a subsequent sheet is allowed to be fed into said reversing path so that said subsequent sheet and said fed-out sheet pass each other, and
said image formation apparatus further comprising intermediate conveying rollers that nip a sheet fed out by said sheet reversing unit immediately before said sheet reversing unit is brought to the open state, and convey said sheet, whose rear side in its conveying direction is released, toward said image forming section.

15. An image formation apparatus comprising:
a sheet storage section that stacks and stores sheets;
a sheet separation/feeding unit that separates and feeds said sheets from said sheet storage section one by one;
an image forming section that forms an image on said fed sheet;
a sheet conveying path from said sheet storage section to said image forming section;
a reversing path connected to some midpoint of said sheet conveying path, and into which said separated and fed sheet is fed;
a sheet reversing unit that switches back said sheet fed into said reversing path, forwards said sheet to the downstream side of said sheet conveying path, and allows a subsequent sheet to be fed into said reversing path during forwarding of said sheet;
an inlet roller disposed at a branching point between said sheet conveying path and said reversing path, and rotated in a direction that feeds said sheet brought into contact with its outer circumferential surface from said sheet storage section to said reversing path; and
a driven roller that contacts the outer circumferential surface of said inlet roller, rotates together with said inlet roller, nips said sheet to be fed into said reversing path with the outer circumferential surface of said inlet roller at the contact point between both rollers, and rotates in a direction that feeds out said sheet from said reversing path toward said image forming section.

16. The image formation apparatus according to claim 15, wherein said driven roller is disposed at a position where the central shaft of said driven roller is disposed closer to said inlet roller with respect to a path along which said sheet fed out of said reversing path is conveyed.

17. The image formation apparatus according to claim 15, wherein said driven roller has a sheet front edge catching part, which catches the front edge of a sheet fed out from said reversing path and brought into contact with said driven roller, formed on its outer circumferential surface.

18. The image formation apparatus according to claim 15, wherein a sheet to be switched back and forwarded from said reversing path to the downstream side of said sheet conveying path and a subsequent sheet to be fed into said reversing path during forwarding of said sheet are conveyed so that at least respective parts of said sheets overlap each other.

19. The image formation apparatus according to claim 15, wherein said sheet conveying path is formed in a vertical direction between said sheet storage section positioned on the lower side and said image forming section positioned on the upper side, and said reversing path is formed in a direction substantially perpendicular to said sheet conveying path.

20. The image formation apparatus according to claim 15, wherein said image forming section is based on an electrophotographic system.

21. The image formation apparatus according to claim 15, wherein said image forming section is based on a digital electrophotographic system provided with a digital writing unit.

22. The image formation apparatus according to claim 15, wherein said sheet reversing unit is selectable between a sheet forwarding state in which a sheet fed into said reversing path is switched back and forwarded to said sheet conveying path, and an open state in which the sheet forwarding state is released and a subsequent sheet is allowed to be fed into said reversing path so that, said subsequent sheet and said fed-out sheet pass each other, and
said image formation apparatus further comprising intermediate conveying rollers that nip a sheet fed out by said sheet reversing unit immediately before said sheet reversing unit is brought to the open state, and convey said sheet, whose rear side in its conveying direction is released, toward said image forming section.

23. An image formation apparatus comprising:
a sheet storage section that stacks and stores sheets;
a sheet separation/feeding unit that separates and feeds said sheets from said sheet storage section one by one;
an image forming section that forms an image on said fed sheet;
a sheet conveying path from said sheet storage section to said image forming section;
a reversing path connected to some midpoint of said sheet conveying path, and into which said separated and fed sheet is fed;
a sheet reversing unit that switches back said sheet fed into said reversing path, forwards said sheet to the downstream side of said sheet conveying path, and allows a subsequent sheet to be fed into said reversing path during forwarding of said sheet;
an inlet roller disposed at a branching point between said sheet conveying path and said reversing path, and rotated in a direction that feeds said sheet brought into contact with its outer circumferential surface from said sheet storage section to said reversing path; and
a belt disposed in a direction such that said belt has a surface along a sheet to be fed into said reversing path and a surface along a sheet to be fed out of said reversing path, and which presses said sheet to be fed into said reversing path against the outer circumferential surface of said inlet roller and is rotated together with said inlet roller.

24. The image formation apparatus according to claim 23, wherein a belt unit including said belt is provided pivotally on a supporting shaft as a fulcrum in parallel to the central shaft of said inlet roller, and when said sheet is started to be fed out from said reversing path, said belt unit has been turned to a position where the front part of said belt directed toward said reversing path is positioned inwardly from the outer circumferential surface of said inlet roller.

25. The image formation apparatus according to claim 23 further comprising a driving unit that rotates said belt in its driven direction.

26. The image formation apparatus according to claim 23, wherein a sheet to be switched back and forwarded from said reversing path to the downstream side of said sheet conveying path and a subsequent sheet to be fed into said reversing path during forwarding of said sheet are conveyed so that at least respective parts of said sheets overlap each other.

27. The image formation apparatus according to claim 23, wherein said sheet conveying path is formed in a vertical direction between said sheet storage section positioned on the lower side and said image forming section positioned on the upper side, and said reversing path is formed in a direction substantially perpendicular to said sheet conveying path.

28. The image formation apparatus according to claim 23, wherein said image forming section is based on an electrophotographic system.

29. The image formation apparatus according to claim 23, wherein said image forming section is based on a digital electrophotographic system provided with a digital writing unit.

30. The image formation apparatus according to claim 23, wherein said sheet reversing unit is selectable between a sheet forwarding state in which a sheet fed into said reversing path is switched back and forwarded to said sheet conveying path, and an open state in which the sheet forwarding state is released and a subsequent sheet is allowed to be fed into said reversing path so that said subsequent sheet and said fed-out sheet pass each other, and said image formation apparatus further comprising intermediate conveying rollers that nip a sheet fed out by said sheet reversing unit immediately before said sheet reversing unit is brought to the open state, and convey said sheet, whose rear side in its conveying direction is released, toward said image forming section.

31. An image formation apparatus comprising:
a sheet storage section that stacks and stores sheets;
a sheet separation/feeding unit that separates and feeds said sheets from said sheet storage section one by one;
an image forming section that forms an image on said fed sheet;
a sheet conveying path from said sheet storage section to said image forming section;
a reversing path connected to some midpoint of said sheet conveying path, and into which said separated and fed sheet is fed;
a sheet reversing unit that switches back said sheet fed into said reversing path, forwards said sheet to the downstream side of said sheet conveying path, and allows a subsequent sheet to be fed into said reversing path during forwarding of said sheet;
an inlet roller disposed at a branching point between said sheet conveying path and said reversing path, and rotated in a direction that feeds said sheet brought into contact with its outer circumferential surface from said sheet storage section to said reversing path; and
a blade extending in a direction that feeds said sheet into said reversing path, and whose front end is pressed against the outer circumferential surface of said inlet roller.

32. The image formation apparatus according to claim 31, wherein said blade is pressed against the outer circumferential surface of said inlet roller by elasticity of its own.

33. The image formation apparatus according to claim 31, wherein said blade is pressed against the outer circumferential surface of said inlet roller by biasing force of a biasing unit.

34. The image formation apparatus according to claim 31, wherein a contact part of said blade with the outer circumferential surface of said inlet roller is bent along a shape of the outer circumferential surface of said inlet roller.

35. The image formation apparatus according to claim 31, wherein a smaller diameter part is formed on the outer circumferential part of said inlet roller, and the front end of said blade is in contact with said smaller diameter part.

36. The image formation apparatus according to claim 31, wherein a sheet to be switched back and forwarded from said reversing path to the downstream side of said sheet conveying path and a subsequent sheet to be fed into said reversing path during forwarding of said sheet are conveyed so that at least respective parts of said sheets overlap each other.

37. The image formation apparatus according to claim 31, wherein said sheet conveying path is formed in a vertical direction between said sheet storage section positioned on the lower side and said image forming section positioned on the upper side, and said reversing path is formed in a direction substantially perpendicular to said sheet conveying path.

38. The image formation apparatus according to claim 31, wherein said image forming section is based on an electrophotographic system.

39. The image formation apparatus according to claim 31, wherein said image forming section is based on a digital electrophotographic system provided with a digital writing unit.

40. The image formation apparatus according to claim 31, wherein said sheet reversing unit is selectable between a sheet forwarding state in which a sheet fed into said reversing path is switched back and forwarded to said sheet conveying path, and an open state in which the sheet forwarding state is released and a subsequent sheet is allowed to be fed into said reversing path so that said subsequent sheet and said fed-out sheet pass each other, and said image formation apparatus further comprising intermediate conveying rollers that nip a sheet fed out by said sheet reversing unit immediately before said sheet reversing unit is brought to the open state, and convey said sheet, whose rear side in its conveying direction is released, toward said image forming section.

41. A copying machine comprising:

an image scanner that scans an image of an original;

an image formation apparatus including, a sheet storage section that stacks and stores sheets, a sheet separation/feeding unit that separates and feeds said sheets from said sheet storage section one by one, an image forming section that forms an image on said fed sheet, a sheet conveying path from said sheet storage section to said image forming section, a reversing path connected to some midpoint of said sheet conveying path, and into which said separated and fed sheet is fed, a feeding unit that feeds said sheet conveyed along said sheet conveying path into said reversing path, a sheet reversing unit that switches back said sheet fed into said reversing path, forwards said sheet to the downstream side of said sheet conveying path, and allows a subsequent sheet to be fed into said reversing path during forwarding of said sheet and a branching claw disposed at a branching point between said sheet conveying path and said reversing path, and which has a first guide surface and a second guide surface and is selectable between a first switching position, that allows said sheet to be fed into said reversing path through its conveyance along said first guide surface, and a second switching position that allows said sheet to be fed out from said reversing path to the downstream side of said sheet conveying path through its conveyance along said second guide surface, and a control section that controls said image scanner and said image formation apparatus to allow said image formation apparatus to form an image on a sheet based on the image data for said original scanned by said image scanner.

42. A copying machine comprising:

an image scanner that scans an image of an original;

an image formation apparatus including, a sheet storage section that stacks and stores sheets, a sheet separation/feeding unit that separates and feeds said sheets from said sheet storage section one by one, an image forming section that forms an image on said fed sheet, a sheet conveying path from said sheet storage section to said image forming section, a reversing path connected to some midpoint of said sheet conveying path, and into which said separated and fed sheet is fed, a sheet reversing unit that switches back said sheet fed into said reversing path, forwards said sheet to the downstream side of said sheet conveying path, and allows a subsequent sheet to be fed into said reversing path during forwarding of said sheet, an inlet roller disposed at a branching point between said sheet conveying path and said reversing path, and rotated in a direction that feeds said sheet brought into contact with its outer circumferential surface from said sheet storage section to said reversing path and a driven roller that contacts the outer circumferential surface of said inlet roller, rotates together with said inlet roller, nips said sheet to be fed into said reversing path with the outer circumferential surface of said inlet roller at the contact point between both rollers, and rotates in a direction that feeds out said sheet from said reversing path toward said image forming section, and a control section that controls said image scanner and said image formation apparatus to allow said image formation apparatus to form an image on a sheet based on the image data for said original scanned by said image scanner.

43. A copying machine comprising:

an image scanner that scans an image of an original;

an image formation apparatus including, a sheet storage section that stacks and stores sheets, a sheet separation/feeding unit that separates and feeds said sheets from said sheet storage section one by one, an image forming section that forms an image on said fed sheet, a sheet conveying path from said sheet storage section to said image forming section, a reversing path connected to some midpoint of said sheet conveying path, and into which said separated and fed sheet is fed, a sheet reversing unit that switches back said sheet fed into said reversing path, forwards said sheet to the downstream side of said sheet conveying path, and, allows a subsequent sheet to be fed into said reversing path during forwarding of said sheet, an inlet roller disposed at a branching point between said sheet conveying path and said reversing path, and rotated in a direction that feeds said sheet brought into contact with its outer circumferential surface from said sheet storage section to said reversing path and a belt disposed in a direction such that said belt has a surface along a sheet to be fed into said reversing path and a surface along a sheet to be fed out of said reversing path, and which presses said sheet to be fed into said reversing path against the outer circumferential surface of said inlet roller and is rotated together with said inlet roller, and a control section that controls said image scanner and said image formation apparatus to allow said image formation apparatus to form an image on a sheet based on the image data for said original scanned by said image scanner.

44. A copying machine comprising:

an image scanner that scans an image of an original;

an image formation apparatus including, a sheet storage section that stacks and stores sheets, a sheet separation/feeding unit that separates and feeds said sheets from said sheet storage section one by one, an image forming section that forms an image on said fed sheet, a sheet conveying path from said sheet storage section to said image forming section, a reversing path connected to some midpoint of said sheet conveying path, and into which said separated and fed sheet is fed, a sheet reversing unit that switches back said sheet fed into said reversing path, forwards said sheet to the downstream side of said sheet conveying path, and allows a subsequent sheet to be fed into said reversing path during forwarding of said sheet, an inlet roller disposed at a branching point between said sheet conveying path and said reversing path, and rotated in a direction that feeds said sheet brought into contact with its outer circumferential surface from said sheet storage section to said reversing path and a blade extending in a direction that feeds said sheet into said reversing path, and whose front end is pressed against the outer circumferential surface of said inlet roller, and a control section that controls said image scanner and said image formation apparatus to allow said image formation apparatus to form an image on a sheet based on the image data for said original scanned by said image scanner.

45. An image formation apparatus comprising:

a sheet storage section that stacks and stores sheets;

a sheet separation/feeding unit that separates and feeds said sheets from said sheet storage section one by one;

an image forming section that forms an image on said fed sheet;

a sheet conveying path from said sheet storage section to said image forming section;

a reversing path connected to some midpoint of said sheet conveying path, and into which said separated and fed sheet is fed; and a sheet reversing unit that switches back said sheet fed into said reversing path, forwards said sheet to the downstream side of said sheet conveying path, and allows a subsequent sheet to be fed into said reversing path during forwarding of said sheet, wherein said sheet reversing unit is formed with a reverse roller intermittently rotated, and a driven roller brought into contact with the outer circumferential surface of said reverse roller and rotated together with said reverse roller, and a low friction part, whose frictional resistance with respect to a sheet passing through between said reverse roller and said driven roller is lower than that in any other parts, is formed on the outer circumferential part of said reverse roller.

46. The image formation apparatus according to claim 45, wherein a sheet switched back and forwarded from said reversing path to the downstream side of said sheet conveying path and a subsequent sheet fed into said reversing path during forwarding of said sheet are conveyed so that at least respective parts of said sheets overlap each other.

47. The image formation apparatus according to claim 45, wherein said reverse roller has a flat part as a low friction part partially formed on its outer circumferential part.

48. The image formation apparatus according claim 45, wherein a driving section is coupled to one end of a roller shaft of said reverse roller and a rotational position detecting unit is provided on the other end of said roller shaft.

49. The image formation apparatus according to claim 48, wherein said driving section is a stepping motor.

50. The image formation apparatus according to claim 45, wherein said reverse roller has a plurality of roller parts arranged along a lateral direction perpendicular to a sheet conveying direction.

51. The image formation apparatus according to claim 45, wherein said reverse roller has one wide roller part at a central part in a lateral direction perpendicular to a sheet conveying direction.

52. The image formation apparatus according to claim 45, wherein at least one of said reverse roller and said driven roller is a rubber roller.

53. The image formation apparatus according to claim 45, wherein both ends of said roller shaft of said reverse roller and a roller shaft of said driven roller are held by respective bearings, and said bearings are fixed to side plates positioned on both sides in the lateral direction perpendicular to the sheet conveying direction on said reversing path.

54. The image formation apparatus according to claim 45, wherein said reverse roller is held at a fixed position, while said driven roller is held movably in directions of contacting and being separated away from said reverse roller, and is biased by a biasing unit in a direction that contacts said reverse roller.

55. The image formation apparatus according to claim 45, wherein the upper side of the outer circumferential part of said driven roller slightly projects from the sheet guide surface of said reversing path.

56. The image formation apparatus according to claim 45 further comprising:

a detection sensor that detects a sheet to be fed into said reversing path; and a driving unit that reverses said reverse roller after a predetermined period of time elapses according to a detection result of said detection sensor.

57. The image formation apparatus according to claim 56, wherein said detection sensor is disposed at least one side in front of and behind a branching point between said sheet conveying path and said reversing path.

58. The image formation apparatus according to claim 56, wherein said detection sensor detects the rear edge of a sheet.

59. The image formation apparatus according to claim 45, wherein said image forming section is based on the electrophotographic system.

60. The image formation apparatus according to claim 45, wherein said image forming section is based on the digital electrophotographic system provided with a digital writing unit.

61. The image formation apparatus according to claim 45, wherein said image forming section is based on a non-electrophotographic system.

62. The image formation apparatus according to claim 45, wherein said sheet is a card.

63. The image formation apparatus according to claim 45, wherein said sheet reversing unit is selectable between a sheet forwarding state in which a sheet fed into said reversing path is switched back and forwarded to said sheet conveying path, and an open state in which the sheet forwarding state is released and a subsequent sheet is allowed to be fed into said reversing path so that said subsequent sheet and said fed-out sheet pass each other, and said image formation apparatus further comprising intermediate conveying rollers that nip a sheet fed out by said sheet reversing unit immediately before said sheet reversing unit is brought to the open state, and convey said sheet, whose rear side in its conveying direction is released, toward said image forming section.

64. The image formation apparatus according to claim 63, wherein said sheet reversing unit comprises:

a reverse roller intermittently rotated; and a driven roller brought into contact with the outer circumferential surface of said reverse roller to be rotated together with said reverse roller, and a flat part, which produces a space with the outer circumferential surface of said driven roller, is formed on the outer circumferential part of said reverse roller.

65. The image formation apparatus according to claim 63, wherein said sheet reversing unit is a beat roller pair that is movable between a position where the outer circumferential surfaces of said rollers come into contact with a sheet to nip said sheet and a position where said rollers are separated away from said sheet, and at least one of said rollers is rotated in the normal and reverse directions.

66. The image formation apparatus according to claim 63, wherein said intermediate conveying rollers have a torque limiter that performs no-load operation when load becomes a predetermined level or more.

67. The image formation apparatus according to claim 63, wherein frictional resistance of at least one of said intermediate conveying rollers with respect to a sheet is not more than 0.5.

68. A printer comprising:

an image formation apparatus including, a sheet storage section that stacks and stores sheets, a sheet separation/feeding unit that separates and feeds said sheets from said sheet storage section one by one, an image forming section that forms an image on said fed sheet, a sheet conveying path from said sheet storage section to said image forming section, a reversing path connected to some midpoint of said sheet conveying path, and into which said separated and fed sheet is fed and a sheet reversing unit that switches back said sheet fed into said reversing path, forwards said sheet to the downstream side of said sheet conveying path, and allows a subsequent sheet to be fed into said reversing path during forwarding of said sheet, wherein said sheet reversing unit is formed with a reverse roller intermittently rotated, and a driven roller brought into contact with the outer circumferential surface of said reverse roller and rotated together with said reverse roller and a low friction part, whose frictional resistance with respect to a sheet passing through between said reverse roller and said driven roller is lower than that in any other parts, is formed on the outer circumferential part of said reverse roller, and an input terminal that receives input of image data; and a control section that controls said image formation apparatus so as to form an image on a sheet based on the image data.

69. A copying machine comprising:

an image scanner that scans an image of an original;

an image formation apparatus including, a sheet storage section that stacks and stores sheets, a sheet separation/feeding unit that separates and feeds said sheets from said sheet storage section one by one, an image forming section that forms an image on said fed sheet, a sheet conveying path from said sheet storage section to said image forming section, a reversing path connected to some midpoint of said sheet conveying path, and into which said separated and fed sheet is fed and a sheet reversing unit that switches back said sheet fed into said reversing path, forwards said sheet to the downstream side of said sheet conveying path, and allows a subsequent sheet to be fed into said reversing path during forwarding of said sheet, wherein said sheet reversing unit is formed with a reverse roller intermittently rotated, and a driven roller brought into contact with the outer circumferential surface of said reverse roller and rotated together with said reverse roller and a low friction part, whose frictional resistance with respect to a sheet passing through between said reverse roller and said driven roller is lower than that in any other parts, is formed on the outer circumferential part of said reverse roller, and a control section that controls said image scanner and said image formation apparatus to allow said image formation apparatus to form an image on a sheet based on the image data for said original scanned by said image scanner.

70. A facsimile device comprising:

an image scanner that scans an image of an original;

an image formation apparatus including, a sheet storage section that stacks and stores sheets, a sheet separation/feeding unit that separates and feeds said sheets from said sheet storage section one by one, an image forming section that forms an image on said fed sheet, a sheet conveying path from said sheet storage section to said image forming section, a reversing path connected to some midpoint of said sheet conveying path, and into which said separated and fed sheet is fed, a sheet reversing unit that switches back said sheet fed into said reversing path, forwards said sheet to the downstream side of said sheet conveying path, and allows a subsequent sheet to be fed into said reversing path during forwarding of said sheet, wherein said sheet reversing unit is formed with a reverse roller intermittently rotated, and a driven roller brought into contact with the outer circumferential surface of said reverse roller and rotated together with said reverse roller and a low friction part, whose frictional resistance with respect to a sheet passing through between said reverse roller and said driven roller is lower than that in any other parts, is formed on the outer circumferential part of said reverse roller, and a transmitter/receiver that performs transmission and reception of image data with the outside through a network; and a control section that controls said image scanner, said image formation apparatus, and said transmitter/receiver, allows said transmitter/receiver to transmit the image data for said original scanned by said image scanner to the outside through the network, and allows said image formation apparatus to form an image on a sheet based on the image data received from the outside through the network.

\* \* \* \* \*